(12) United States Patent
Tamada et al.

(10) Patent No.: US 11,820,526 B2
(45) Date of Patent: Nov. 21, 2023

(54) POWER SUPPLY APPARATUS FOR A FLYING BODY INCLUDING A COMBUSTION GAS AND INTAKE AIR HEAT EXCHANGER

(71) Applicant: HONDA MOTOR CO., LTD., Tokyo (JP)

(72) Inventors: Shunichiro Tamada, Wako (JP); Gen Nakamura, Wako (JP); Hiroaki Nagano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 308 days.

(21) Appl. No.: 17/163,998

(22) Filed: Feb. 1, 2021

(65) Prior Publication Data

US 2021/0261268 A1    Aug. 26, 2021

(30) Foreign Application Priority Data

Feb. 26, 2020 (JP) .................................. 2020-030948
Feb. 26, 2020 (JP) .................................. 2020-030949

(Continued)

(51) Int. Cl.
*B64D 37/34* (2006.01)
*B64D 27/10* (2006.01)
(Continued)

(52) U.S. Cl.
CPC ............. *B64D 37/34* (2013.01); *B64D 27/10* (2013.01); *B64D 27/24* (2013.01); *B64D 33/08* (2013.01); *B64D 2027/026* (2013.01)

(58) Field of Classification Search
CPC .. B64D 2027/026; B64D 27/10; B64D 27/24; B64D 33/08; B64D 37/34
(Continued)

(56) References Cited

U.S. PATENT DOCUMENTS 4,696,156 A * 9/1987 Burr ........................ B64D 37/34
                                                        60/39.08
5,284,012 A * 2/1994 Laborie ..................... F02C 7/12
                                                        60/39.08

(Continued)

FOREIGN PATENT DOCUMENTS

JP    H01-138361 A    5/1989
JP    2003-269269 A   9/2003
(Continued)

OTHER PUBLICATIONS

Office Action dated Sep. 1, 2023, counterpart JP Application No. 2020-044371, with English Translation. (6 pages).
(Continued)

*Primary Examiner* — Brady W Frazier
(74) *Attorney, Agent, or Firm* — WHDA, LLP

(57) ABSTRACT

The present invention provides a propulsion apparatus that generates a propulsion force of a flying body, comprising: a propulsion rotor; a motor configured to pivotally support and rotate the propulsion rotor; power generation unit configured to generate power for driving the motor; and a housing configured to store the power generation unit, wherein the housing is arranged outside an airframe of the flying body, and the motor is connected to the housing.

22 Claims, 43 Drawing Sheets

(30) Foreign Application Priority Data

| Feb. 27, 2020 | (JP) | 2020-032149 |
|---|---|---|
| Feb. 28, 2020 | (JP) | 2020-033729 |
| Feb. 28, 2020 | (JP) | 2020-033730 |
| Mar. 13, 2020 | (JP) | 2020-044370 |
| Mar. 13, 2020 | (JP) | 2020-044371 |

(51) Int. Cl.
  *B64D 33/08* (2006.01)
  *B64D 27/24* (2006.01)
  *B64D 27/02* (2006.01)

(58) Field of Classification Search
  USPC .................................................. 244/53 R
  See application file for complete search history.

(56) References Cited

U.S. PATENT DOCUMENTS

| 7,555,893 | B2 | 7/2009 | Okai et al. |
| 8,727,271 | B2 | 5/2014 | Salyer |
| 9,174,741 | B2 | 11/2015 | Suntharalingam et al. |
| 9,248,908 | B1 | 2/2016 | Luyks |
| 9,764,848 | B1 | 9/2017 | Vondrell et al. |
| 9,834,305 | B2 | 12/2017 | Taylor et al. |
| 9,932,124 | B2 | 4/2018 | Kamath et al. |
| 9,988,147 | B2 | 6/2018 | Taylor et al. |
| 10,259,577 | B2 | 4/2019 | Taylor et al. |
| 10,717,522 | B2 | 7/2020 | Taylor et al. |
| 11,015,480 | B2 | 5/2021 | Waun |
| 2006/0254255 | A1 | 11/2006 | Okai et al. |
| 2014/0010652 | A1 | 1/2014 | Suntharalingam et al. |
| 2014/0290208 | A1* | 10/2014 | Rechain ............ B64C 27/04 60/39.23 |
| 2015/0014475 | A1 | 1/2015 | Taylor et al. |
| 2015/0021442 | A1 | 1/2015 | Hunter |
| 2015/0344144 | A1 | 12/2015 | Kamath et al. |
| 2016/0009402 | A1 | 1/2016 | Hunter |
| 2016/0214712 | A1 | 7/2016 | Fisher et al. |
| 2017/0037756 | A1* | 2/2017 | Julien ................ F02K 1/386 |
| 2017/0081040 | A1* | 3/2017 | Pal ................... F28F 9/026 |
| 2017/0137138 | A9 | 5/2017 | Hunter |
| 2017/0253340 | A1 | 9/2017 | Vondrell et al. |
| 2017/0355455 | A1 | 12/2017 | Taylor et al. |
| 2017/0356340 | A1* | 12/2017 | Vaisman ............ F02C 1/10 |
| 2017/0369179 | A1 | 12/2017 | Bradbrook |
| 2018/0273158 | A1* | 9/2018 | Courtin ............ B64C 39/024 |
| 2018/0290741 | A1 | 10/2018 | Taylor et al. |
| 2018/0346132 | A1* | 12/2018 | Casado-Montero ... B64D 13/08 |
| 2019/0128570 | A1* | 5/2019 | Moxon ............ H02K 11/0094 |
| 2019/0256217 | A1* | 8/2019 | Dionne ............ B64D 33/10 |
| 2019/0257245 | A1* | 8/2019 | Duge ................ F02C 7/32 |
| 2020/0023960 | A1 | 1/2020 | Taylor et al. |
| 2020/0063599 | A1 | 2/2020 | Waun |

FOREIGN PATENT DOCUMENTS

| JP | 2006-205755 A | 8/2006 |
| JP | 2016-510376 A | 4/2016 |
| JP | 2017-159889 A | 9/2017 |
| JP | 2019-077361 A | 5/2019 |
| JP | 2019-142501 A | 8/2019 |

OTHER PUBLICATIONS

Office Action dated Aug. 4, 2023, issued in counterpart to JP Application No. 2020-030949, with English Translation. (5 pages).
Office Action dated Aug. 4, 2023, issued in counterpart to JP Application No. 2020-033729, with English Translation. (6 pages).
Office Action dated Aug. 4, 2023, issued in counterpart to JP Application No. 2020-033730, with English Translation. (8 pages).

* cited by examiner

FIG. 36
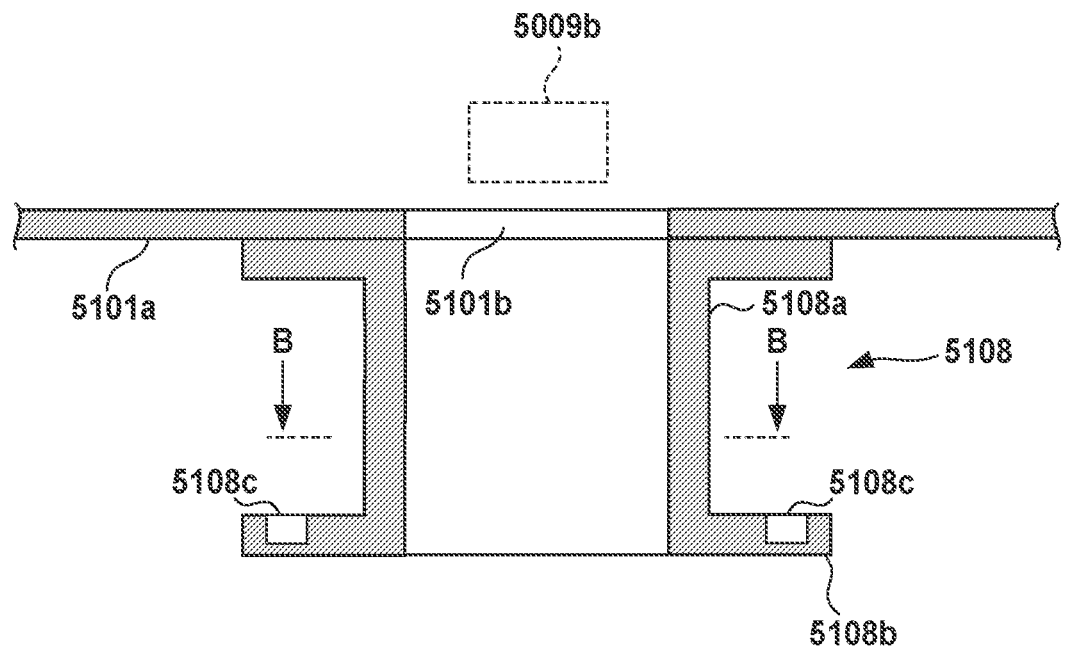
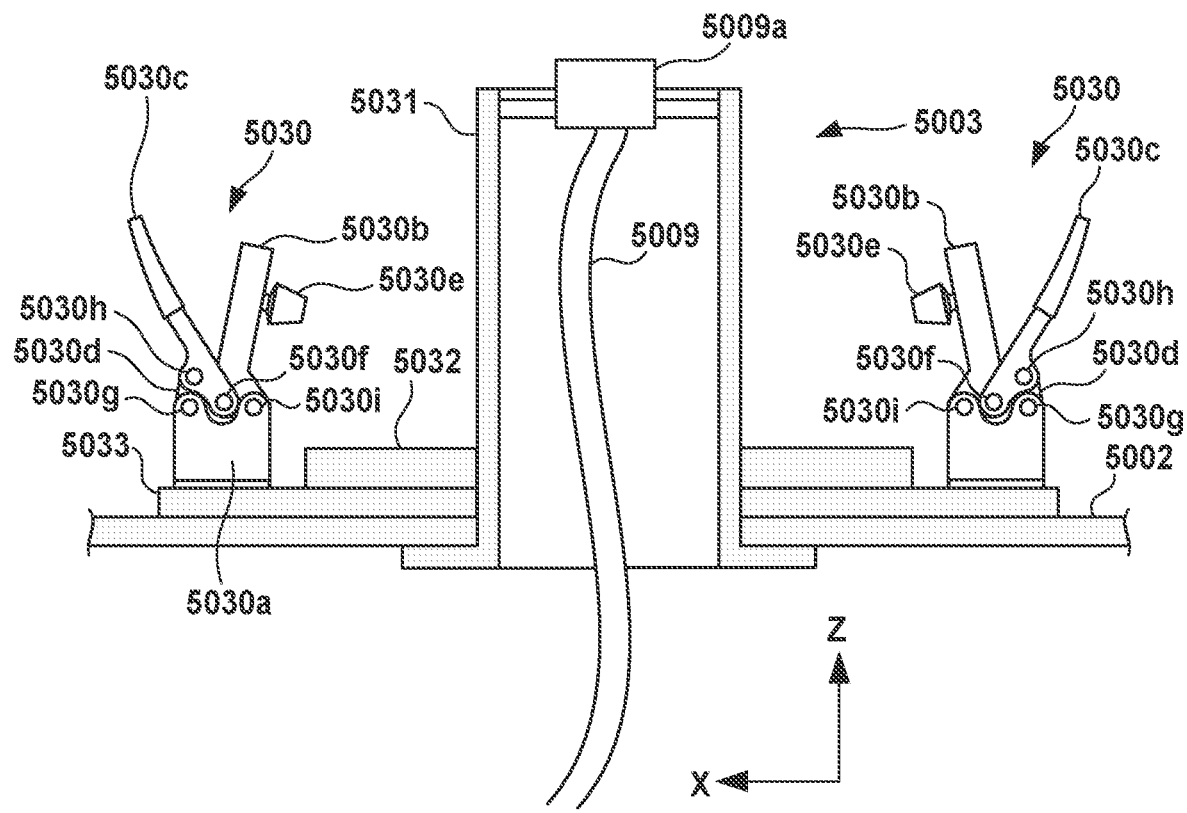

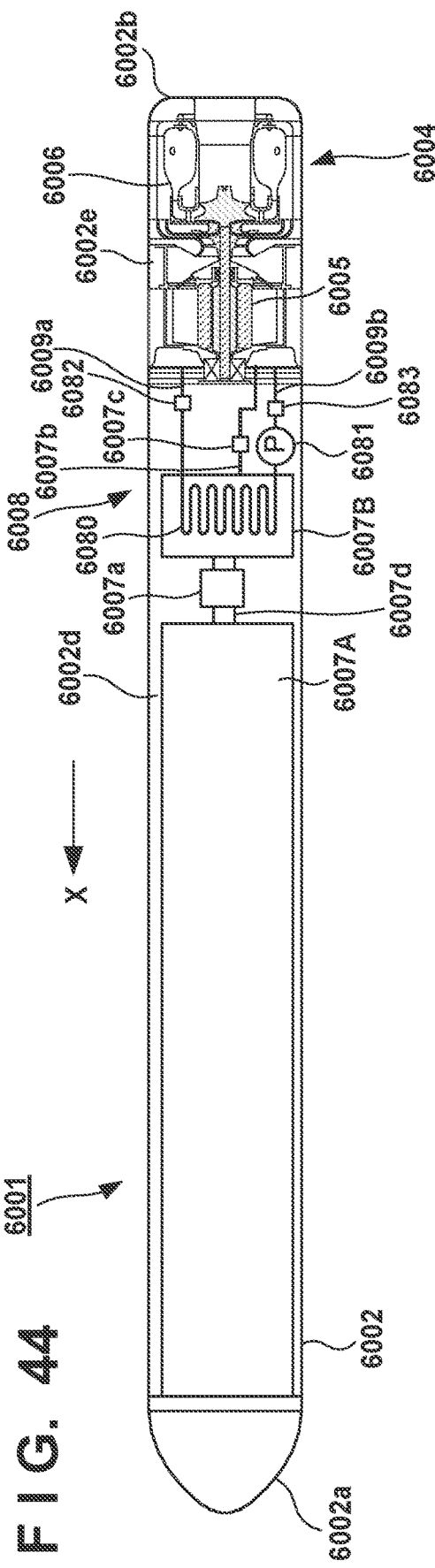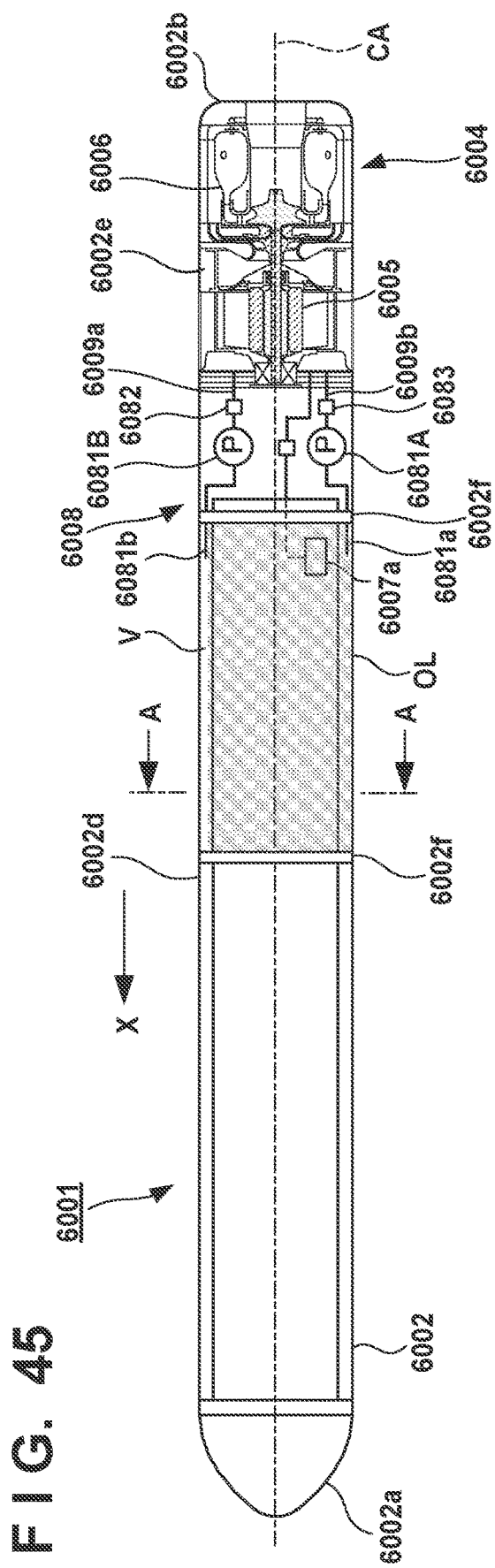

POWER SUPPLY APPARATUS FOR A FLYING BODY INCLUDING A COMBUSTION GAS AND INTAKE AIR HEAT EXCHANGER

CROSS-REFERENCE TO RELATED APPLICATION(S)

This application claims priority to and the benefit of Japanese Patent Application No. 2020-030948 filed on Feb. 26, 2020, Japanese Patent Application No. 2020-030949 filed on Feb. 26, 2020, Japanese Patent Application No. 2020-032149 filed on Feb. 27, 2020, Japanese Patent Application No. 2020-033729 filed on Feb. 28, 2020, Japanese Patent Application No. 2020-033730 filed on Feb. 28, 2020, Japanese Patent Application No. 2020-044370 filed on Mar. 13, 2020, and Japanese Patent Application No. 2020-044371 filed on Mar. 13, 2020, the entire disclosures of which are incorporated herein by reference.

BACKGROUND OF THE INVENTION

Field of the Invention

The present invention relates to a propulsion apparatus, a power supply apparatus, and a flying body.

Description of the Related Art

An electric propulsion type flying body including an electric driving source such as a motor has been proposed. For example, U.S. Pat. No. 9,248,908 discloses an electric propulsion type helicopter that generates power by rotating the rotating shaft of a power generator by an engine (combustion engine) and drives a motor by the power.

As described in U.S. Pat. No. 9,248,908, when the engine and the power generator are arranged in an airframe with a cabin, it may be difficult to ensure the cabin space, or the safety of crew may lower. Hence, the engine and the power generator are preferably arranged outside the airframe. Even when the engine and the power generator are arranged outside the airframe, if a propulsion rotor and a motor that rotates it are provided in the airframe, wirings and control for sending the power generated by the power generator to the motor are complicated, resulting in disadvantage from the viewpoint of maintenance.

SUMMARY OF THE INVENTION

According to one aspect of the present invention, there is provided a propulsion apparatus that generates a propulsion force of a flying body, comprising: a propulsion rotor; a motor configured to pivotally support and rotate the propulsion rotor; power generation unit configured to generate power for driving the motor; and a housing configured to store the power generation unit, wherein the housing is arranged outside an airframe of the flying body, and the motor is connected to the housing.

According to another aspect of the present invention, there is provided an electric propulsion type flying body comprising: a propulsion rotor; a motor configured to pivotally support and rotate the propulsion rotor; power generation unit configured to generate power for driving the propulsion rotor; power storage unit configured to store the power generated by the power generation unit; and a first housing and a second housing, which are arranged apart from each other outside an airframe of the flying body, wherein the power generation unit is stored in the first housing, and the power storage unit is stored in the second housing.

According to still another aspect of the present invention, there is provided a flying body including a power supply apparatus that includes power generation unit and a hollow housing and is configured to supply power to a power load, the hollow housing having a long shape and including a reserving portion configured to reserve fuel of the power generation unit and a storage portion configured to store the power generation unit, wherein the reserving portion comprises: a hollow outer shell portion; and a bag-shaped tank having flexibility and separately held inside the outer shell portion.

According to yet another aspect of the present invention, there is provided a power supply apparatus that supplies power to a power load of a flying body, comprising: a power generator including a rotating shaft; an engine configured to rotationally drive the rotating shaft; a housing arranged outside an airframe of the flying body and configured to store the power generator and the engine; and a heat exchanger configured to perform heat exchange between a combustion gas discharged from the engine and air supplied to the engine.

According to still yet another aspect of the present invention, there is provided a power supply apparatus that to supplies power to a power load of a flying body, comprising: power generation unit; a hollow housing including a reserving portion configured to reserve fuel of the power generation unit, and a storage portion configured to store the power generation unit; and a connecting portion configured to separably connect the housing to an airframe of the flying body, wherein the housing has a shape long in a front-and-rear direction of the flying body and is arranged outside the airframe, and the connecting portion is arranged outside the housing and includes a clamp mechanism configured to releasably fix a connected portion of the airframe to the housing.

According to yet still another aspect of the present invention, there is provided a power supply apparatus that supplies power to a power load of a flying body, comprising: power generation unit; a hollow housing including a reserving portion configured to reserve fuel of the power generation unit, and a storage portion configured to store the power generation unit; a connecting portion configured to connect the housing to an airframe of the flying body; and heat retaining unit for remaining heat of the fuel, wherein the housing has a shape long in a front-and-rear direction of the flying body and is arranged outside the airframe, the power generation unit includes: an internal combustion engine; and a power generator configured to generate power by an output of the internal combustion engine, and the heat retaining unit retains the heat of the fuel by heat of lubricant oil that circulates in the internal combustion engine.

According to still yet another aspect of the present invention, there is provided a flying body including a power supply apparatus that includes power generation unit and a hollow housing and is configured to supply power to a power load, the hollow housing having a long shape and including a reserving portion configured to reserve fuel of the power generation unit and a storage portion configured to store the power generation unit, wherein the power supply apparatus comprises: a plurality of suction unit, arranged inside the reserving portion, for sucking the fuel; and hollow connecting unit connected to the plurality of suction unit arranged in a front-and-rear direction of the reserving portion and deformed in accordance with movement of the plurality of suction unit, wherein the connecting unit supplies the fuel sucked by the plurality of suction unit to the power generation unit.

Further features of the present invention will become apparent from the following description of exemplary embodiments with reference to the attached drawings.

BRIEF DESCRIPTION OF THE DRAWINGS

FIG. 36 is a sectional view taken along a line A-A in FIG. 34 (a sectional view of a connecting portion);
FIG. 44 is a view of the internal structure of a power supply apparatus according to another example;
FIG. 45 is a view of the internal structure of a power supply apparatus according to still another example.

DESCRIPTION OF THE EMBODIMENTS

Figure 1:
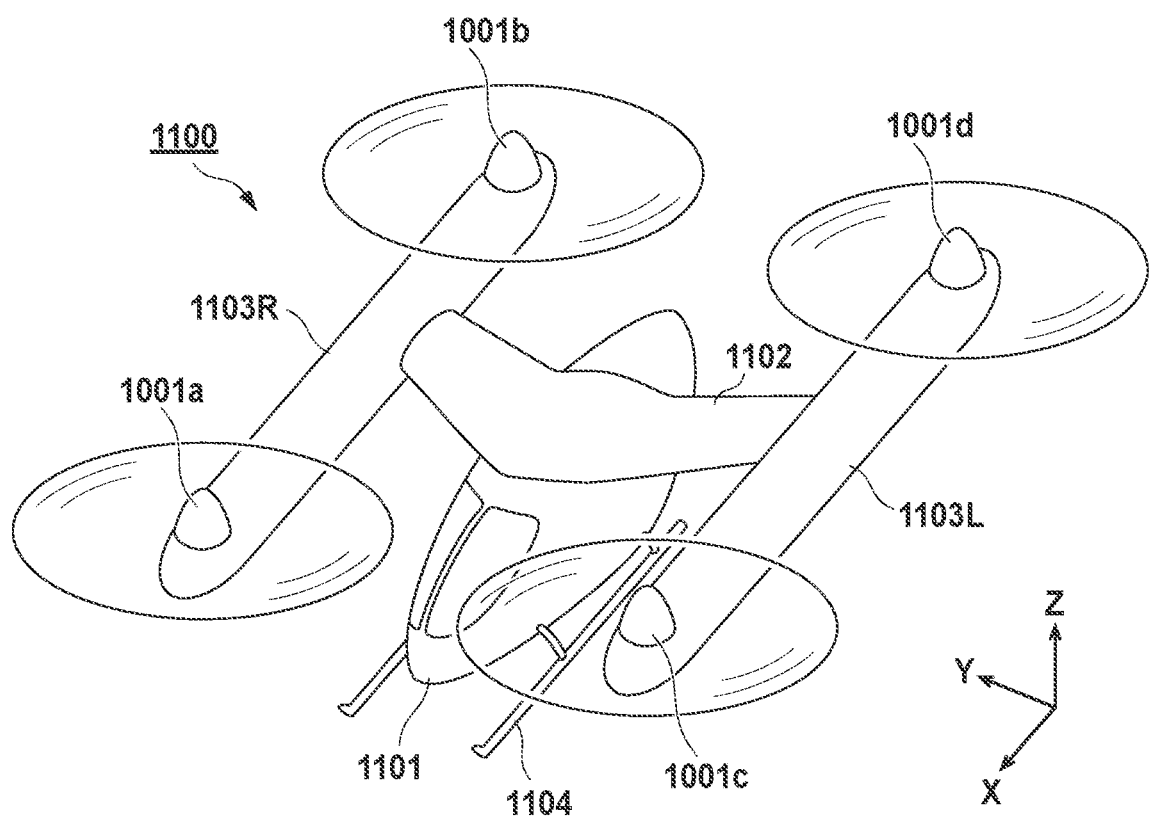
FIG. 1 is a schematic view of a flying body according to Embodiment 1-1.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

An electric propulsion type flying body including an electric driving source such as a motor has been proposed. For example, U.S. Pat. No. 9,248,908 discloses an electric propulsion type helicopter that generates power by rotating the rotating shaft of a power generator by an engine (combustion engine) and drives a motor by the power.

As described in U.S. Pat. No. 9,248,908, when the engine and the power generator are arranged in an airframe with a cabin, it may be difficult to ensure the cabin space, or the safety of crew may lower. Hence, the engine and the power generator are preferably arranged outside the airframe. Even when the engine and the power generator are arranged outside the airframe, if a propulsion rotor and a motor that rotates it are provided in the airframe, wirings and control for sending the power generated by the power generator to the motor are complicated, resulting in disadvantage from the viewpoint of maintenance.

It is an object of this embodiment to provide a technique advantageous from the viewpoint of maintenance in an electric propulsion type flying body.

Embodiment 1-1

FIG. 1 is a schematic view of a flying body 1100 according to Embodiment 1-1. In FIG. 1, arrows X, Y, and Z represent the front-and-rear direction, the widthwise direction (left-and-right direction), and the up-and-down direction of the flying body 1100, respectively. The flying body 1100 according to this embodiment is an electric propulsion type flying body that rotates a propulsion rotor 1001 (or a propeller) using a motor as a driving source, and is particularly a helicopter. The flying body 1100 shown in FIG. 1 includes four propulsion rotors 1001a to 1001d.

The flying body 1100 can include, for example, an airframe 1101 with a cabin (a passenger cabin and a cockpit), a pylon portion 1102 provided on the upper side of the airframe 1101, a propulsion apparatus 1103 supported by the pylon portion 1102, and a skid 1104. The propulsion apparatus 1103 is an apparatus that generates power (a propulsion force or a thrust) for propelling the flying body 1100. The propulsion apparatus 1103 is provided outside the airframe 1101 and connected to the airframe 1101 via the pylon portion 1102. When the propulsion apparatus 1103 is arranged outside the airframe 1101, occupation of the internal space of the airframe 1101 by a power generation mechanism and the like can be avoided, and it is possible to expand the cabin, improve the layout property of other constituent components, and improve the maintainability of the propulsion apparatus 1103.

In the flying body 1100 according to this embodiment, a plurality of propulsion apparatuses 1103 are provided outside the airframe 1101. The plurality of propulsion apparatuses 1103 are supported by the pylon portion 1102 extended in the widthwise direction (Y direction). In the example shown in FIG. 1, one propulsion apparatus 1103 is provided on each of the left and right sides of the airframe 1101. The number of propulsion apparatus 1103 is not limited to two, and one or three or more propulsion apparatuses may be provided. To keep the balance on the left and right sides of the flying body 1100, the propulsion apparatuses 1103 in the same number are preferably arranged on the left and right sides of the airframe 1101. As an example, when providing an odd number of propulsion apparatuses 1103, the propulsion apparatuses 1103 in the same number are arranged on the left and right sides of the airframe 1101, and one propulsion apparatuses 1103 is arranged on the upper side of the airframe 1101. Note that the propulsion apparatus 1103 arranged on the right side of the airframe 1101 will sometimes be referred to as a "right-side propulsion apparatus 1103R", and the propulsion apparatus 1103 arranged on the left side of the airframe 1101 will sometimes be referred to as a "left-side propulsion apparatus 1103L" hereafter.

Figure 2:
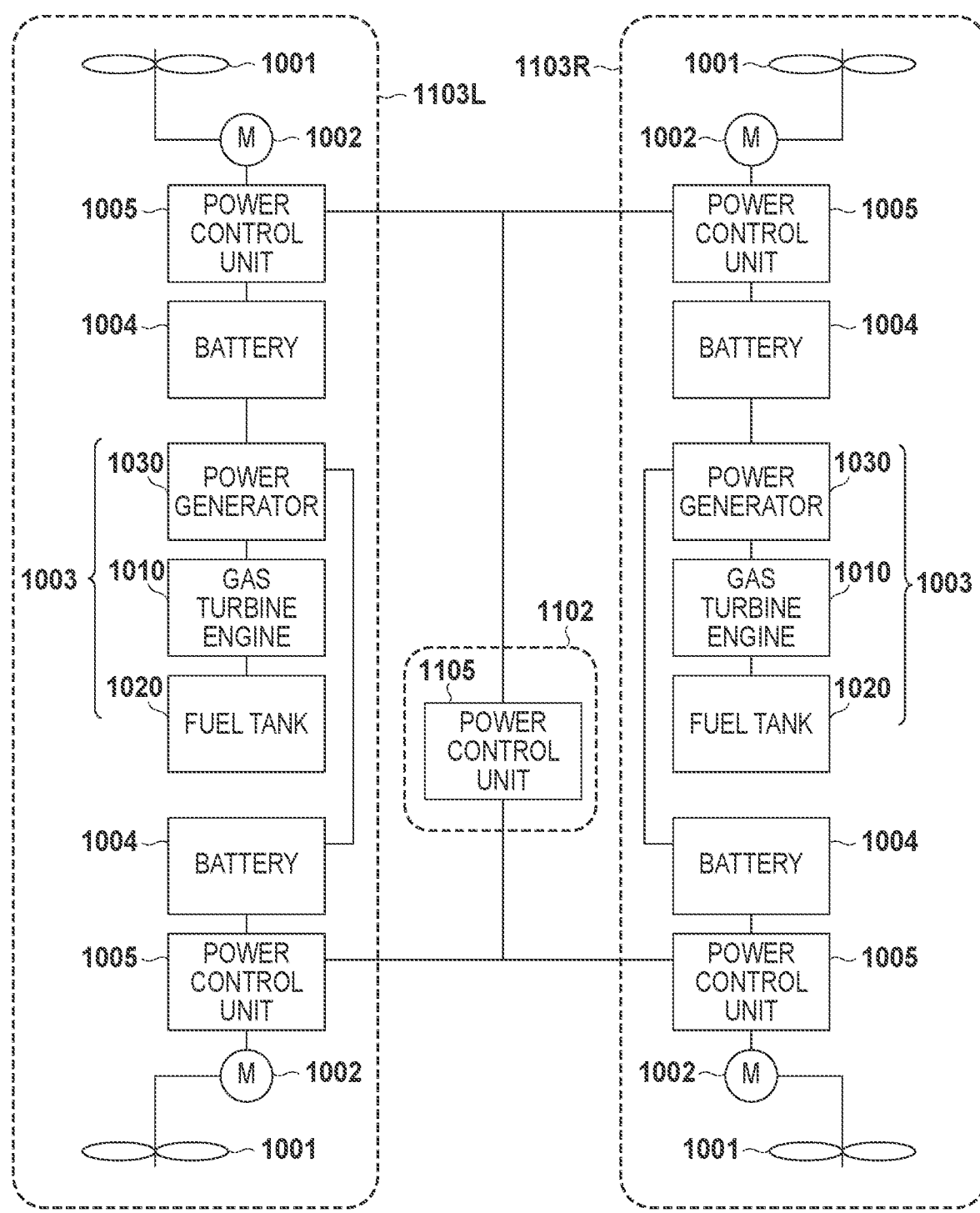
FIG. 2 is a block diagram showing an example of the arrangement of the flying body according to Embodiment 1-1.

FIG. 2 is a block diagram showing an example of the arrangement of the flying body 1100. FIG. 2 shows the pylon portion 1102, the right-side propulsion apparatus 1103R, and the left-side propulsion apparatus 1103L. A main control unit 1105 is, for example, an ECU (Electronic Control Unit), and includes a processor represented by a CPU, a storage device such as a semiconductor memory, an interface to an external device, and the like. The main control unit 1105 controls the flying operation of the flying body 1100 by controlling the rotation of the propulsion rotor 1001 by a motor 1002 via a power control unit 1005. In this embodiment, the main control unit 1105 is provided in the pylon portion 1102. However, the present invention is not limited to this, and the main control unit 1105 may be provided in the airframe 1101.

The right-side propulsion apparatus 1103R and the left-side propulsion apparatus 1103L have identical arrangements, and each include, for example, the propulsion rotor 1001, the motor 1002 that pivotally supports and rotates the propulsion rotor 1001, a power generation unit 1003 that generates power to drive the motor 1002, a battery 1004 that stores the power generated by the power generation unit 1003, and the power control unit 1005 (for example, PCU; Power Control Unit) that controls the power supplied from the battery 1004 to the motor 1002. The power generation unit 1003 includes a gas turbine engine 1010, a fuel tank 1020 that reserves the fuel of the gas turbine engine 1010, and a power generator 1030 that generates power by the output of the gas turbine engine 1010. In this embodiment, each of the right-side propulsion apparatus 1103R and the propulsion apparatus 1103L is provided with the battery 1004. However, the present invention is not limited to this, and the battery 1004 may be provided in the pylon portion 1102, or the battery 1004 may be provided in the airframe 1101.

[Example of Arrangement of Propulsion Apparatus]

Figure 3:
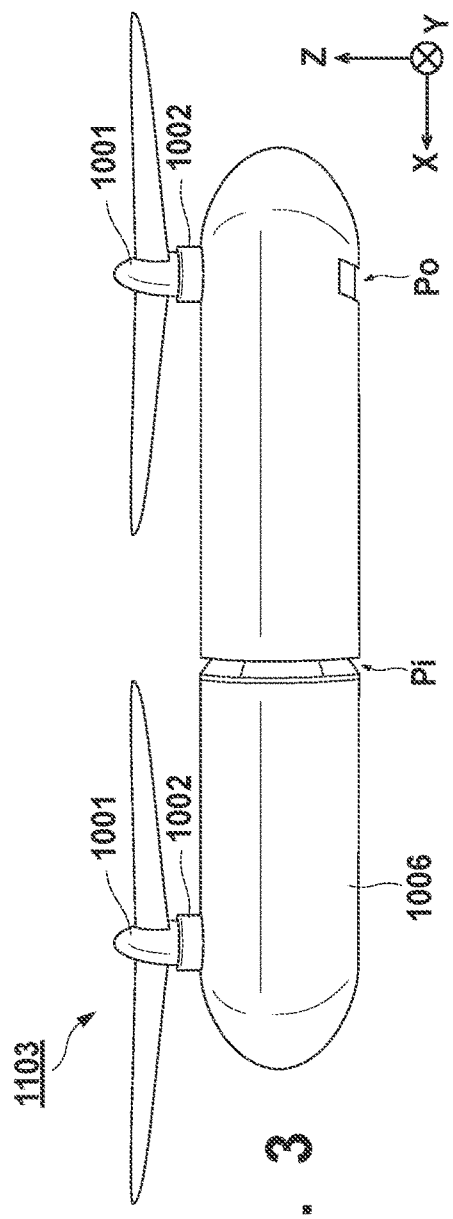
FIG. 3 is an outer view of a propulsion apparatus according to Embodiment 1-1.
Figure 4:
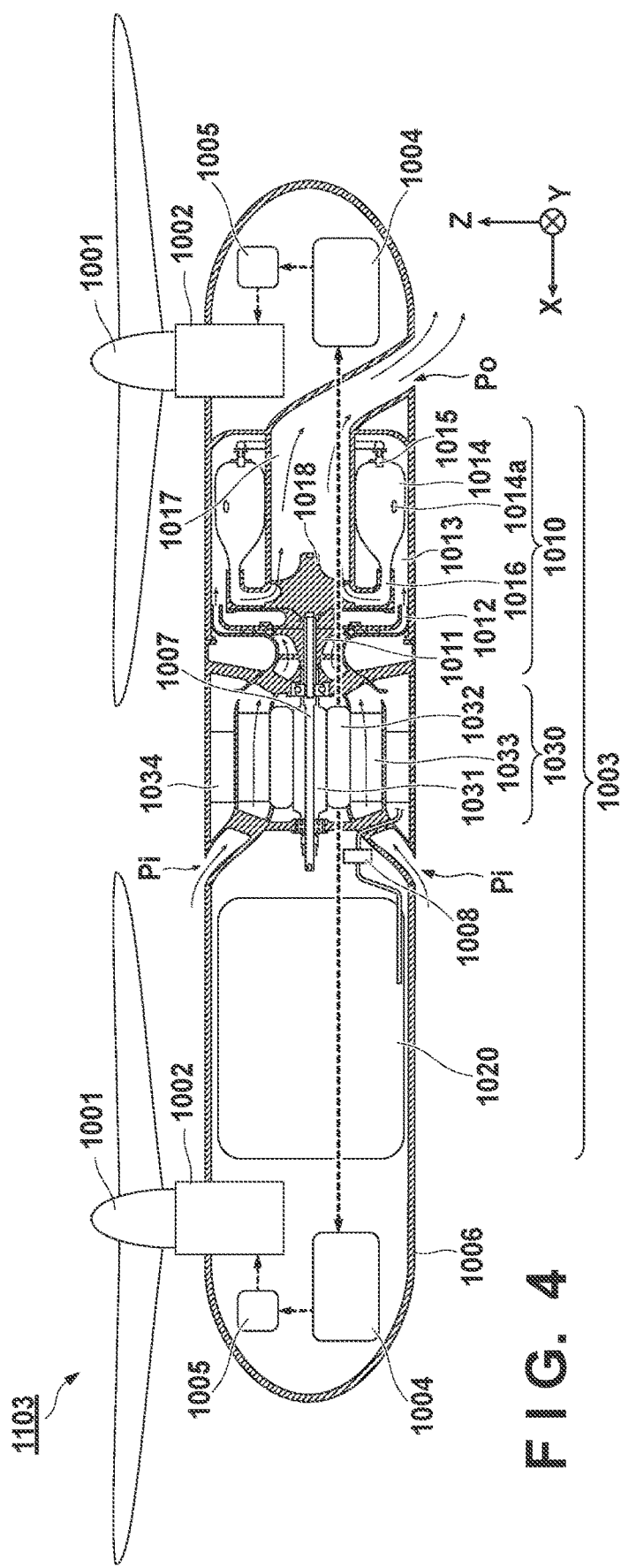
FIG. 4 is a sectional view of the propulsion apparatus according to Embodiment 1-1.

An example of the arrangement of the propulsion apparatus 1103 will be described next with reference to FIGS. 3 and 4. FIG. 3 is an outer view of the propulsion apparatus 1103, and FIG. 4 is a sectional view of the propulsion apparatus 1103. Note that in FIG. 4, a thick arrow indicates the path of power, and a thin arrow indicates the path of a gas.

The propulsion apparatus 1103 includes a hollow housing 1006 (pod) that forms the outer wall. The housing 1006 has an outer shape extended along the X direction (that is, a pod-like outer shape long along the X direction). When the housing 1006 arranged outside the airframe 1101 has such an outer shape, the air resistance during forward flight of the flying body 1100 can be reduced. Since the body portion of the housing 1006 according to this embodiment has a cylindrical shape, the influence of a cross wind can be made smaller. In addition, the distal end portion of the housing 1006 has a tapered shape whose diameter is reduced toward the front side. In this embodiment, the distal end portion of the housing 1006 is formed into a hemispherical shape but may have a triangular pyramid shape. When the distal end portion is formed into a tapered shape, the air resistance during forward flight of the flying body 1100 can further be reduced. Here, the shape of the housing 1006 is not limited to a cylindrical shape, and may be a square tubular shape or another tubular shape. In addition, the housing 1006 may include a portion with a cylindrical shape and a portion with a square tubular shape.

The motor 1002 that rotates the propulsion rotor 1001 is connected (attached) to the housing 1006. In this embodiment, a plurality of motors 1002 are connected to the housing 1006. In the example shown in FIGS. 3 and 4, a total of two motors 1002 are provided on the housing 1006, that is, one is provided on the front side, and one is provided on the rear side of the flying body 1100. However, the present invention is not limited to this, and one or three or more motors 1002 may be provided on the housing 1006. As a method of connecting the housing 1006 and the motor 1002, an arbitrary method such as welding can be employed if it is possible to ensure support rigidity of the motor 1002 by the housing 1006.

The power generation unit 1003, the battery 1004 that stores power generated by the power generation unit 1003, and the power control unit 1005 that controls the power supplied from the battery 1004 to the motor 1002 are provided in the housing 1006. As described above, the propulsion apparatus 1003 includes the gas turbine engine 1010, the fuel tank 1020 that reserves the fuel of the gas turbine engine 1010, and the power generator 1030 that generates power by the output of the gas turbine engine 1010. As the fuel reserved in the fuel tank 1020, methanol, gasoline, or the like can be used.

The gas turbine engine 1010, the fuel tank 1020, and the power generator 1030 are preferably arrayed along the front-and-rear direction (X direction) of the flying body 1100. In this embodiment, the power generator 1030 is arranged between the gas turbine engine 1010 and the fuel tank 1020 in the front-and-rear direction of the flying body 1100. In addition, the gas turbine engine 1010 and the power generator 1030 are provided on a common rotating shaft 1007 (coaxially). When the gas turbine engine 1010 rotationally drives the rotating shaft 1007, the power generator 1030 can generate power. With this arrangement, it is possible to arrange the gas turbine engine 1010 and the power generator 1030 without wasting a space and make the apparatus compact.

The gas turbine engine 1010 includes a compressor including an impeller 1011 and a diffuser 1012. The impeller 1011 is attached to the rotating shaft 1007. Air taken from an inlet port Pi is sent to a compression chamber 1013 while being compressed via the diffuser 1012 along with the rotation of the impeller 1011. As shown in FIG. 4, the compression chamber 1013 is a closed space defined between a tubular outer circumferential case (housing 1006) surrounding the gas turbine engine 1010 and a tubular inner circumferential case that is arranged inside the outer circumferential case and constitutes the outer wall of an exhaust pipe 1017. The compressed air held in the compression chamber 1013 is taken from an opening portion 1014a provided in the circumferential wall of a combustion chamber 1014 into the combustion chamber 1014. The combustion chamber 1014 is provided with a fuel injection nozzle 1015, and the fuel supplied from the fuel tank 1020 by a supply pump 1008 (supply unit) via a pipe is injected into the combustion chamber 1014 by the fuel injection nozzle 1015. At the time of start, an ignition device (not shown) ignites the gas mixture in the combustion chamber 1014.

After that, combustion of the gas mixture continuously occurs in the combustion chamber 1014.

A combustion gas that has obtained a high temperature and a high pressure in the combustion chamber 1014 jets out from a turbine nozzle 1016 to the tubular exhaust pipe 1017, rotates a turbine 1018 attached to the rotating shaft 1007, and is discharged to the rear side from an exhaust port Po provided in the lower portion of the propulsion apparatus 1103 (housing 1006). To avoid an influence on flight control caused by, for example, the combustion gas that hits the propulsion rotor 1001 or the motor 1002, the exhaust port Po is preferably arranged in the lower portion of the housing 1006, as in this embodiment. However, the present invention is not limited to this, and the exhaust port Po may be arranged at an arbitrary position of the housing 1006.

The impeller 1011, the turbine 1018, and a rotor 1031 (permanent magnet or the like) of the power generator 1030 to be described later are provided on the rotating shaft 1007, and the impeller 1011 and the rotor 1031 can integrally be rotated by the rotation of the turbine 1018. Note that in this embodiment, the gas turbine engine 1010 exclusively aims at driving the power generator 1030, and actively using the exhaust gas flow as the propulsion force of the flying body 1100 is not assumed. However, a mode in which the exhaust gas flow is used as an auxiliary propulsion force is also possible.

The power generator 1030 includes the rotor 1031 such as a permanent magnet attached to the rotating shaft 1007, and a stator 1032 such as a coil disposed around the rotor 1031. When the rotating shaft 1007 is rotated by the gas turbine engine 1010, and the rotor 1031 attached to the rotating shaft 1007 rotates accordingly, the stator 1032 can generate power. In addition, a plurality of fins 1033 configured to cool the stator 1032 are provided around the stator 1032 in the circumferential direction of the rotating shaft 1007. The plurality of fins 1033 are arranged in a space to which the air taken from the inlet port Pi is guided. When the air passes between the plurality of fins 1033, the plurality of fins 1033 are cooled, and the stator 1032 can accordingly be cooled.

In addition, the power generation unit 1003 includes a power generation control unit 1034. The power generation control unit 1034 includes a circuit that controls power generation of the power generator 1030, and a circuit that controls driving of the gas turbine engine 1010. The power generation control unit 1034 can use the battery 1004 provided in the housing 1006 as a power supply. A storage battery (battery) may uniquely be provided in the power generation control unit 1034, and the storage battery may be used as a power supply. A storage battery (battery) provided in the airframe 1101 may be used as a power supply.

The power generated by the power generation unit 1003 (power generator 1030) is supplied to the battery 1004 in the housing 1006 via a cable (not shown) and stored. In this embodiment, as shown in FIG. 4, since a plurality of batteries 1004 (more specifically, one battery 1004 on each of the front and rear sides of the power generation unit 1003) are provided in the housing 1006, the power generated by the power generation unit 1003 is supplied to each of the plurality of batteries 1004 and stored.

The power control unit 1005 controls the power supplied from the battery 1004 to the motor 1002. In this embodiment, as shown in FIG. 4, since a plurality of motors 1002 are provided on the housing 1006, a plurality of power control units 1005 are provided in the housing 1006 in correspondence with the number of motors 1002. Under the control of the main control unit 1105, each power control unit 1005 supplies power according to the flying operation of the flying body 1100 from the battery 1004 to the motor 1002, thereby controlling the rotation amount of the propulsion rotor 1001. Note that in this embodiment, an arrangement example in which the power generated by the power generation unit 1003 is temporarily stored in the battery 1004, and the power stored in the battery 1004 is supplied to the motor 1002 has been described. However, the present invention is not limited to this, and the power may directly be supplied from the power generation unit 1003 to the motor 1002 without interposing the battery 1004.

[Flight Control of Flying Body]

An example of flight control of the above-described flying body 1100 will be described next.

Figure 5:
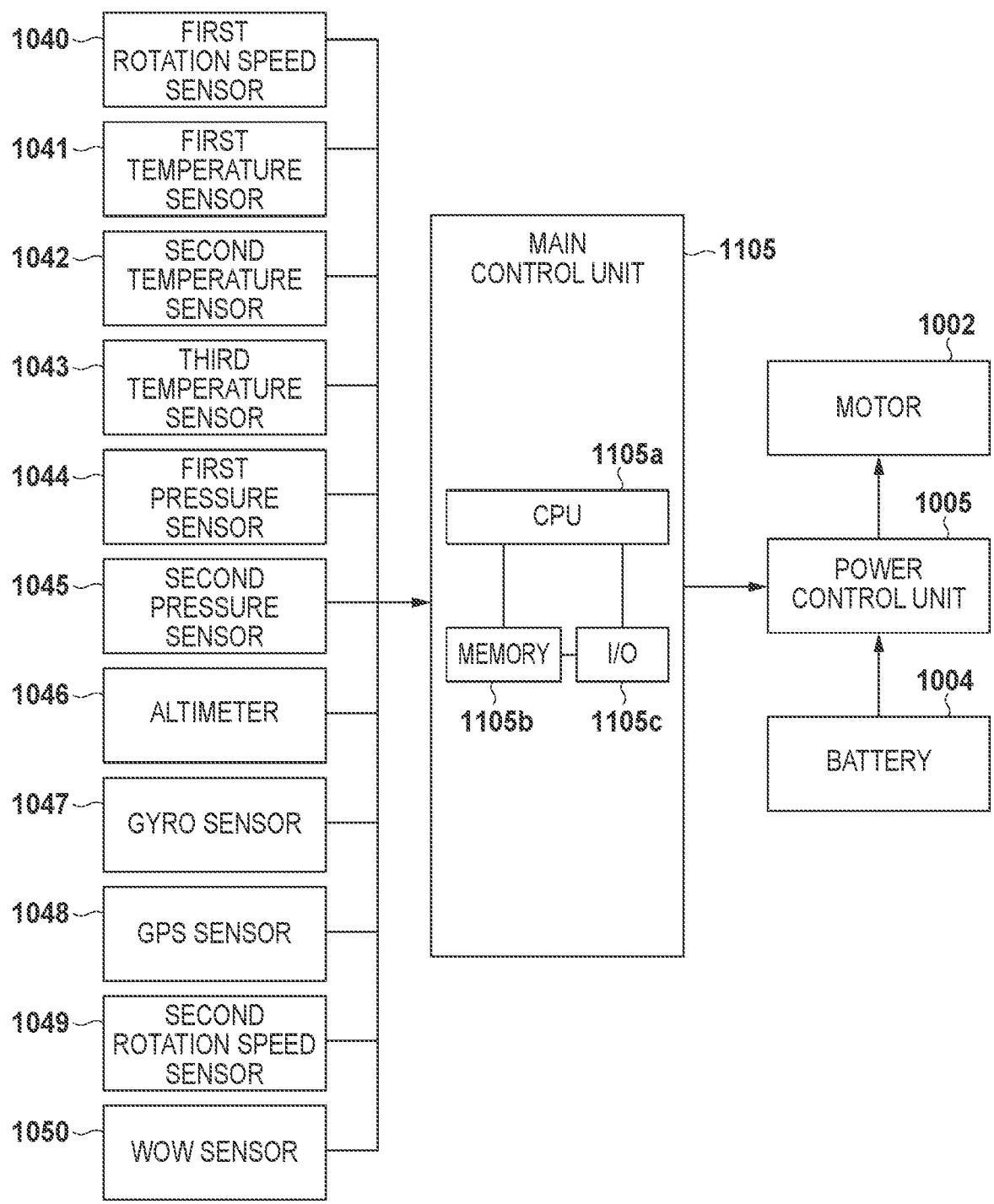
FIG. 5 is a block diagram showing flight control of the flying body according to Embodiment 1-1.

FIG. 5 is a view showing the control block of the flying operation of the flying body 1100, and shows the main control unit 1105 (ECU) and a sensor group provided in the flying body 1100. As shown in FIG. 5, the main control unit 1105 (ECU) can be formed by a microcomputer including at least one processor (CPU) 1105a, a memory 1105b such as a ROM or a RAM, and an I/O 1105c. As described above, the main control unit 1105 can be provided in the airframe 1101 or in the pylon portion 1102. The sensor group can include, for example, a first rotation speed sensor 1040, a first temperature sensor 1041, a second temperature sensor 1042, a third temperature sensor 1043, a first pressure sensor 1044, a second pressure sensor 1045, an altimeter 1046, a gyro sensor 1047, a GPS sensor 1048, a second rotation speed sensor 1049, and a WOW (Weight-On-Wheel) sensor 1050.

The first rotation speed sensor 1040 detects the rotation speed of the rotating shaft 1007 rotationally driven by the gas turbine engine 1010. The first temperature sensor 1041 detects the temperature of air taken from the inlet port Pi of the housing 1006. The second temperature sensor 1042 detects the temperature of the combustion gas discharged from the exhaust port Po. The third temperature sensor 1043 detects the temperature of lubricant oil supplied to the rotating shaft 1007 by a lubricant oil supply system (not shown). The first pressure sensor 1044 detects the external pressure (atmospheric pressure) of the flying body 1100. The second pressure sensor 1045 detects the pressure of air taken from the inlet port Pi. The altimeter 1046 detects the altitude of the flying body 1100. The gyro sensor 1047 detects the tilt of the flying body 1100 concerning each of a pitch axis, a roll axis, and a yaw axis. The GPS sensor 1048 detects the current position of the flying body 1100. The second rotation speed sensor 1049 detects the rotation speed of the motor 1002 (that is, the rotation speed of the propulsion rotor 1001). The WOW sensor 1050 is a sensor that detects application of the weight of the flying body 1100 to the axle.

Based on data obtained by the sensors 1040 to 1050, the main control unit 1105 transmits an instruction signal for controlling the rotation of each propulsion rotor 1001 to each power control unit 1005. Each power control unit 1005 controls the power supplied from the battery 1004 to the motor 1002 based on the instruction signal received from the main control unit 1105. This makes it possible to control the rotation speed of the propulsion rotor 1001 and control the flying operation of the flying body 1100.

Figure 6:
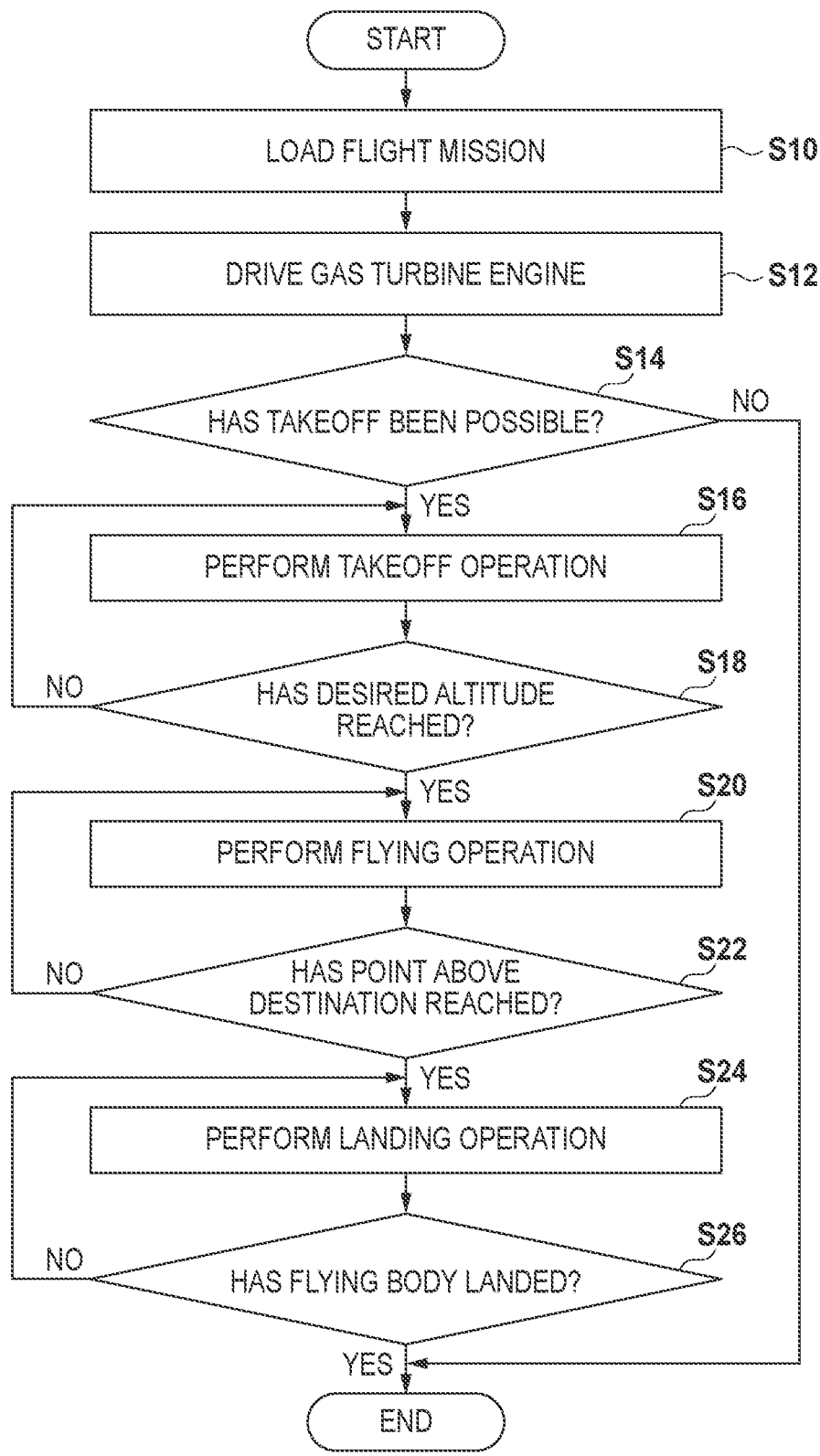
FIG. 6 is a flowchart showing flight control of the flying body according to Embodiment 1-1.

FIG. 6 is a flowchart showing flight control of the flying body 1100. Each process of the flowchart shown in FIG. 6 can be executed by the main control unit 1105.

In step S10, the main control unit 1105 loads a flight mission including a destination, a flight course, and the like input (instructed) by a pilot. After that, the process advances to step S12 to drive the gas turbine engine 1010 by supplying the fuel. Next, the process advances to step S14, and the main control unit 1105 determines whether takeoff is possible. If takeoff is impossible, the processing is ended by skipping the subsequent processes. If takeoff is possible, the process advances to step S16 to perform a takeoff operation. The flying body 1100 according to this embodiment includes the four propulsion rotors 1001a to 1001d, as shown in FIG. 1. In this case, for example, the propulsion rotors 1001a and 1001d are rotated clockwise (CW) by the motors 1002, and the propulsion rotors 1001b and 1001c are rotated counterclockwise (CCW) by the motors 1002, thereby maintaining the posture of the flying body 1100 to a target posture (for example, level).

Next, the process advances to step S18, and the main control unit 1105 determines, based on the detection result of the altimeter 1046, whether the flying body 1100 has reached a desired altitude, that is, whether the takeoff operation is completed. If the flying body 1100 has not reached a predetermined altitude, the process returns to step S16. If the flying body 1100 has reached a predetermined altitude, the process advances to step S20 to perform the flying operation. In the flying operation, based on the detection result of the gyro sensor 1047, the main control unit 1105 flies to the input destination while adjusting the posture of the flying body 1100 in accordance with an instruction of the pilot. Control of the flying direction of the flying body 1100 can be done by adjusting the rotation speeds of the four propulsion rotors 1001.

For example, to fly forward, the rotation speeds of the propulsion rotors 1001a and 1001c on the front side in the four propulsion rotors 1001 are decreased, and the rotation speeds of the propulsion rotors 1001b and 1001d on the rear side are increased. To fly backward, an operation reverse to the above is performed. To turn right, the rotation speeds of the propulsion rotors 1001a and 1001b on the right side are decreased, and the rotation speeds of the propulsion rotors 1001c and 1001d on the left side are increased. To turn left, an operation reverse to the above is performed. To rotate the flying body 1100 counterclockwise (CCW) about the yaw axis, the rotation speeds of the propulsion rotors 1001a and 1001d, which are making CW rotation, are increased, and the rotation speeds of the propulsion rotors 1001b and 1001c, which are making CCW rotation, are decreased. To rotate the flying body 1100 clockwise (CW), an operation reverse to the above is performed.

Next, the process advances to step S22, and the main control unit 1105 determines, based on the detection result of the GPS sensor 1048, whether the flying body has reached a point above the destination. If the flying body has not reached a point above the destination, the process returns to step S20. If the flying body has reached a point above the destination, the process advances to step S24 to transition to a landing operation. The landing operation is performed by gradually lowering the rotation speeds of all the four propulsion rotors 1001a to 1001d. In step S26, the main control unit 1105 determines, based on the detection result of the WOW sensor 1050, whether the flying body 1100 has landed, and repetitively performs step S24 until the landing is completed.

As described above, in the flying body 1100 according to this embodiment, the propulsion apparatus 1103 including the propulsion rotor 1001, the motor 1002, and the power generation unit 1003 is arranged outside the airframe 1101. Since this can avoid occupation of the internal space of the airframe 1101 by the power generation mechanism (power generation unit 1003) and the like, it is possible to simplify the design of the flying body 1100 (particularly the airframe 1101), and it is also possible to expand the cabin and improve the layout property of other constituent components. The motor 1002 that pivotally supports and rotates the propulsion rotor 1001 is connected to the housing 1006, and the propulsion rotor 1001, the motor 1002, and the power generation unit 1003 are integrally constituted by the housing 1006. It is therefore possible to reduce the complexity of wirings and control for sending the power generated by the power generation unit 1003 to the motor 1002, improve the maintainability of the propulsion apparatus 1103, and reduce the weight of the flying body 1100 by shortening the wirings. In addition, when the propulsion apparatus 1103 is configured to be detachable from the airframe 1101 or the pylon portion 1102, the maintainability of the propulsion apparatus 1103 can further be improved, for example, the propulsion apparatus 1103 with a fault can be exchanged with another one (for example, a new one).

Embodiment 1-2

In Embodiment 1-1, the arrangement of the propulsion apparatus 1103 in which the propulsion rotor 1001 is provided on the upper side of the housing 1006 has been described. In this embodiment, the arrangement of a propulsion apparatus 1103' in which a propulsion rotor 1001 is provided on the front side of a housing 1006 will be described. The propulsion apparatus 1103' according to this embodiment can be applied particularly to an electric propulsion type propeller plane or the like. Note that this embodiment basically takes over Embodiment 1-1, and the operations and arrangements of units and mechanisms are the same as in Embodiment 1-1 unless otherwise specified.

Figure 7:
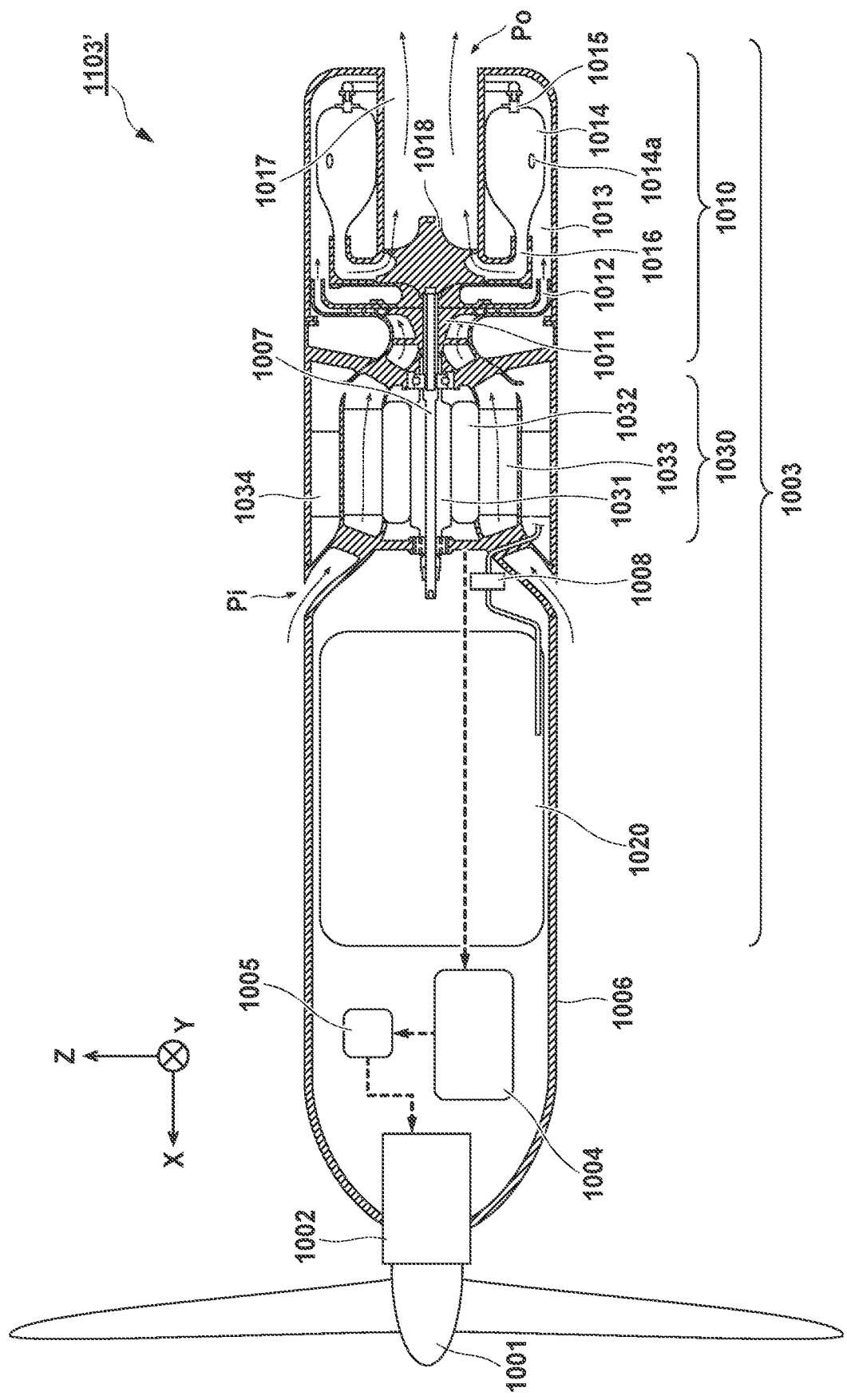
FIG. 7 is a view (sectional view) showing an example of the arrangement of a propulsion apparatus according to Embodiment 1-2.

FIG. 7 is a view (sectional view) showing an example of the arrangement of the propulsion apparatus 1103' according to this embodiment. The propulsion apparatus 1103' is different from the propulsion apparatus 1103 shown in FIG. 4 in that the propulsion rotor 1001 is provided on the front side of the housing 1006, and an exhaust port Po is provided in the rear portion of the housing 1006. The rest of the arrangement is the same as in the propulsion apparatus 1103 shown in FIG. 4, and is the same as described in Embodiment 1-1.

Other Embodiments

In Embodiments 1-1 and 1-2, a helicopter has been exemplified as the flying body 1100. In addition to such a rotorcraft, the propulsion apparatus according to the present invention can be applied not only to aircrafts such as a fixed-wing aircraft and an airship but also to a flying type personal mobility. The fixed-wing aircraft can include a glider aircraft represented by a glider and an aircraft represented by a propeller plane. The present invention is also applicable to a flying body that is not of electric propulsion type.

Figure 8:
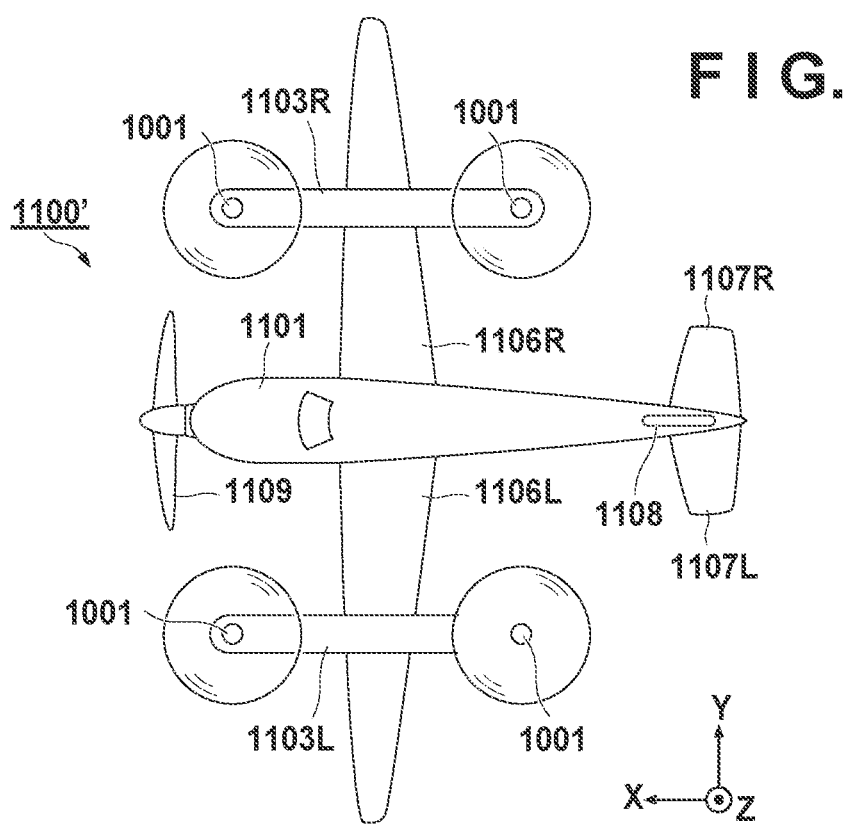
FIG. 8 is a view showing another example of the flying body.

FIG. 8 shows an example in which the propulsion apparatus 1103 is applied to a fixed-wing aircraft 1100'. The fixed-wing aircraft 1100' shown in FIG. 8 can include the airframe 1101, main wings 1106R and 1106L, horizontal stabilizers 1107R and 1107L, and a vertical stabilizer 1108. In addition, the fixed-wing aircraft 1100' is provided with a propeller 1109 on the front side of the airframe 1101. In the example shown in FIG. 8, the propulsion apparatuses 1103R and 1103L are provided on the main wings 1106R and 1106L, respectively. Power generated by the power generation units 1003 of the propulsion apparatuses 1103R and 1103L may be used as the power for the propeller 1109.

Summary of First Embodiment

The first embodiment discloses at least the following propulsion apparatus.
1. A propulsion apparatus according to the first embodiment is
   a propulsion apparatus (for example, 1103) that generates a propulsion force of a flying body (for example, 1100), comprising:
   a propulsion rotor (for example, 1001);
   a motor (for example, 1002) configured to pivotally support and rotate the propulsion rotor;
   power generation unit (for example, 1003) configured to generate power for driving the motor; and
   a housing (for example, 1006) configured to store the power generation unit,
   wherein the housing is arranged outside an airframe (for example, 1101) of the flying body, and
   the motor is connected to the housing.
   According to this arrangement, it is possible to reduce the complexity of wirings and control for sending the power generated by the power generation unit to the motor, improve the maintainability of the propulsion apparatus, and reduce the weight of the flying body by shortening the wirings.
2. In the first embodiment,
   the power generation unit includes a power generator (for example, 1030) having a rotating shaft (for example, 1007), an engine (for example, 1010) configured to rotationally drive the rotating shaft, and a tank (for example, 1020) configured to store fuel of the engine, and
   the power generator, the engine, and the tank are arrayed along a front-and-rear direction of the flying body.
   According to this arrangement, it is possible to arrange the engine and the power generator without wasting a space and make the apparatus compact.
3. In the first embodiment,
   the housing has an outer shape extended along a front-and-rear direction of the flying body.
   According to this arrangement, it is possible to reduce the air resistance during forward flight of the flying body.
4. In the first embodiment,
   the propulsion apparatus comprises, in the housing, a battery (for example, 1004) configured to store the power generated by the power generation unit.
   According to this arrangement, it is possible to reduce the complexity of wirings and control for sending the power generated by the power generation unit to the battery, improve the maintainability of the propulsion apparatus, and reduce the weight of the flying body by shortening the wirings.
5. In the first embodiment,
   the propulsion apparatus comprises at least two mechanisms each including the propulsion rotor and the motor, and
   the power generation unit is arranged between the at least two mechanisms in a front-and-rear direction of the flying body.
   According to this arrangement, since the plurality of propulsion rotors can be rotationally driven by the power generated by one power generation unit, the propulsion apparatus can be made compact.
6. In the first embodiment,
   the propulsion rotor and the motor are provided on an upper side of the housing in an up-and-down direction of the flying body.

According to this arrangement, it is possible to apply the propulsion apparatus according to the present invention to a flying body such as a helicopter.

7. In the first embodiment,
the propulsion rotor and the motor are provided on a front side of the housing in a front-and-rear direction of the flying body.

According to this arrangement, it is possible to apply the propulsion apparatus according to the present invention to a flying body such as a helicopter.

Second Embodiment

In a flying body, the weight difference between the left and right sides is required to be reduced for stable flight. Arranging an engine and a power generator on each of the right and left sides of the flying body is redundant, and may be disadvantage from the viewpoint of the cost of the flying body.

It is an object of this embodiment to provide a technique advantageous from the viewpoint of the cost of an electric propulsion type flying body.

Embodiment 2-1

Figure 9:
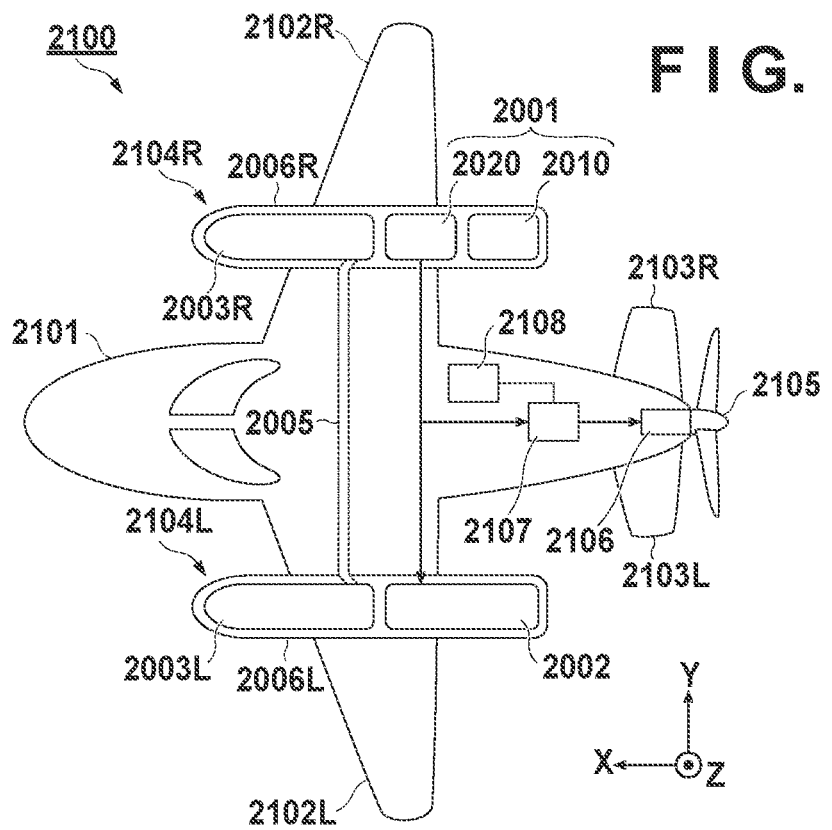
FIG. 9 is a schematic view of a flying body according to Embodiment 2-1.

FIG. 9 is a schematic view of a flying body 2100 according to Embodiment 2-1. In FIG. 9, arrows X, Y, and Z represent the front-and-rear direction, the widthwise direction (left-and-right direction), and the up-and-down direction of the flying body 2100, respectively. The flying body 2100 according to this embodiment is an electric propulsion type flying body that rotates a propulsion rotor 2105 (or a propeller) using a motor as a driving source, and is more specifically a fixed-wing aircraft (propeller plane) including the propulsion rotor 2105.

The flying body 2100 can include, for example, an airframe 2101 with a cabin (a passenger cabin and a cockpit), main wings 2102R and 2102L, horizontal stabilizers 2103R and 2103L, a plurality of power supply apparatuses 2104 (2104R and 2104L), and the propulsion rotor 2105 (propeller) that generates the thrust of the flying body 2100. In addition, the airframe 2101 is provided with a motor 2106, a power control unit 2107, and a main control unit 2108. The motor 2106 rotates the propulsion rotor 2105 by power supplied from the plurality of power supply apparatuses 2104. The power control unit 2107 is, for example, a PCU (Power Control Unit), and controls the power supplied from the power supply apparatus 2104 to the motor 2106. The main control unit 2108 is, for example, an ECU (Electronic Control Unit), and includes a processor represented by a CPU, a storage device such as a semiconductor memory, an interface to an external device, and the like. The main control unit 2108 controls the flying operation of the flying body 2100 by controlling the rotation of the propulsion rotor 2105 by the motor 2106 via the power control unit 2107. In the example shown in FIG. 9, the propulsion rotor 2105 is provided on the rear side of the airframe 2101. However, the present invention is not limited to this, and the propulsion rotor 2105 may be provided on the front side of the airframe 2101, or may be provided on the upper side of the airframe 2101.

Each of the plurality of power supply apparatuses 2104 is an apparatus that generates and stores power used by the flying body 2100, for example, power used to drive the motor 2106, and is arranged outside the airframe 2101. When the plurality of power supply apparatuses 2104 are arranged outside the airframe 2101, occupation of the internal space of the airframe 2101 by a power generation mechanism and the like can be avoided, and it is possible to expand the cabin, improve the layout property of other constituent components, and improve the maintainability of the power supply apparatuses 2104.

In the flying body 2100 according to this embodiment, the plurality of power supply apparatuses 2104 are provided on the upper side of the main wings 2102R and 2102L, respectively. More specifically, as shown in FIG. 9, the power supply apparatus 2104R is provided on the upper side of the main wing 2102R on the right side, and the power supply apparatus 2104L is provided on the upper side of the main wing 2102L on the left side. The power supply apparatus 2104R provided on the main wing 2102R on the right side (that is, the right side with respect to the airframe 2101) will sometimes be referred to as the "right-side power supply apparatus 2104R", and the power supply apparatus 2104L provided on the main wing 2102L on the left side (that is, the left side with respect to the airframe 2101) will sometimes be referred to as the "left-side power supply apparatus 2104L" hereinafter. The number of power supply apparatuses 2104 is not limited to two, and may be three or more. To keep the balance of the air resistance or weight on the left and right sides of the flying body 2100, the power supply apparatuses 2104 in the same number are preferably arranged on the left and right sides of the airframe 2101.

Each of the plurality of power supply apparatuses 2104 is a unit that generates and stores power used to drive the motor 2106, and includes a power generation unit 2001 that generates power, and a battery 2002 (power storage unit) that stores the power. However, when both the power generation unit 2001 and the battery 2002 are provided in each of the plurality of power supply apparatuses 2104 (the right-side power supply apparatus 2104R and the left-side power supply apparatus 2104L) arranged on the left and right sides of the airframe 2101, the arrangement is redundant, and it may be disadvantage from the viewpoint of the cost of the flying body 2100. For example, the power generation unit 2001 is a module formed by a gas turbine engine 2010 and a power generator 2020 and is expensive. If the power generation unit 2001 is provided in each of the plurality of power supply apparatuses 2104, it may be difficult to reduce the cost of the flying body 2100. In the flying body 2100 according to this embodiment, the power generation unit 2001 is provided in one of the right-side power supply apparatus 2104R and the left-side power supply apparatus 2104L, and the battery 2002 is provided in the other. An example in which the power generation unit 2001 is provided in the right-side power supply apparatus 2104R, and the battery 2002 is provided in the left-side power supply apparatus 2104L, as shown in FIG. 9, will be described below.

Figure 10:
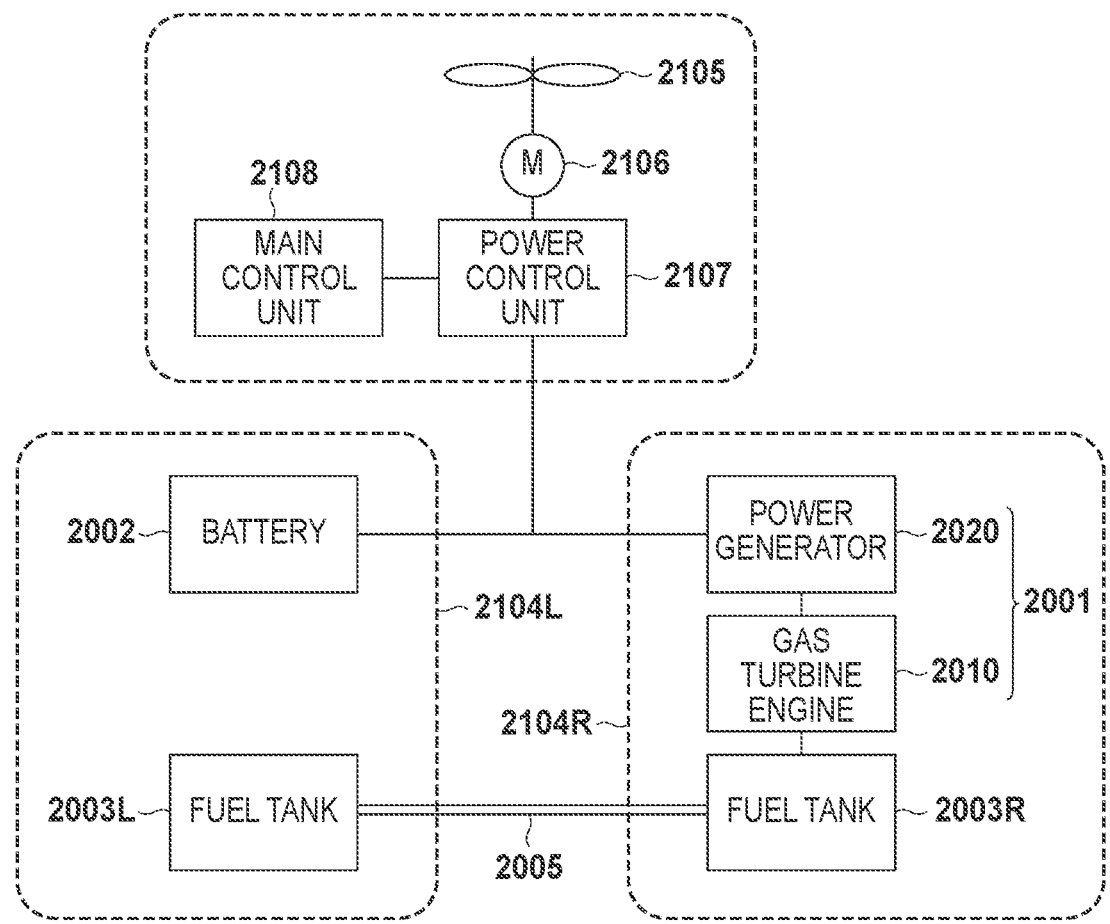
FIG. 10 is a block diagram showing an example of the arrangement of the flying body according to Embodiment 2-1.

FIG. 10 is a block diagram showing an example of the arrangement of the flying body 2100. FIG. 10 shows the airframe 2101, the right-side power supply apparatus 2104R, and the left-side power supply apparatus 2104L.

The propulsion rotor 2105, the motor 2106 that pivotally supports and rotates the propulsion rotor 2105, the power control unit 2107 that controls the power supplied to the motor 2106, and the main control unit 2108 that controls the flying operation of the flying body 2100 are provided in the airframe 2101. Under the control of the main control unit 2108, the power control unit 2107 supplies power according to the flying operation of the flying body 2100 from the battery 2002 to the motor 2106, thereby controlling the rotation amount of the propulsion rotor 2105. Note that in this embodiment, an arrangement example in which the power generated by the power generation unit 2001 is temporarily stored in the battery 2002, and the power stored in the battery 2002 is supplied to the motor 2106 has been described. However, the present invention is not limited to this, and the power may directly be supplied from the power generation unit 2001 to the motor 2106 without interposing the battery 2002.

The right-side power supply apparatus 2104R (first power supply apparatus) includes the power generation unit 2001 and a fuel tank 2003R. The power generation unit 2001 includes the gas turbine engine 2010, and the power generator 2020 that generates power by the output of the gas turbine engine 2010. The fuel tank 2003R reserves the fuel of the gas turbine engine 2010. As the fuel of the gas turbine engine 2010, methanol, gasoline, or the like is used. On the other hand, the left-side power supply apparatus 2104L (second power supply apparatus) includes the battery 2002, and a fuel tank 2003L. The battery 2002 stores the power generated by the power generation unit 2001 (power generator 2020) in the right-side power supply apparatus 2104R. The fuel tank 2003L reserves the fuel of the gas turbine engine 2010. The fuel tank 2003R in the right-side power supply apparatus 2104R and the fuel tank 2003L in the left-side power supply apparatus 2104L communicate with each other via a communicating pipe 2005. It is therefore possible to make the amounts of fuel reserved in the fuel tank 2003R and the fuel tank 2003L equal and keep the balance on the left and right sides of the flying body 2100. Here, the fuel tank 2003R in the right-side power supply apparatus 2104R and the fuel tank 2003L in the left-side power supply apparatus 2104L are configured such that the difference between the reservable capacities of fuel falls within an allowable range from the viewpoint of keeping the balance on the left and right sides of the flying body 2100. For example, the fuel tank 2003R and the fuel tank 2003L are preferably configured such that the reservable capacities of fuel become similar (for example, equal).

[Example of Arrangement of Right-Side Power Supply Apparatus]

Figure 11:
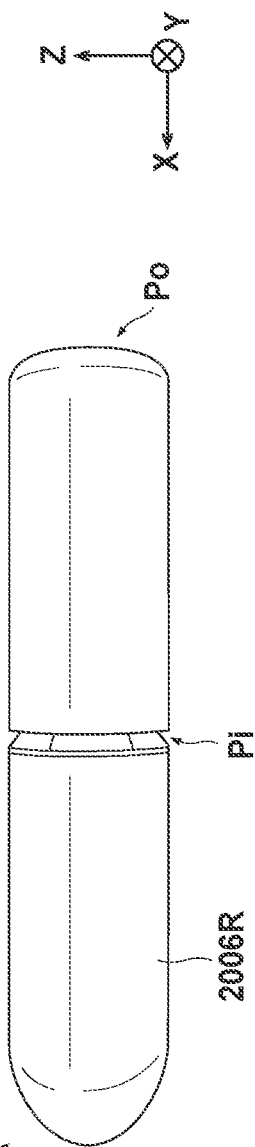
FIG. 11 is an outer view of a right-side power supply apparatus in Embodiment 2-1.
Figure 12:
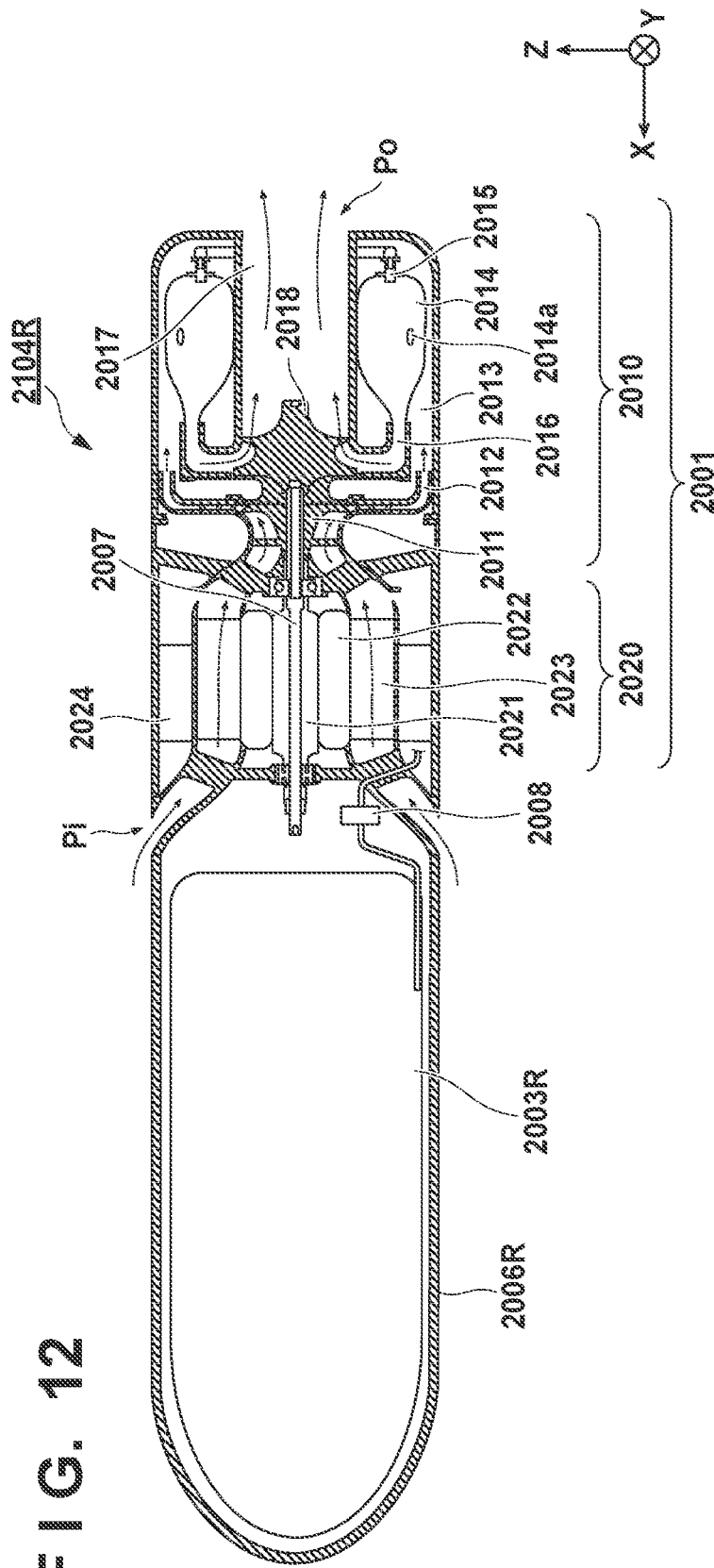
FIG. 12 is a sectional view of the right-side power supply apparatus in Embodiment 2-1.

An example of the arrangement of the right-side power supply apparatus 2104R will be described next with reference to FIGS. 11 and 12. FIG. 11 is an outer view of the right-side power supply apparatus 2104R, and FIG. 12 is a sectional view of the right-side power supply apparatus 2104R. Note that in FIG. 12, an arrow indicates the path of a gas.

The right-side power supply apparatus 2104R includes a hollow housing 2006R (first housing) that forms the outer wall. The housing 2006R has an outer shape extended along the X direction (that is, a pod-like outer shape long along the X direction). When the housing 2006R arranged outside the airframe 2101 has such an outer shape, the air resistance during forward flight of the flying body 2100 can be reduced. Since the body portion of the housing 2006R according to this embodiment has a cylindrical shape, the influence of a cross wind can be made smaller. In addition, the distal end portion of the housing 2006R has a tapered shape whose diameter is reduced toward the front side. In this embodiment, the distal end portion of the housing 2006R is formed into a hemispherical shape but may have a triangular pyramid shape. When the distal end portion is formed into a tapered shape, the air resistance during forward flight of the flying body 2100 can further be reduced. Here, the shape of the housing 2006R is not limited to a cylindrical shape, and may be a square tubular shape or another tubular shape. In addition, the housing 2006R may include a portion with a cylindrical shape and a portion with a square tubular shape.

The housing 2006R stores the power generation unit 2001 and the fuel tank 2003R. As described above, the power generation unit 2001 includes the gas turbine engine 2010, and the power generator 2020 that generates power by the output of the gas turbine engine 2010. The fuel tank 2003R reserves the fuel (methanol, gasoline, or the like) of the gas turbine engine 2010. The gas turbine engine 2010, the power generator 2020, and the fuel tank 2003R are preferably arrayed along the front-and-rear direction (X direction) of the flying body 2100. In this embodiment, the power generator 2020 is arranged between the gas turbine engine 2010 and the fuel tank 2003R in the front-and-rear direction of the flying body 2100. In addition, the gas turbine engine 2010 and the power generator 2020 are provided on a common rotating shaft 2007 (coaxially). When the gas turbine engine 2010 rotationally drives the rotating shaft 2007, the power generator 2020 can generate power. With this arrangement, it is possible to arrange the gas turbine engine 2010 and the power generator 2020 without wasting a space and make the apparatus compact. Note that the power generated by the power generation unit 2001 (power generator 2020) is supplied to the battery 2002 in the left-side power supply apparatus 2104L via a cable (not shown) and stored.

The gas turbine engine 2010 includes a compressor including an impeller 2011 and a diffuser 2012. The impeller 2011 is attached to the rotating shaft 2007. Air taken from an inlet port Pi is sent to a compression chamber 2013 while being compressed via the diffuser 2012 along with the rotation of the impeller 2011. As shown in FIG. 12, the compression chamber 2013 is a closed space defined between a tubular outer circumferential case (housing 2006R) surrounding the gas turbine engine 2010 and a tubular inner circumferential case that is arranged inside the outer circumferential case and constitutes the outer wall of an exhaust pipe 2017. The compressed air held in the compression chamber 2013 is taken from an opening portion 2014a provided in the circumferential wall of a combustion chamber 2014 into the combustion chamber 2014. The combustion chamber 2014 is provided with a fuel injection nozzle 2015, and the fuel supplied from the fuel tank 2003R by a supply pump 2008 (supply unit) via a pipe is injected into the combustion chamber 2014 by the fuel injection nozzle 2015. At the time of start, an ignition device (not shown) ignites the gas mixture in the combustion chamber 2014. After that, combustion of the gas mixture continuously occurs in the combustion chamber 2014. A combustion gas that has obtained a high temperature and a high pressure in the combustion chamber 2014 jets out from a turbine nozzle 2016 to the tubular exhaust pipe 2017, rotates a turbine 2018 attached to the rotating shaft 2007, and is discharged to the rear side from an exhaust port Po provided in the rear portion of the power supply apparatus 2104R (housing 2006R).

The impeller 2011, the turbine 2018, and a rotor 2021 (permanent magnet or the like) of the power generator 2020 to be described later are provided on the rotating shaft 2007, and the impeller 2011 and the rotor 2021 can integrally be rotated by the rotation of the turbine 2018. Note that in this embodiment, the gas turbine engine 2010 exclusively aims at driving the power generator 2020, and actively using the exhaust gas flow as the propulsion force of the flying body 2100 is not assumed. However, a mode in which the exhaust gas flow is used as an auxiliary propulsion force is also possible.

The power generator 2020 includes the rotor 2021 such as a permanent magnet attached to the rotating shaft 2007, and a stator 2022 such as a coil disposed around the rotor 2021. When the rotating shaft 2007 is rotated by the gas turbine engine 2010, and the rotor 2021 attached to the rotating shaft 2007 rotates accordingly, the stator 2022 can generate power. In addition, a plurality of fins 2023 configured to cool the stator 2022 are provided around the stator 2022 in the circumferential direction of the rotating shaft 2007. The plurality of fins 2023 are arranged in a space to which the air taken from the inlet port Pi is guided. When the air passes between the plurality of fins 2023, the plurality of fins 2023 are cooled, and the stator 2022 can accordingly be cooled.

In addition, the power generation unit 2001 includes a power generation control unit 2024. The power generation control unit 2024 includes a circuit that controls power generation of the power generator 2020, and a circuit that controls driving of the gas turbine engine 2010. The power generation control unit 2024 may use the battery 2002 in the left-side power supply apparatus 2104L as a power supply. A storage battery (battery) may uniquely be provided in the power generation control unit 2024, and the storage battery may be used as a power supply. A storage battery (battery) provided in the airframe 2101 may be used as a power supply.

[Example of Arrangement of Left-Side Power Supply Apparatus]

An example of the arrangement of the left-side power supply apparatus 2104L will be described next.

The left-side power supply apparatus 2104L includes a hollow housing 2006L (second housing) that forms the outer wall. The housing 2006L has an outer shape similar to that of the housing 2006R (first housing) of the right-side power supply apparatus 2104R shown in FIG. 11, and is arranged apart (separated) from the housing 2006R. When the housing 2006R of the right-side power supply apparatus 2104R and the housing 2006L of the left-side power supply apparatus 2104L are formed into similar outer shapes (for example, the same outer shape), it is possible to reduce the difference in the air resistance during forward flight of the flying body 2100 and make the flying body 2100 stably fly.

As shown in FIG. 9 and the like, the battery 2002 and the fuel tank 2003L are stored in the housing 2006L. The battery 2002 stores the power generated by the power generator 2020 in the right-side power supply apparatus 2104R. The battery 2002 is preferably provided such that its total weight becomes similar (for example, equal) to the total weight of the power generation unit 2001 (the gas turbine engine 2010 and the power generator 2020) in the right-side power supply apparatus 2104R. More specifically, the battery 2002 is preferably provided such that the difference between the weight of the battery 2002 and the weight of the power generation unit 2001 falls within an allowable range. The allowable range can be set to, for example, the range of the balance difference on the left and right sides in which the flying body 2100 can stably fly.

If the housing 2006L of the left-side power supply apparatus 2104L has an outer shape similar to that of the housing 2006R of the right-side power supply apparatus 2104R shown in FIG. 11, the inlet port Pi and the exhaust port Po are preferably used to cool the battery 2002. For example, the battery 2002 is preferably configured such that air taken from the inlet port Pi passes between a plurality of battery cells in the battery 2002 and is discharged from the exhaust port Po.

[Flight Control of Flying Body]

An example of flight control of the above-described flying body 2100 will be described next.

Figure 13:
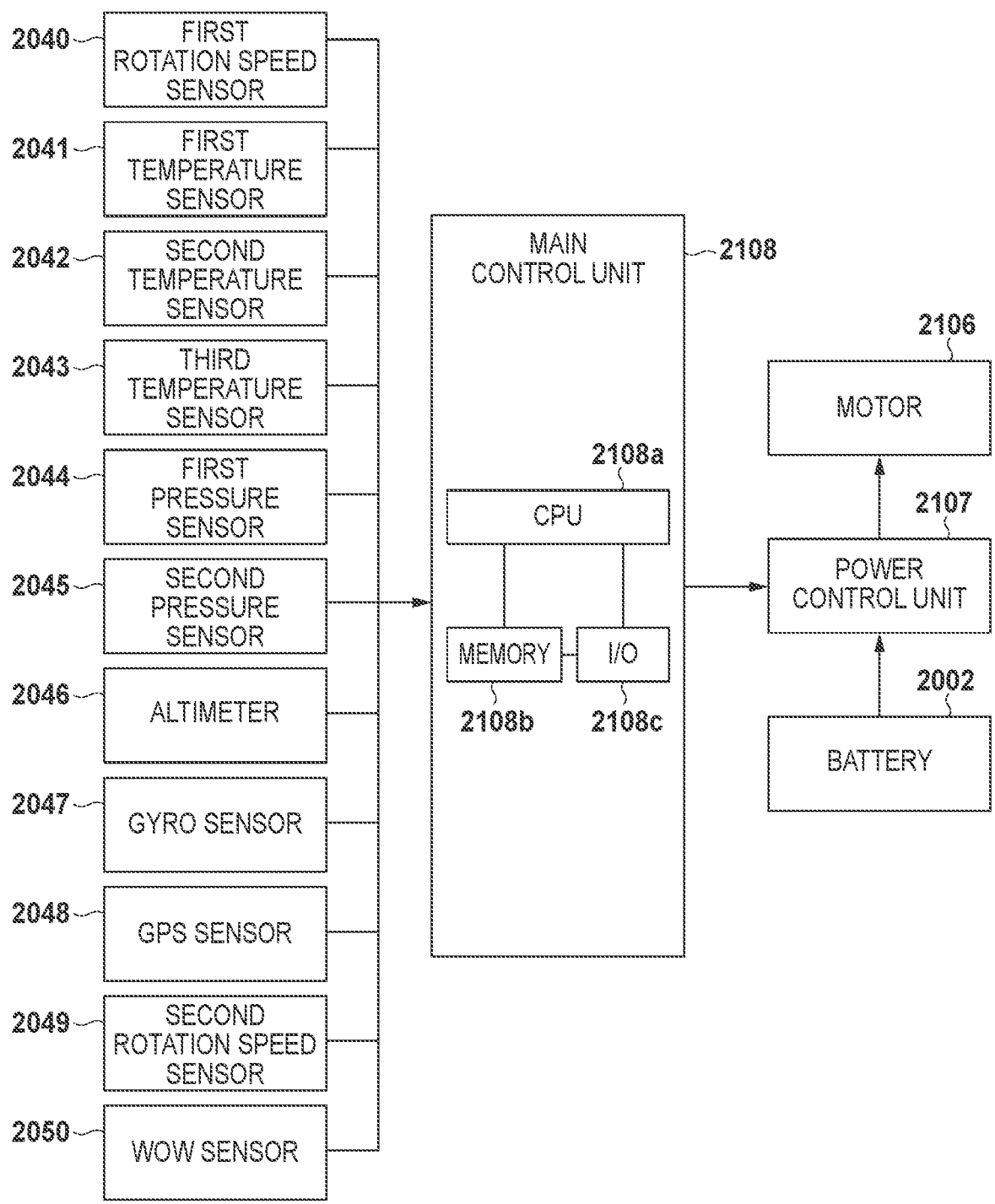
FIG. 13 is a block diagram showing flight control of the flying body according to Embodiment 2-1.

FIG. 13 is a view showing the control block of the flying operation of the flying body 2100, and shows the main control unit 2108 (ECU) and a sensor group provided in the flying body 2100. As shown in FIG. 13, the main control unit 2108 (ECU) can be formed by a microcomputer including at least one processor (CPU) 2108a, a memory 2108b such as a ROM or a RAM, and an I/O 2108c. As described above, the main control unit 2108 can be provided in the airframe 2101. The sensor group can include, for example, a first rotation speed sensor 2040, a first temperature sensor 2041, a second temperature sensor 2042, a third temperature sensor 2043, a first pressure sensor 2044, a second pressure sensor 2045, an altimeter 2046, a gyro sensor 2047, a GPS sensor 2048, a second rotation speed sensor 2049, and a WOW (Weight-On-Wheel) sensor 2050. The detection processes of the sensors 2040 to 2050 are the same as those of the sensors 1040 to 1050 of the first embodiment.

Based on data obtained by the sensors 2040 to 2050, the main control unit 2108 transmits an instruction signal for controlling the rotation of the propulsion rotor 2105 to the power control unit 2107. The power control unit 2107 controls the power supplied from the battery 2002 to the motor 2106 based on the instruction signal received from the main control unit 2108. This makes it possible to control the rotation speed of the propulsion rotor 2105 and control the flying operation of the flying body 2100. In addition, the main control unit 2108 can perform flight control of the flying body 2100 in accordance with the flowchart of FIG. 6 described in the first embodiment.

As described above, the flying body 2100 according to this embodiment includes the plurality of power supply apparatuses 2104 (the right-side power supply apparatus 2104R and the left-side power supply apparatus 2104L) that generate and store power used to drive the motor 2106. The power generation unit 2001 is provided in one of the right-side power supply apparatus 2104R and the left-side power supply apparatus 2104L, and the battery 2002 is provided in the other. With this arrangement, it is possible to avoid a redundant arrangement and ensure advantage from the viewpoint of the cost of the flying body 2100 as compared to an arrangement in which both the power generation unit 2001 and the battery 2002 are provided in each of the plurality of power supply apparatuses 2104 (housings 2006R and 2006L). That is, the power generation unit 2001 (the gas turbine engine 2010 and the power generator 2020) that is expensive is provided in only one of the right-side power supply apparatus 2104R and the left-side power supply apparatus 2104L, thereby reducing the cost of the flying body 2100. In the flying body 2100 according to this embodiment, one power supply apparatus 2104 (right-side power supply apparatus 2104R) including the power generation unit 2001 and one power supply apparatus 2104 including the battery 2002 are arranged. However, a plurality of power supply apparatuses may be arranged in accordance with the weight or flight distance of the flying body 2100. In this case as well, the plurality of power supply apparatuses 2104 are preferably arranged such that the balance difference on the left and right sides of the flying body 2100 falls within an allowable range.

Embodiment 2-2

Figure 14:
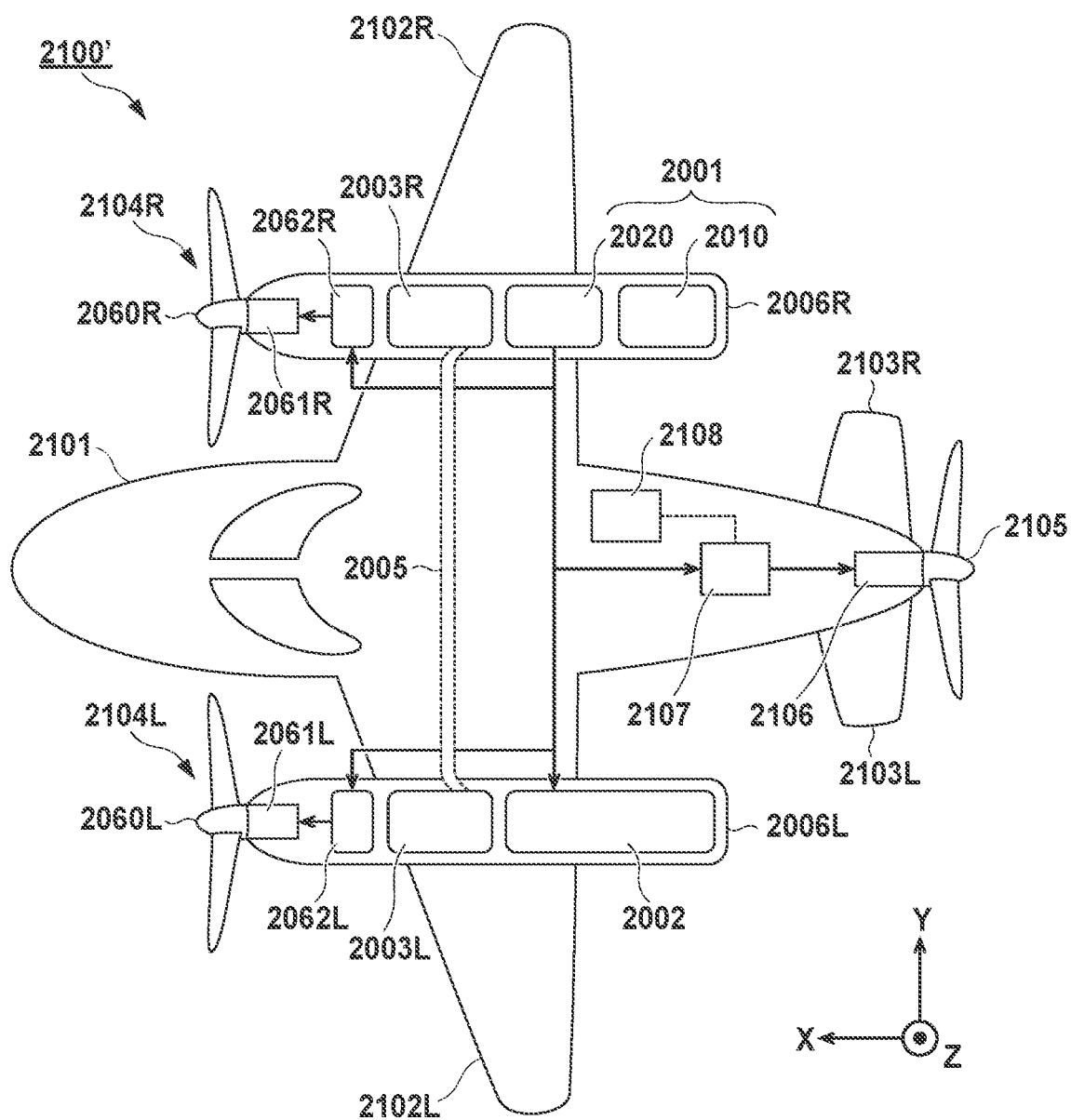
FIG. 14 is a schematic view of a flying body according to Embodiment 2-2.
Figure 15:
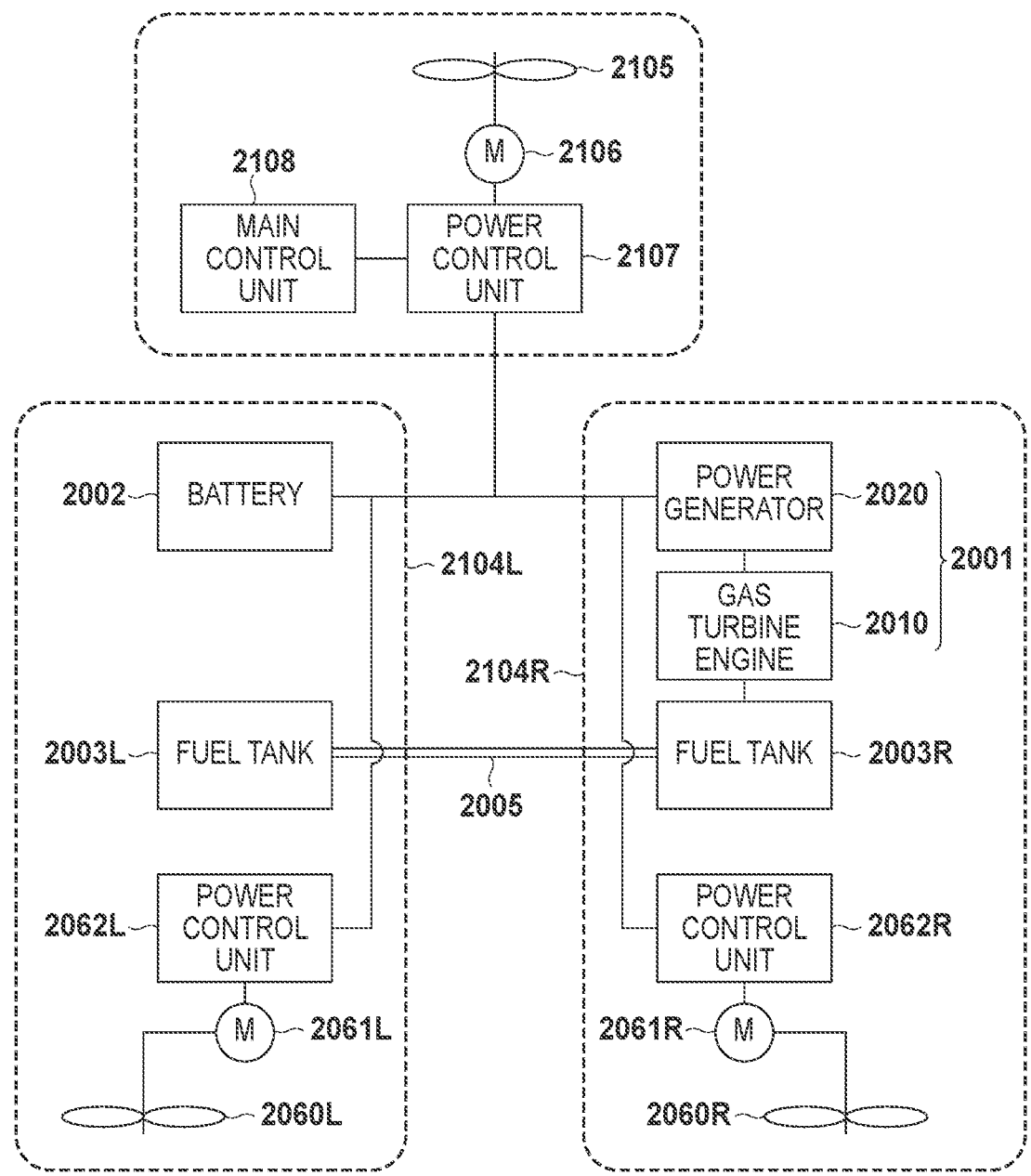
FIG. 15 is a block diagram showing an example of the arrangement of the flying body according to Embodiment 2-2.

In Embodiment 2-2, an arrangement example in which a propulsion rotor is provided for each of a plurality of power supply apparatuses 2104 will be described. FIG. 14 is a schematic view of a flying body 2100' according to this embodiment, and FIG. 15 is a block diagram showing an example of the arrangement of the flying body 2100' according to this embodiment. Note that in the example shown in FIGS. 14 and 15, a propulsion rotor 2105, a motor 2106, and a power control unit 2107 are provided in an airframe 2101. However, in the arrangement of this embodiment in which the propulsion rotor is provided for each power supply apparatus 2104 the propulsion rotor 2105, the motor 2106, and the power control unit 2107 need not always be provided in the airframe 2101.

In the flying body 2100' according to this embodiment, as shown in FIGS. 14 and 15, a propulsion rotor 2060, a motor 2061, and a power control device 2062 are provided for each of the plurality of power supply apparatuses 2104. More specifically, a propulsion rotor 2060R, a motor 2061R, and a power control device 2062R are provided for a right-side power supply apparatus 2104R, and a propulsion rotor 2060L, a motor 2061L, and a power control device 2062L are provided for a left-side power supply apparatus 2104L. Each of the power control devices 2062R and 2062L is, for example, a PCU (Power Control Unit). Under the control of a main control unit 2108, the power control devices 2062R and 2062L supply power according to the flying operation of the flying body 2100' from a battery 2002 to the motors 2061R and 2061L, respectively, thereby controlling the rotation amounts of the propulsion rotors 2060R and 2060L, respectively. Note that the rest of the arrangement is the same as in Embodiment 2-1. A power generation unit 2001 (a gas turbine engine 2010 and a power generator 2020) can be provided in the right-side power supply apparatus 2104R, and the battery 2002 can be provided in the left-side power supply apparatus 2104L.

Other Embodiments

In Embodiments 2-1 and 2-2, a fixed-wing aircraft (propeller plane) has been exemplified as the flying body 2100. The present invention can be applied not only to a rotorcraft such as a helicopter and an aircraft such as an airship but also to a flying type personal mobility.

Summary of Second Embodiment

The second embodiment discloses at least the following flying body.
1. A flying body according to the second embodiment is an electric propulsion type flying body (for example, 2100, 2100') comprising:
   a propulsion rotor (for example, 2105, 2060R, 2060L);
   a motor (for example, 2106, 2061R, 2061L) configured to pivotally support and rotate the propulsion rotor;
   power generation unit (for example, 2001) configured to generate power for driving the propulsion rotor;
   power storage unit (for example, 2002) configured to store the power generated by the power generation unit; and
   a first housing (for example, 2006R) and a second housing (for example, 2006L), which are arranged apart from each other outside an airframe (for example, 2101) of the flying body,
   wherein the power generation unit is stored in the first housing, and the power storage unit is stored in the second housing.

According to this arrangement, it is possible to avoid a redundant arrangement and ensure advantage from the viewpoint of the cost of the flying body as compared to an arrangement in which both the power generation unit and the power storage unit are provided in each of the plurality of housings provided outside the airframe. That is, the power generation unit that is expensive is provided in only one of the plurality of housings, thereby reducing the cost of the flying body.

2. In the second embodiment,
   the first housing is arranged on one of a right side and a left side of the airframe, and the second housing is arranged on the other side.

According to this arrangement, it is advantageous in reducing unevenness (unbalance) between the left and right sides of the airframe caused by the difference in the air resistance, the weight, and the like between the first housing and the second housing.

3. In the second embodiment,
   the first housing and the second housing have the same outer shape.

According to this arrangement, it is advantageous in reducing unevenness (unbalance) of the airframe caused by the difference in the air resistance between the first housing and the second housing.

4. In the second embodiment,
   the propulsion rotor (for example, 2105) and the motor (for example, 2106) are provided in the airframe.

According to this arrangement, since the power used to drive the propulsion rotor and the motor provided in the airframe can be generated and stored outside the airframe, the degree of freedom in designing the airframe (for example, a cabin) can be improved.

5. In the second embodiment,
   the propulsion rotor (for example, 2060R, 2060L) and the motor (for example, 2061R, 2061L) are provided in each of the first housing and the second housing.

According to this arrangement, since the propulsion rotor and the motor can be provided outside the airframe, the degree of freedom in designing the airframe (for example, a cabin) can further be improved.

6. In the second embodiment,
   the power generation unit includes a power generator (for example, 2020) having a rotating shaft (for example, 2007), and an engine (for example, 2010) configured to rotationally drive the rotating shaft, and
   in the first housing, the power generator and the engine are arrayed along a front-and-rear direction of the flying body.

According to this arrangement, it is possible to arrange the engine and the power generator without wasting a space and make the first housing compact.

7. In the second embodiment,
   each of the first housing and the second housing includes a tank (for example, 2003R, 2003L) configured to reserve fuel of the engine.

According to this arrangement, since it is possible to load, in the flying body, more fuel of the engine used to generate power, it is advantageous in long distance flight.

8. In the second embodiment,
   the tank (for example, 2003R) included in the first housing and the tank (for example, 2003L) included in the second housing are configured such that a difference between reservable capacities of the fuel falls within an allowable range.

According to this arrangement, it is advantageous in reducing unevenness (unbalance) of the airframe caused by the weight difference between the fuel reserved in the tank of the first housing and the fuel reserved in the tank of the second housing.

9. In the second embodiment,
the tank (for example, 2003R) included in the first housing and the tank (for example, 2003L) included in the second housing communicate via a communicating pipe (for example, 2005).

According to this arrangement, it is advantageous in equalizing the fuel reserved in the tank of the first housing and the fuel reserved in the tank of the second housing and reducing unevenness (unbalance) of the airframe caused by the difference between the fuel weights even in a state in which the fuel is consumed to some extent.

10. In the second embodiment,
the power storage unit stored in the second housing is configured such that a difference between a weight of the power storage unit and a weight of the power generation unit in the first housing falls within an allowable range.

According to this arrangement, it is advantageous in reducing unevenness (unbalance) of the airframe caused by the weight difference between the power generation unit and the power storage unit.

Third Embodiment

In an arrangement in which a power supply apparatus such as a battery is disposed in the airframe of a flying body, like U.S. Pat. No. 9,248,908, to ensure the disposition space, the degree of freedom in designing another space in the airframe such as a cabin space lowers.

If a housing that stores a fuel tank and a power supply apparatus is provided outside the airframe of the flying body to ensure a space in the airframe, an impact load generated by collision of an external foreign object such as hail or bird strike at the time of flight may be applied to the fuel tank, resulting in breakage of the fuel tank or fuel leakage.

Considering the above-described problem, it is an object of this embodiment to provide a flying body including a power supply apparatus capable of preventing breakage of a fuel tank or fuel leakage even if an impact load from the outside is applied.

Embodiment 3-1

Figure 16:
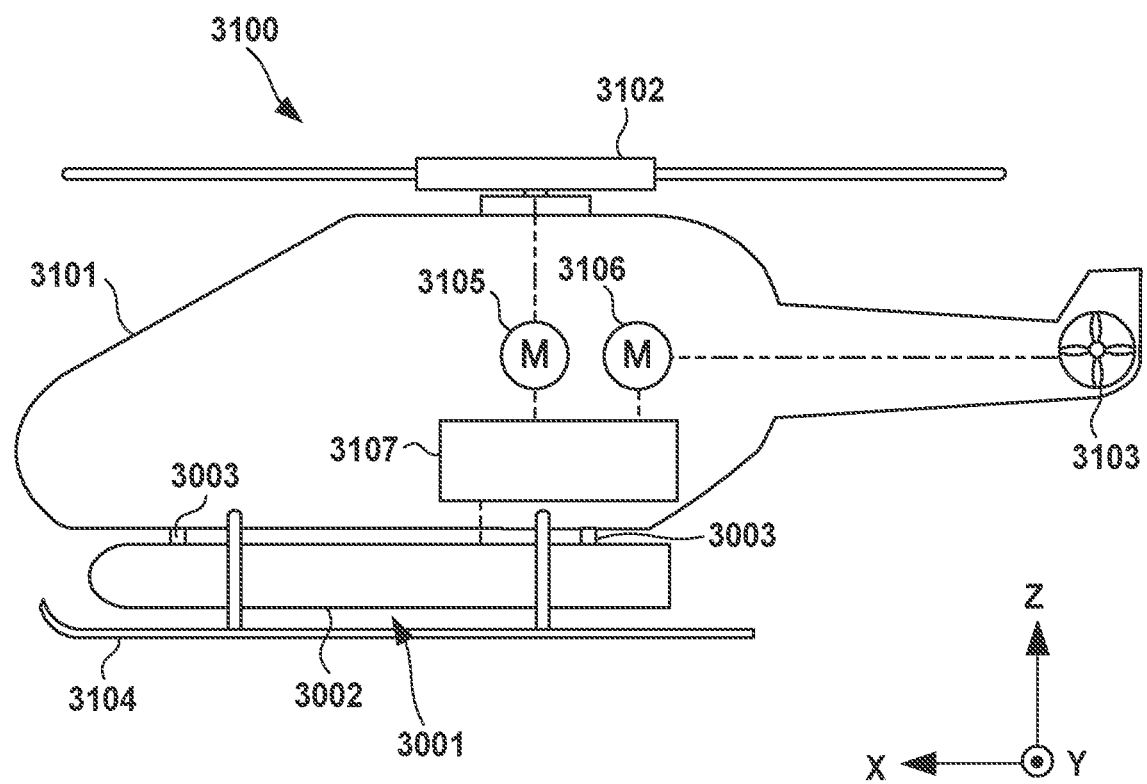
FIG. 16 is a schematic view of a flying body including a power supply apparatus according to Embodiment 3-1.

FIG. 16 is a schematic view of a flying body 3100 including a power supply apparatus 3001 according to Embodiment 3-1. In FIG. 16, arrows X, Y, and Z represent the front-and-rear direction, the widthwise direction (left-and-right direction), and the up-and-down direction of the flying body 3100, respectively. The flying body 3100 according to this embodiment is an electric propulsion type flying body using motors 3105 and 3106 as driving sources and, more particularly, a helicopter.

The flying body 3100 includes an airframe 3101, a main rotor 3102 provided on the upper side of the airframe 3101, a tail rotor 3103 provided in the rear portion of the airframe 3101, and a skid 3104. The motor 3105 is a driving source that rotates the main rotor 3102, and the motor 3106 is a driving source that rotates the tail rotor 3103. Driving of the motors 3105 and 3106 is controlled by a control device 3107 using power supplied from a power supply apparatus 3001.

The power supply apparatus 3001 functions as the main power supply of the flying body 3100, and supplies not only the driving power for the motors 3105 and 3106 but also power to each electric load in the flying body 3100.

The power supply apparatus 3001 includes a housing 3002 that forms the outer wall, and a plurality of connecting portions 3003 that connect the housing 3002 and the airframe 3101. The housing 3002 is arranged outside the airframe 3101 and, in this embodiment, supported at the center in the Y direction while being hung from the bottom wall of the airframe 3101 via the connecting portions 3003. When the housing 3002 is arranged outside the airframe 3101, occupation of the internal space of the airframe 3101 by the power supply apparatus 3001 can be avoided. This contributes to expansion of a cabin, improvement of the layout property of other constituent components, and improvement of the maintainability of the power supply apparatus 3001.

Figure 17:
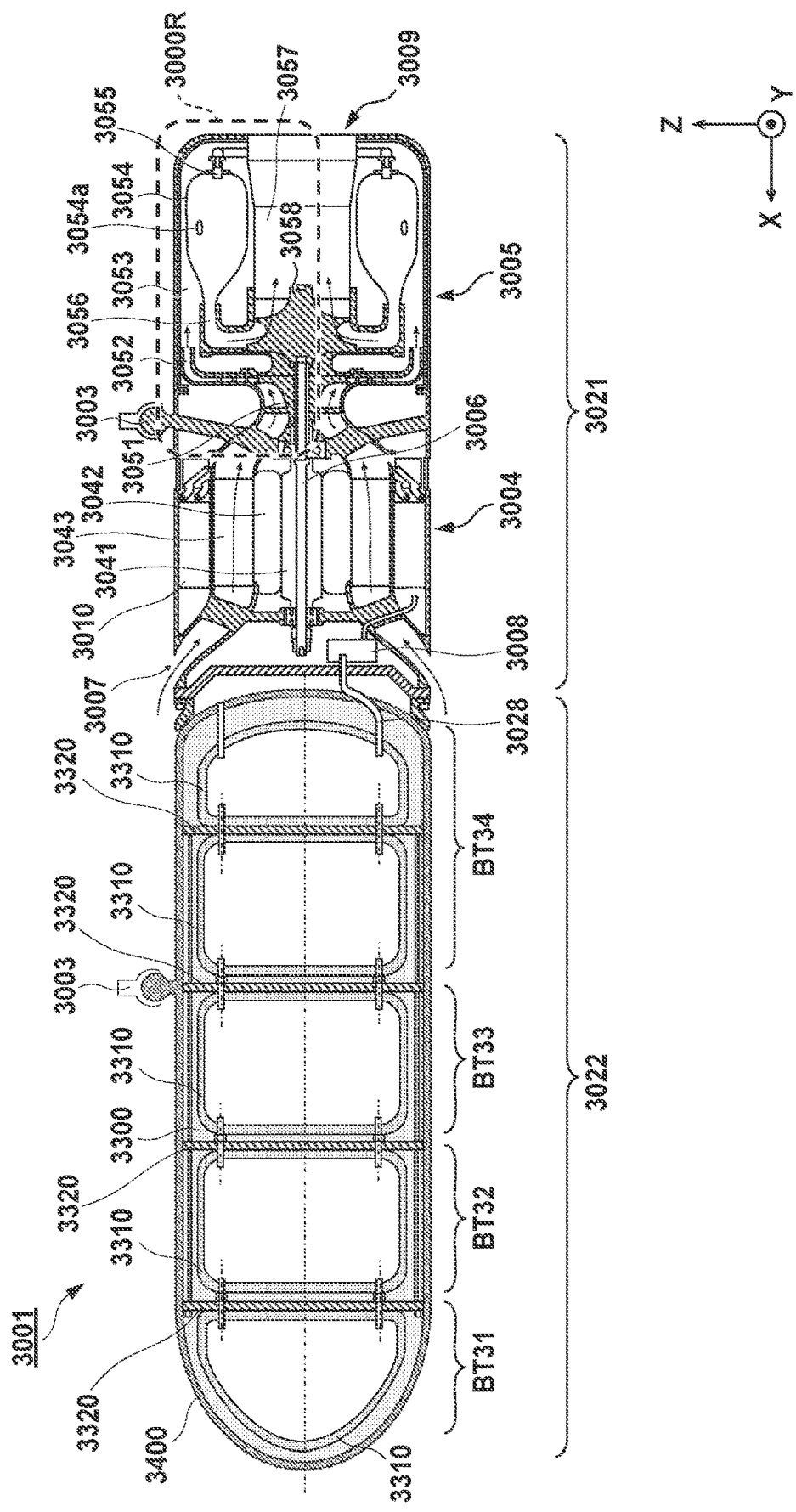
FIG. 17 is a view for explaining the internal structure of the power supply apparatus shown in FIG. 16.

The power supply apparatus 3001 will be described next with reference to FIG. 17. FIG. 17 is a sectional view of the power supply apparatus 3001. The power supply apparatus 3001 includes the hollow housing 3002 that forms the outer wall (outer shell portion), and the plurality of connecting portions 3003 that connect the housing 3002 and the airframe 3101.

The housing 3002 has an outer shape long in the X direction (that is, a pod-like outer shape long in the X direction). Hence, in other words, it can be said that the X direction defined in this embodiment is the longitudinal direction of the housing 3002. When the housing 3002 arranged outside the airframe 3101 has such an outer shape, the air resistance during forward flight of the flying body 3100 can be reduced. Since the body portion of the housing 3002 according to this embodiment has an almost columnar shape, the influence of a cross wind can be made smaller. In addition, the distal end portion of the housing 3002 has a tapered shape whose diameter is reduced toward the front side. In this embodiment, the distal end portion of the housing 3002 is formed into a hemispherical shape but may have a triangular pyramid shape. When the distal end portion is formed into a tapered shape, the air resistance during forward flight of the flying body 3100 can further be reduced.

The plurality of connecting portions 3003 are provided on the housing 3002 while being apart in the front-and-rear direction of the flying body 3100, and connect the housing 3002 and the airframe 3101. The housing 3002 according to this embodiment includes a total of two connecting portions 3003, that is, one on a storage portion 3021 to be described later and one on a fuel tank 3022, and is connected by the plurality of (for example, two) connecting portions 3003 while being apart from the airframe 3101. The connecting portions 3003 detachably connect the power supply apparatus 3001 (housing 3002) and the airframe 3101, and the structure may be a fastening structure using a bolt and a screw hole, or may be an engaging structure using a hook and a hole. When the power supply apparatus 3001 (housing 3002) is detachable from the airframe 3101, it is possible to facilitate exchange of the power supply apparatus 3001 and improve the maintenability.

[Internal Structure of Housing]

The internal structure of the housing 3002 will be described next. The housing according to this embodiment includes the storage portion 3021 that stores a power supply unit, and the fuel tank 3022 (bag-shaped tanks BT31 to BT34) serving as a reserving portion that reserves the fuel of the power supply unit. As the fuel reserved in the fuel tank 3022 (bag-shaped tanks BT31 to BT34), for example, methanol, gasoline, or the like can be used. The storage portion 3021 and the bag-shaped tanks BT31 to BT34 in the fuel tank 3022 are arrayed along the front-and-rear direction (longitudinal direction: X direction) of the flying body 3100 and separably connected by connecting portions. In this embodiment, the bag-shaped tanks BT31 to BT34 in the fuel tank 3022 are arranged on the front side of the flying body 3100, and the storage portion 3021 is arranged on the rear side of the flying body 3100.

The power supply unit stored in the storage portion 3021 includes a power generator 3004, and a gas turbine engine 3005. The power generator 3004 generates power by the output of the gas turbine engine 3005. In this embodiment, the power generator 3004 and the gas turbine engine 3005 are provided on a common rotating shaft 3006. When the gas turbine engine 3005 rotationally drives the rotating shaft 3006, the power generator 3004 can generate power. With this arrangement, it is possible to arrange the power generator 3004 and the gas turbine engine 3005 without wasting a space and make the apparatus compact.

The gas turbine engine 3005 includes a compressor including an impeller 3051 and a diffuser 3052. The impeller 3051 is attached to the rotating shaft 3006. Air taken from an air intake port 3007 is sent to a compression chamber 3053 while being compressed via the diffuser 3052 along with the rotation of the impeller 3051. The compressed air held in the compression chamber 3053 is taken from an opening portion 3054a provided in the circumferential wall of a combustion chamber 3054 or another opening portion into the combustion chamber 3054. The combustion chamber 3054 is provided with a fuel injection nozzle 3055, and the fuel taken from the bag-shaped tanks BT31 to BT34 in the fuel tank 3022 by a fuel pump 3008 (supply unit) via a pipe 3028 is injected (supplied) into the combustion chamber 3054 by the fuel injection nozzle 3055. At the time of start, an ignition device (not shown) ignites the gas mixture in the combustion chamber 3054. After that, combustion of the gas mixture continuously occurs in the combustion chamber 3054.

A combustion gas that has obtained a high temperature and a high pressure in the combustion chamber 3054 jets out from a turbine nozzle 3056 to a tubular exhaust pipe 3057, rotates a turbine 3058 attached to the rotating shaft 3006, and is discharged to the rear side from an exhaust port 3009 provided in the rear portion of the power supply apparatus 3001. The impeller 3051, the turbine 3058, and a rotor 3041 (permanent magnet or the like) of the power generator 3004 to be described later are provided on the rotating shaft 3006, and the impeller 3051 and the rotor 3041 can integrally be rotated by the rotation of the turbine 3058. Note that in this embodiment, the gas turbine engine 3005 exclusively aims at driving the power generator 3004, and actively using the exhaust gas flow as the propulsion force of the flying body 3100 is not assumed. However, a mode in which the exhaust gas flow is used as an auxiliary propulsion force is also possible.

The power generator 3004 includes the rotor 3041 such as a permanent magnet attached to the rotating shaft 3006, and a stator 3042 such as a coil disposed around the rotor 3041. When the rotating shaft 3006 is rotated by the gas turbine engine 3005, and the rotor 3041 attached to the rotating shaft 3006 rotates accordingly, the stator 3042 can generate power. In addition, a plurality of fins 3043 configured to cool the stator 3042 are provided around the stator 3042 in the circumferential direction of the rotating shaft 3006. The plurality of fins 3043 are arranged in a space to which the air taken from the air intake port 3007 is guided. When the air passes between the plurality of fins 3043, the plurality of fins 3043 are cooled, and the stator 3042 can accordingly be cooled.

A control unit 3010 includes a circuit that controls power generation of the power generator 3004, and a circuit that controls driving of the gas turbine engine 3005. An auxiliary power supply such as a battery may be provided as a power supply at the time of activation of the control unit 3010. The auxiliary power supply may be provided in the housing 3002, or may be provided in the airframe 3101. The power generated by the power generator 3004 is supplied to power loads (motors 3105 and 3106 and the like) in the airframe 3101 via a cable (not shown). The cable may pass through the inside of the connecting portions 3003. In addition, the control unit 3010 of the power supply apparatus 3001 may be communicable with the control device 3107 in the airframe 3101, or may be configured to perform power generation control in accordance with an instruction from the control device 3107.

When the power supply apparatus 3001 is arranged outside the airframe 3101, as described above, the degree of freedom in designing the airframe 3101 of the flying body 3100 can be improved. For example, it is possible to ensure a wider cabin space in the airframe 3101 and improve the comfort of crew. In addition, noise and vibrations generated by the operation of the power supply apparatus 3001 are reduced as compared to a case in which the power supply apparatus 3001 is provided in the airframe 3101, and silence can be improved. Furthermore, as compared to a case in which the power supply apparatus 3001 is provided in the airframe 3101, access to the inside of the power supply apparatus 3001 is easy, the maintenance can be facilitated, and the maintenance burden can be reduced. The power supply apparatus 3001 alone can be developed separately from the airframe 3101, various kinds of qualification tests and type certifications before mass production are easy, and mass production can be implemented early. The power supply apparatus 3001 has a shape long in the front-and-rear direction of the flying body 3100, that is, a low air resistance shape with a small front projection area. For this reason, even in the arrangement in which the power supply apparatus 3001 is arranged outside the airframe 3101, the fuel consumption performance of the flying body 3100 is not greatly lowered. Since the gas turbine engine 3005 of the power supply apparatus 3001 does not aim at generating the propulsion force of the flying body 3100, the rigidity of the connecting portions 3003 can be low, and the structure can be relatively simple.

[Structures of Bag-Shaped Tanks]

Figure 18:
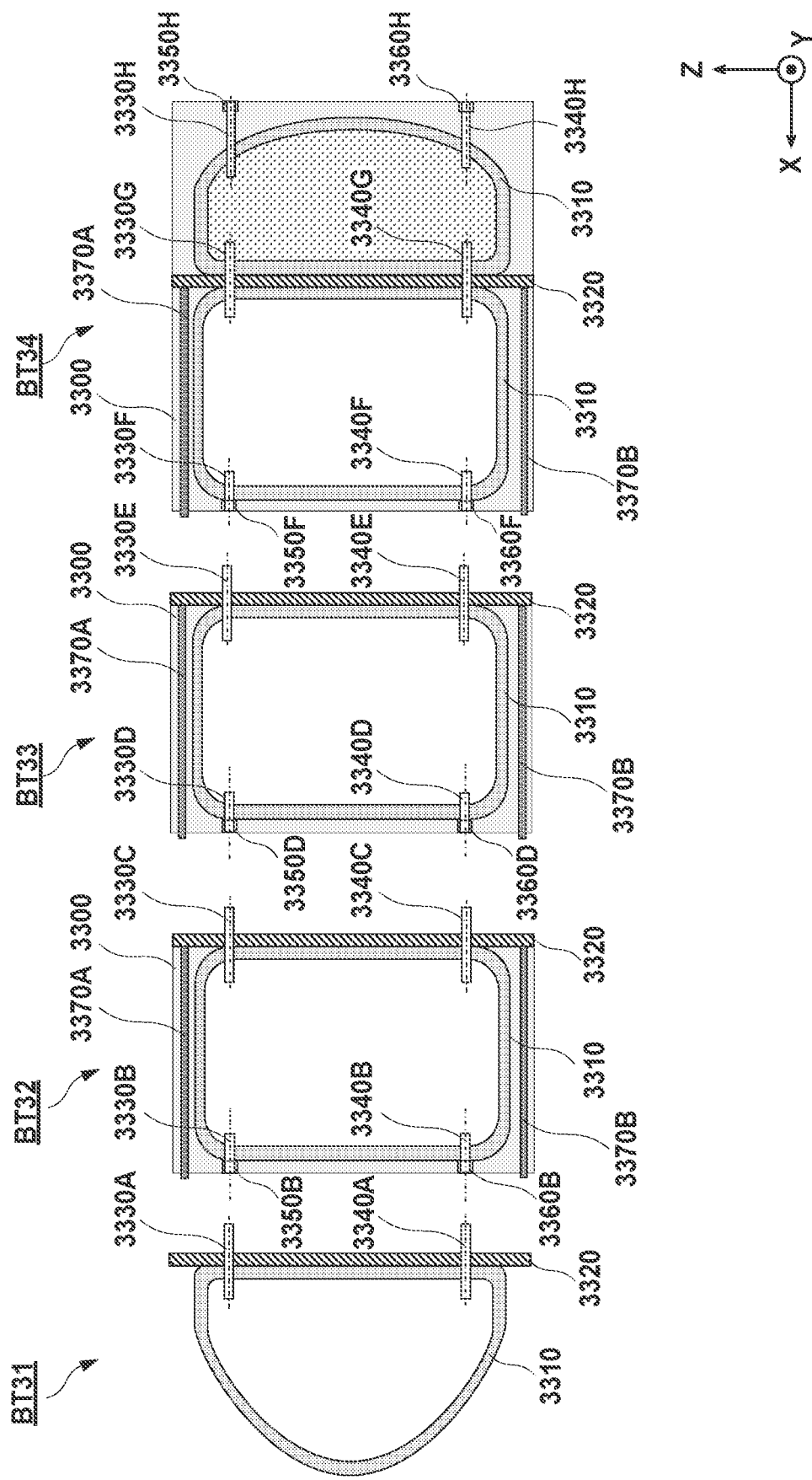
FIG. 18 is a view showing the structures of bag-shaped tanks held in a fuel tank (reserving portion)

The bag-shaped tanks BT31 to BT34 held in the fuel tank 3022 (reserving portion) will be described next with reference to FIGS. 17 and 18. FIG. 18 is a view showing the structures of the bag-shaped tanks held in the fuel tank 3022 (reserving portion) shown in FIG. 17. As shown in FIG. 17, the fuel tank 3022 includes a hollow outer shell portion 3400, and the bag-shaped tanks BT31 to BT34 that are flexible and are held separately in the outer shell portion 3400. In the fuel tank 3022, the plurality of bag-shaped tanks (BT31 to BT34) are arranged along the front-and-rear direction (longitudinal direction: X direction).

The hollow outer shell portion 3400 is made of a metal material with high rigidity, which absorbs the energy of an impact load and hardly breaks even if an impact load generated by collision of an external foreign object such as ice, hail, or bird strike is applied to the fuel tank 3022.

As shown in FIG. 17, a shock-absorbing member 3300 that protects the bag-shaped tanks is provided between the outer shell portion 3400 and the bag-shaped tanks BT31 to BT34. Even if the outer shell portion 3400 is damaged by an impact load, the shock-absorbing member 3300 absorbs (reduces) the energy of the impact load and protects the bag-shaped tanks BT31 to BT34 from the impact load. The shock-absorbing member 3300 is made of, for example, an elastic foamed material such as a polyethylene-based polymer material.

BT31 in FIG. 18 indicates a bag-shaped tank arranged on the frontmost end side in the fuel tank 3022 (reserving portion), and BT32 to BT34 indicate bag-shaped tanks arranged on the rear side of the fuel tank 3022 (reserving portion) relative to the position of the bag-shaped tank BT31 arranged on the frontmost end side. The bag-shaped tank BT34 is a bag-shaped tank arranged on the rearmost end side in the fuel tank 3022, and the bag-shaped tanks BT32 and BT33 are bag-shaped tanks arranged between the bag-shaped tank BT31 on the frontmost end side and the bag-shaped tank BT34 on the rearmost end side. Note that in the example shown in FIGS. 17 to 19, the plurality of bag-shaped tanks BT31 to BT34 are arranged along the front-and-rear direction (longitudinal direction) of the fuel tank 3022 (reserving portion). However, the disposition example of the bag-shaped tanks is not limited to this, and the number of bag-shaped tanks may be one if the bag-shaped tank is provided separately from the outer shell portion 3400 of the fuel tank 3022.

As shown in FIG. 18, the bag-shaped tanks BT31 to BT34 each include a bag-shaped portion 3310 capable of reserving the fuel of the power generator 3004, and a flange (wall portion) 3320 that holds the bag-shaped portion 3310. The bag-shaped portion 3310 is formed by, for example, a rubber-like elastic body with flexibility. The bag-shaped portion 3310 expands/contracts upon reserving a liquid such as fuel or by the effect of an external load, thereby changing the bag shape. The flange 3320 is a flat plate shaped member extending in the up-and-down direction (Z direction). One side of the bag-shaped portion 3310 along the flange 3320 is held by the flange 3320 by pasting method such as adhesion. The bag-shaped portion 3310 is formed by a rubber-like elastic body. Hence, even if an impact load acts, the energy of the impact load can be reduced by changing the bag shape. It is therefore possible to avoid damage to the bag-shaped portion 3310, which is caused by concentration of the energy of the impact load.

The flange 3320 that holds the bag-shaped portion 3310 is made of, for example, a metal material with high rigidity, which absorbs the energy of an impact load and hardly breaks, like the outer shell portion 3400. Note that the material used for the flange 3320 is not limited to a metal material, and may be a fragile material such as plastic, which can reduce energy by consuming the energy of an impact load to crush the flange 3320 itself.

Positioning rods 3370A and 3370B extending in the front-and-rear direction of the fuel tank 3022 are attached to the flanges 3320 of the bag-shaped tanks BT32 to BT34 arranged on the rear side of the fuel tank 3022 relative to the position of the bag-shaped tank BT31 arranged on the frontmost end side of the fuel tank 3022 (reserving portion). The shock-absorbing member 3300 is provided to surround the periphery of the bag-shaped portions 3310 of the bag-shaped tanks BT32 to BT34 and the positioning rods 3370A and 3370B.

Tubular members including vent tubes 3330 (to be simply expressed as "3330" representing 3330A to 3330H) and fuel supply tubes 3340 (to be simply expressed as "3340" representing 3340A to 3340H), which communicate with the inside of the bag-shaped portions 3310, are arranged in the bag-shaped portions 3310 of the plurality of bag-shaped tanks BT31 to BT34 arranged in the fuel tank 3022 (reserving portion). A plurality of coupling portions 3350 (to be simply expressed as "3350" representing 3350B, 3350D, 3350F, and 3350H) and coupling portions 3360 (to be simply expressed as "3360" representing 3360B, 3360D, 3360F, and 3360H), which connect the tubular members (the vent tubes 3330 and the fuel supply tubes 3340), are provided between the bag-shaped portions 3310 of the bag-shaped tanks (between bag-shaped tanks BT31 and BT32, between the bag-shaped tanks BT32 and BT33, and between the bag-shaped tanks BT33 and BT34) adjacent in the fuel tank 3022 (reserving portion). Each of the plurality of coupling portions 3350 and 3360 has a check valve (not shown) provided inside. In a state in which the tubular members (the vent tubes 3330 and the fuel supply tubes 3340) are connected, the check valves of the plurality of coupling portions 3350 and 3360 are set in an open state and make the bag-shaped portions 3310 of the adjacent bag-shaped tanks communicate. In a state in which the tubular members (the vent tubes 3330 and the fuel supply tubes 3340) are not connected, the check valves of the plurality of coupling portions 3350 and 3360 are set in a closed state and seal the bag-shaped portions 3310 of the adjacent bag-shaped tanks.

The vent tube 3330A and the fuel supply tube 3340A, which extend through the flange 3320 and communicate with the inside of the bag-shaped portion 3310, are provided in the bag-shaped tank BT31 shown in FIG. 18.

In the bag-shaped tank BT32, the vent tube 3330C and the fuel supply tube 3340C, which extend through the flange 3320 and communicate with the inside of the bag-shaped portion 3310, and the connection vent tube (vent tube 3330B) and the connection fuel supply tube (fuel supply tube 3340B), which are connected to the vent tube 3330A and the fuel supply tube 3340A of the bag-shaped tank BT31, are provided. In the example shown in FIG. 18, the coupling portions 3350B and 3360B each functioning as an air plug including a check valve are provided at the end portions of the connection vent tube (vent tube 3330B) and the connection fuel supply tube (fuel supply tube 3340B). The check valves of the coupling portions 3350B and 3360B are normally in the closed state. When the vent tube 3330A and the fuel supply tube 3340A of the bag-shaped tank BT31 are inserted into (connected to) the coupling portions 3350B and 3360B, respectively, the check valves are set in the open state. When the check valves of the coupling portions 3350B and 3360B are set in the open state, the inside of the bag-shaped portion 3310 of the bag-shaped tank BT31 and the inside of the bag-shaped portion 3310 of the bag-shaped tank BT32 are set in a communicating state.

In the bag-shaped tank BT33, the vent tube 3330E and the fuel supply tube 3340E, which extend through the flange 3320 and communicate with the inside of the bag-shaped portion 3310, and the connection vent tube (vent tube 3330D) and the connection fuel supply tube (fuel supply tube 3340D), which are connected to the vent tube 3330C and the fuel supply tube 3340C of the bag-shaped tank BT32, are provided. The coupling portions 3350D and 3360D each functioning as an air plug including a check valve are provided in the connection vent tube (vent tube 3330D) and the connection fuel supply tube (fuel supply tube 3340D). The check valves of the coupling portions 3350D and 3360D are normally in the closed state. When the vent tube 3330C and the fuel supply tube 3340C of the bag-shaped tank BT32 are inserted into the coupling portions 3350D and 3360D, respectively, the check valves are set in the open state. When the check valves of the coupling portions 3350D and 3360D are set in the open state, the inside of the bag-shaped portion 3310 of the bag-shaped tank BT32 and the inside of the bag-shaped portion 3310 of the bag-shaped tank BT33 are set in the communicating state.

In the bag-shaped tank BT34, the bag-shaped portion 3310 is held on the first surface (the front side of the fuel tank 3022) of the flange 3320, and the bag-shaped portion 3310 is held on the second surface (the rear side of the fuel tank 3022) of the flange 3320, which is the back surface of the first surface, as well.

The vent tube 3330G and the fuel supply tube 3340G, which extend through the flange 3320 and communicate with the insides of the bag-shaped portion 3310 on the first surface side and the bag-shaped portion 3310 on the second surface side, are provided in the bag-shaped tank BT34. Additionally, in the bag-shaped tank BT34, the first connection vent tube (vent tube 3330F) and the first connection fuel supply tube (fuel supply tube 3340F), which communicate with the inside of the bag-shaped portion 3310 on the first surface side and are connected to the vent tube 3330E and the fuel supply tube 3340E of the bag-shaped tank BT33, are provided.

In the bag-shaped portion 3310 on the second surface side, the second connection vent tube (vent tube 3330H) and the second connection fuel supply tube (fuel supply tube 3340H), which communicate with the inside of the bag-shaped portion 3310 and are connected to the external vent tube and the external fuel supply tube (pipe 3028), are provided.

The coupling portions 3350 (to be expressed as "3350" representing 3350F and 3350H) and the coupling portions 3360 (to be expressed as "3360" representing 3360F and 3360H), each of which functions as an air plug including a check valve, are provided in the first and second connection vent tubes (the vent tube 3330F and the vent tube 3330H) and the first and second connection fuel supply tubes (the fuel supply tube 3340F and the fuel supply tube 3340H).

The check valves of the coupling portions 3350 and 3360 of the first and second connection vent tubes (the vent tube 3330F and the vent tube 3330H) and the first and second connection fuel supply tubes (the fuel supply tube 3340F and the fuel supply tube 3340H) are normally in the closed state. When the vent tube 3330E and the fuel supply tube 3340E of the bag-shaped tank BT33 or the external vent tube and the external fuel supply tube (the pipe 3028 shown in FIG. 16) are inserted into the coupling portions 3350 and 3360, respectively, the check valves are set in the open state.

When the check valves of the coupling portion 3350F and 3360F are set in the open state, the inside of the bag-shaped portion 3310 of the bag-shaped tank BT33, the inside of the bag-shaped portion 3310 on the first surface side of the bag-shaped tank BT34, and the inside of the bag-shaped portion 3310 on the second surface side via the vent tube 3330G and the fuel supply tube 3340G are set in the communicating state. In addition, when the check valve of the coupling portion 3350H is set in the open state, the inside of the bag-shaped portion 3310 on the second surface side of the bag-shaped tank BT34 is opened to the atmospheric pressure via the external vent tube. The fuel can be injected (supplied) to the bag-shaped tank BT34 in the communicating state via the external vent tube. When the fuel is supplied up to the tank capacity of the bag-shaped tank BT34, the fuel is supplied to the bag-shaped tank BT33 in the communicating state via the vent tubes 3330E and 3330F.

When the fuel is supplied up to the tank capacity of the bag-shaped tank BT33, the fuel is supplied to the bag-shaped tank BT32 in the communicating state via the vent tubes 3330C and 3330D. Similarly, when the fuel is supplied up to the tank capacity of the bag-shaped tank BT32, the fuel is supplied to the bag-shaped tank BT31 in the communicating state via the vent tubes 3330A and 3330B.

When the check valve of the coupling portion 3360H is set in the open state, the inside of the bag-shaped portion 3310 on the second surface side of the bag-shaped tank BT34 communicates with the fuel pump 3008 (supply unit) via the external fuel supply tube (pipe 3028). When suction of the fuel by the fuel pump 3008 starts, the fuel taken from the bag-shaped tanks BT31 to BT34 that are set in the communicating state by the connection of the fuel supply tubes 3340A to 3340H is injected (supplied) into the combustion chamber 3054 using the fuel injection nozzle 3055 by the fuel pump 3008 (supply unit) via the pipe 3028.

[Structure of Outer Shell Portion]

Figure 19:
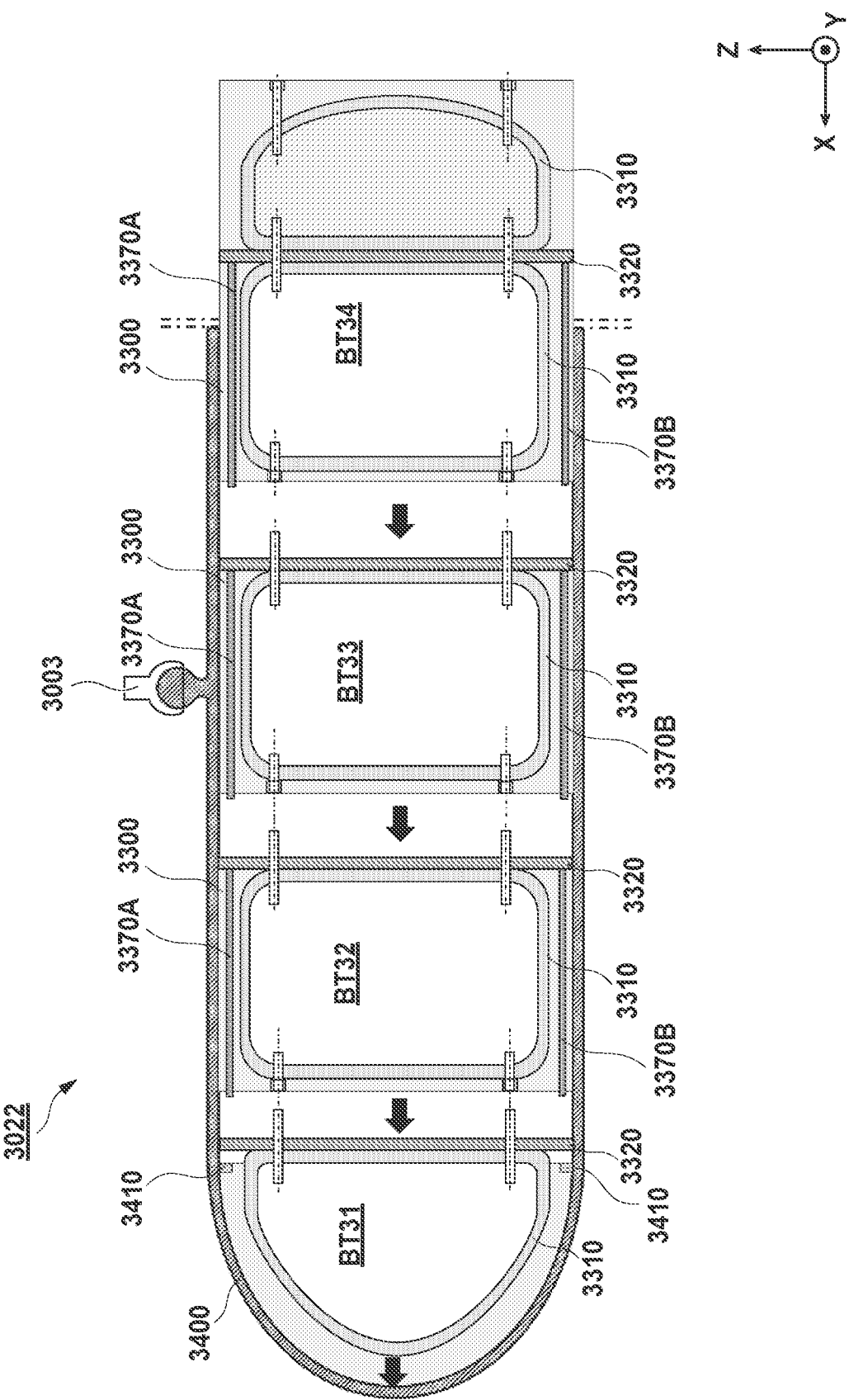
FIG. 19 is a view showing the structure of the outer shell portion of the fuel tank (reserving portion)

The outer shell portion 3400 of the fuel tank 3022 (reserving portion) will be described next with reference to FIG. 19. FIG. 19 is a view showing the structure of the outer shell portion 3400 of the fuel tank 3022 (reserving portion). The bag-shaped tanks BT31 to BT34 described with reference to FIG. 18 are inserted into the outer shell portion 3400 of the fuel tank 3022 (reserving portion) along the direction of arrows.

As shown in FIG. 19, a projecting portion 3410 is formed on the inner circumferential surface of the outer shell portion 3400. When the bag-shaped tank BT31 is inserted into the outer shell portion 3400 in a state in which the shock-absorbing member 3300 is provided on the bag-shaped tank BT31, interference (contact) between the shock-absorbing member 3300 and the projecting portion 3410 may occur. For this reason, on the inner circumferential surface at the distal end portion of the outer shell portion 3400, in consideration of the workability at the time of assembling, the shock-absorbing member 3300 is provided in advance to cover the periphery of the bag-shaped portion 3310 of the bag-shaped tank BT31 arranged on the frontmost end side for the fuel tank 3022. As shown in FIG. 19, when the shock-absorbing member 3300 is provided in advance on the inner circumferential surface at the distal end portion of the outer shell portion 3400, it is possible to assemble the bag-shaped tank BT31 while avoiding the interference (contact) between the projecting portion 3410 and the shock-absorbing member 3300 when inserting the bag-shaped tank BT31 into the outer shell portion 3400 in the direction of the arrows.

In the plurality of bag-shaped tanks BT31 to BT34 arranged in the fuel tank 3022, the flange 3320 of the bag-shaped tank BT31 (first bag-shaped tank) arranged on the frontmost end side of the fuel tank 3022 contacts the projecting portion 3410 and is positioned inside the fuel tank 3022.

The positioning rods 3370A and 3370B are attached to the flange of the bag-shaped tank BT32 (second bag-shaped tank) arranged on the rear side of the fuel tank 3022 relative to the position of the bag-shaped tank BT31 (first bag-shaped tank). In the bag-shaped tank BT32 (second bag-shaped tank), the positioning rods 3370A and 3370B contact the flange 3320 of the bag-shaped tank BT31 arranged on the front side of the fuel tank 3022 relative to the position of the bag-shaped tank BT32, and the bag-shaped tank BT32 is thus positioned inside the fuel tank 3022.

As in the bag-shaped tank BT32, the positioning rods 3370A and 3370B are attached to the flanges 3320 of the plurality of remaining bag-shaped tanks BT33 and BT34 arranged on the rear side of the fuel tank 3022 relative to the position of the bag-shaped tank BT32 (second bag-shaped tank). In each of the plurality of remaining bag-shaped tanks BT33 and BT34, the positioning rods 3370A and 3370B contact the flange 3320 of the bag-shaped tank arranged closest on the front side of the reserving portion relative to the position of the bag-shaped tank or the positioning rods 3370A and 3370B attached to the flange 3320, and the bag-shaped tank is thus positioned.

That is, for the bag-shaped tank BT33 of the plurality of remaining bag-shaped tanks BT33 and BT34, the positioning rods 3370A and 3370B contact the flange 3320 of the bag-shaped tank BT32 arranged closest on the front side of the fuel tank 3022 relative to the position of the bag-shaped tank BT33 or the positioning rods 3370A and 3370B of the bag-shaped tank BT32, which are attached through the flange 3320, and the bag-shaped tank BT33 is thus positioned.

In addition, for the bag-shaped tank BT34 of the plurality of remaining bag-shaped tanks BT33 and BT34, the positioning rods 3370A and 3370B contact the flange 3320 of the bag-shaped tank BT33 arranged closest on the front side of the fuel tank 3022 relative to the position of the bag-shaped tank BT34 or the positioning rods 3370A and 3370B of the bag-shaped tank BT33, which are attached through the flange 3320, and the bag-shaped tank BT34 is thus positioned.

This positions and fixes the plurality of bag-shaped tanks BT31 to BT34 inside the fuel tank 3022 (reserving portion). When the plurality of bag-shaped tanks BT31 to BT34 are positioned, the vent tubes 3330 and the fuel supply tubes 3340 are connected, and the bag-shaped tanks communicate with each other. The fuel tank 3022 as shown in FIG. 17 can be constructed by sealing the outer shell portion 3400 by a lid member at the right end portion of the fuel tank 3022 in a state in which the plurality of bag-shaped tanks BT31 to BT34 are positioned and fixed inside the fuel tank 3022.

According to this embodiment, it is possible to provide a flying body including a power supply apparatus capable of preventing breakage of the fuel tank or fuel leakage even if an impact load from the outside is applied.

Embodiment 3-2

In Embodiment 3-1, a structure in which the shock-absorbing member 3300 is provided between the outer shell portion 3400 and the bag-shaped tanks BT31 to BT34 has been described. An internal space (crushable zone: impact interfering space) may be formed between an outer shell portion 3400 of a fuel tank 3022 and separately arranged bag-shaped tanks without providing the shock-absorbing member 3300.

In this case, when the outer shell portion 3400 is made of a material with higher rigidity, the energy of an impact load is absorbed by deforming the outer shell portion 3400 in the internal space at the time of application of the impact load, and the bag-shaped tanks BT31 to BT34 can be protected.

Embodiment 3-3

The positions of the coupling portions 3350 (3350B, 3350D, and 3350F) and the coupling portions 3360 (3360B, 3360D, and 3360F) described in Embodiment 3-1 are not limited to the example shown in FIG. 18. For example, the coupling portions may be located at an end portion of a vent tube 3330A and an end portion of a fuel supply tube 3340A of a bag-shaped tank BT31, at an end portion of a vent tube 3330C and an end portion of a fuel supply tube 3340C of a bag-shaped tank BT32, and at an end portion of a vent tube 3330E and an end portion of a fuel supply tube 3340E of a bag-shaped tank BT33.

Embodiment 3-4

In Embodiments 3-1 to 3-3, a helicopter has been exemplified as the flying body. The present invention can be applied not only to such a rotorcraft but also to aircrafts such as a fixed-wing aircraft and an airship and also to a flying type personal mobility, a spaceship, a space shuttle, and the like. The fixed-wing aircraft can include a glider aircraft represented by a glider and an aircraft represented by a propeller plane. The present invention is also applicable to a flying body that is not of electric propulsion type.

The connecting portion of the power supply apparatus can be set not only to the bottom surface of the airframe but also to the upper surface of the wing portion of the airframe or the bottom surface of the wing portion of the airframe. The power supplied by the power supply apparatus may be power supplied to a power load that forms a driving source such as a motor, power supplied to a power load other than the driving source, or power supplied to both.

A plurality of power supply apparatuses may be provided in one flying body. When providing a plurality of power supply apparatuses, they may be juxtaposed in the widthwise direction of the flying body, or may be arranged in a line in the front-and-rear direction of the flying body.

In Embodiments 3-1 to 3-3, an example in which the housing 3002 has a cylindrical shape has been described. However, the housing may have another tubular shape such as a square tubular shape. In addition, the housing 3002 may include a portion with a cylindrical shape and a portion with a square tubular shape.

Summary of Third Embodiment

The third embodiment discloses at least the following flying body including a power supply apparatus.

Arrangement 1. A flying body (for example, 3100) including a power supply apparatus (for example, 3001) according to the third embodiment is
a flying body (3100) including a power supply apparatus (3001) that includes power generation unit (for example, 3004) and a hollow housing (for example, 3002) and is configured to supply power to a power load, the hollow housing having a long shape and including a reserving portion (for example, 3022) configured to reserve fuel of the power generation unit and a storage portion (for example, 3021) configured to store the power generation unit,
wherein the reserving portion (3022) comprises:
a hollow outer shell portion (for example, 3400); and
a bag-shaped tank (for example, BT31-BT34) having flexibility and separately held inside the outer shell portion (3400).

According to the flying body including the power supply apparatus of Arrangement 1, it is possible to provide a flying body including a power supply apparatus capable of preventing breakage of a fuel tank or fuel leakage even if an impact load from the outside is applied.

Arrangement 2. In the flying body (3100) including the power supply apparatus (3001) according to the third embodiment, a shock-absorbing member (for example, 3300) configured to protect the bag-shaped tank is provided between the outer shell portion (3400) and the bag-shaped tank (BT31-BT34).

According to the flying body including the power supply apparatus of Arrangement 2, even if the outer shell portion is damaged by an impact load, the shock-absorbing member can absorb (reduce) the energy of the impact load and protect the bag-shaped tank from the impact load.

Arrangement 3. In the flying body (3100) including the power supply apparatus (3001) according to the third embodiment, an internal space is formed between the outer shell portion (3400) and the bag-shaped tank (BT31-BT34).

According to the flying body including the power supply apparatus of Arrangement 3, the energy of an impact load is absorbed by deforming the outer shell portion in the internal space at the time of application of the impact load, and the bag-shaped tank can be protected.

Arrangement 4. In the flying body (3100) including the power supply apparatus (3001) according to the third embodiment, the bag-shaped tank (BT31-BT34) comprises:

a bag-shaped portion (for example, 3310) configured to reserve the fuel; and a flange (3320) configured to hold the bag-shaped portion, and the bag-shaped tank held by the flange (3320) comprises a plurality of bag-shaped tanks arranged along a front-and-rear direction of the reserving portion.

Arrangement 5. In the flying body (3100) including the power supply apparatus (3001) according to the third embodiment, the flying body further comprises a projecting portion (for example, 3410) formed on an inner circumferential surface of the outer shell portion (3400), wherein of the plurality of bag-shaped tanks arranged, the flange (3320) of a first bag-shaped tank (BT31) arranged on a frontmost end side of the reserving portion contacts the projecting portion (3410) and is positioned inside the reserving portion (3022).

According to the flying body including the power supply apparatus of Arrangement 4 and Arrangement 5, in the plurality of bag-shaped tanks, the first bag-shaped tank arranged on the frontmost end side of the reserving portion can accurately be positioned in the fuel tank (reserving portion) having a long shape by the contact of the projecting portion and the flange.

Arrangement 6. In the flying body (3100) including the power supply apparatus (3001) according to the third embodiment, a positioning rod (3370A, 3370B) extending in the front-and-rear direction of the reserving portion is attached to the flange (3320) of a second bag-shaped tank (BT32) arranged on a rear side of the reserving portion (3022) relative to a position of the first bag-shaped tank (BT31).

Arrangement 7. In the flying body (3100) including the power supply apparatus (3001) according to the third embodiment, as for the second bag-shaped tank (BT32), the positioning rod (3370A, 3370B) contacts the flange (3320) of the first bag-shaped tank (BT31) arranged on a front side of the reserving portion relative to a position of the second bag-shaped tank, and the second bag-shaped tank is positioned inside the reserving portion.

According to the flying body including the power supply apparatus of Arrangement 6 and Arrangement 7, in the plurality of bag-shaped tanks, the second bag-shaped tank can accurately be positioned in the fuel tank (reserving portion) having a long shape by the contact of the positioning rod and the flange.

Arrangement 8. In the flying body (3100) including the power supply apparatus (3001) according to the third embodiment, a positioning rod (3370A, 3370B) extending in the front-and-rear direction of the reserving portion is attached to the flange (3320) of each of a plurality of remaining bag-shaped tanks (BT33, BT34) arranged on the rear side of the reserving portion (3022) relative to a position of the second bag-shaped tank (BT32).

Arrangement 9. In the flying body (3100) including the power supply apparatus (3001) according to the third embodiment, as for each of the plurality of remaining bag-shaped tanks (BT33, BT34), the positioning rod (3370A, 3370B) contacts the flange (3320) of a bag-shaped tank (BT32, BT33) arranged closest on the front side of the reserving portion relative to a position of each bag-shaped tank or the positioning rod (3370A, 3370B) attached to the flange, and the bag-shaped tank is positioned inside the reserving portion (3022).

According to the flying body including the power supply apparatus of Arrangement 8 and Arrangement 9, each of the plurality of remaining bag-shaped tanks (BT33, BY34) can accurately be positioned in the fuel tank (reserving portion) having a long shape by the contact of the positioning rod and the flange of the bag-shaped tank arranged closest on the front side. Here, concerning the bag-shaped tank BT33, the bag-shaped tank BT32 is arranged closest on the front side, and concerning the bag-shaped tank BT34, the bag-shaped tank BT33 is arranged closest on the front side (FIG. 18).

Arrangement 10. In the flying body (3100) including the power supply apparatus (3001) according to the third embodiment, a bag-shaped portion (3310) of each of the plurality of bag-shaped tanks arranged in the reserving portion (3022) is provided with a tubular member including a vent tube (for example, 3330) and a fuel supply tube (for example, 3340) and communicating with an inside of the bag-shaped portion.

Arrangement 11. In the flying body (3100) including the power supply apparatus (3001) according to the third embodiment, the flying body further comprises a plurality of coupling portions (for example, 3350, 3360) configured to connect the tubular members between the bag-shaped portions (3310) of the bag-shaped tanks (between BT31 and BT32, between BT32 and BT33, and between BT33 and BT34) adjacent to each other inside the reserving portion.

Arrangement 12. In the flying body (3100) including the power supply apparatus (3001) according to the third embodiment, each of the plurality of coupling portions (3350, 3360) comprises a check valve, and in a state in which the tubular members are connected, the check valve is set in an open state and makes the bag-shaped portions (3310) of the adjacent bag-shaped tanks (between BT31 and BT32, between BT32 and BT33, and between BT33 and BT34) communicate, and in a state in which the tubular members are not connected, the check valve is set in a closed state and seals the bag-shaped portions (3310) of the adjacent bag-shaped tanks (between BT31 and BT32, between BT32 and BT33, and between BT33 and BT34).

According to the flying body including the power supply apparatus of Arrangement 10 to Arrangement 12, it is possible to make the plurality of bag-shaped tanks arranged in the reserving portion communicate, and it is possible to supply the fuel to each bag-shaped tank and supply the fuel from each bag-shaped tank.

Fourth Embodiment

In a power supply apparatus of a type that rotates the rotating shaft of a power generator using an engine, a combustion gas having a high temperature and a high pressure is discharged from the engine. For this reason, if the thermal energy of the combustion gas can be used, it may be advantageous in improving the power generation efficiency of the power generator.

It is an object of this embodiment to provide a technique advantageous in improving a power generation efficiency in a power supply apparatus including an engine and a power generator

Embodiment 4-1

Figure 20:
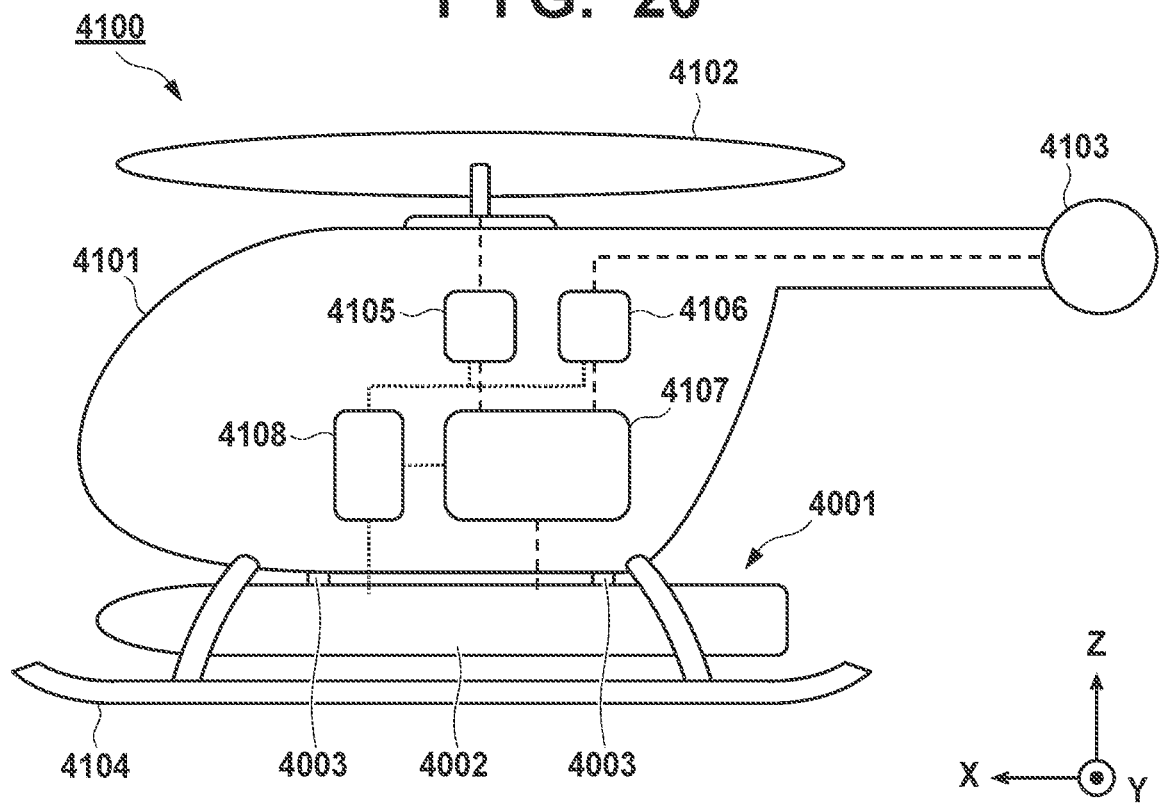
FIG. 20 is a schematic view of a flying body including a power supply apparatus according to Embodiment 4-1.

FIG. 20 is a schematic view of a flying body 4100 including a power supply apparatus 4001 according to Embodiment 4-1. In FIG. 20, arrows X, Y, and Z represent the front-and-rear direction, the widthwise direction (left-and-right direction), and the up-and-down direction of the flying body 4100, respectively. The flying body 4100 according to this embodiment is an electric propulsion type flying body using motors 4105 and 4106 as driving sources and, more particularly, a helicopter.

The flying body 4100 includes an airframe 4101 with a cabin (a passenger cabin and a cockpit), a main rotor 4102 provided on the upper side of the airframe 4101, a tail rotor 4103 provided in the rear portion of the airframe 4101, and a skid 4104. The motor 4105 is a driving source that rotates the main rotor 4102, and the motor 4106 is a driving source that rotates the tail rotor 4103. Power is supplied from the battery 4107 to the motors 4105 and 4106, and driving of the motors 4105 and 4106 is controlled by a control device 4108. Power generated by the power supply apparatus 4001 is supplied to the battery 4107 via a cable (not shown). In this embodiment, the power generated by the power supply apparatus 4001 is supplied to the battery 4107 in the airframe 4101. However, the power generated by the power supply apparatus 4001 may directly be supplied to the motors 4105 and 4106 without interposing the battery.

The power supply apparatus 4001 is arranged outside the airframe 4101 and connected to the airframe 4101 by a plurality of connecting mechanisms 4003. In this embodiment, the power supply apparatus 4001 is arranged between the left and right skids 4104 in the Y direction and supported while being hung from the bottom wall of the airframe 4101. When the power supply apparatus 4001 is arranged outside the airframe 4101, occupation of the internal space of the airframe 4101 by the power supply apparatus 4001 can be avoided. This can expand the cabin, improve the layout property of other constituent components, and improve the maintainability of the power supply apparatus 4001.

Figure 21:
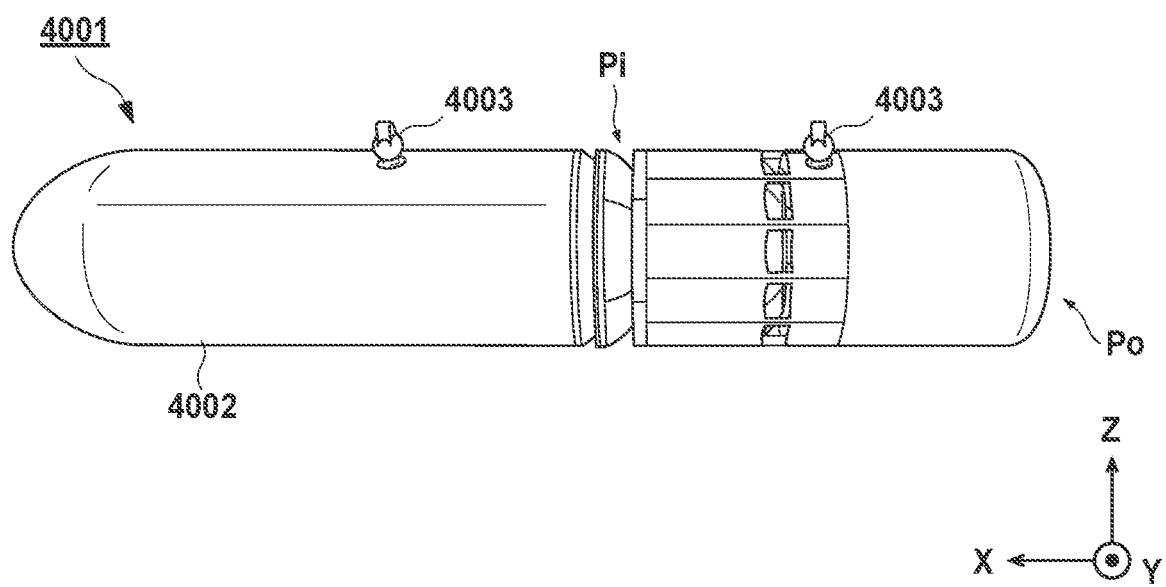
FIG. 21 is an outer view of the power supply apparatus according to Embodiment 4-1.
Figure 22:
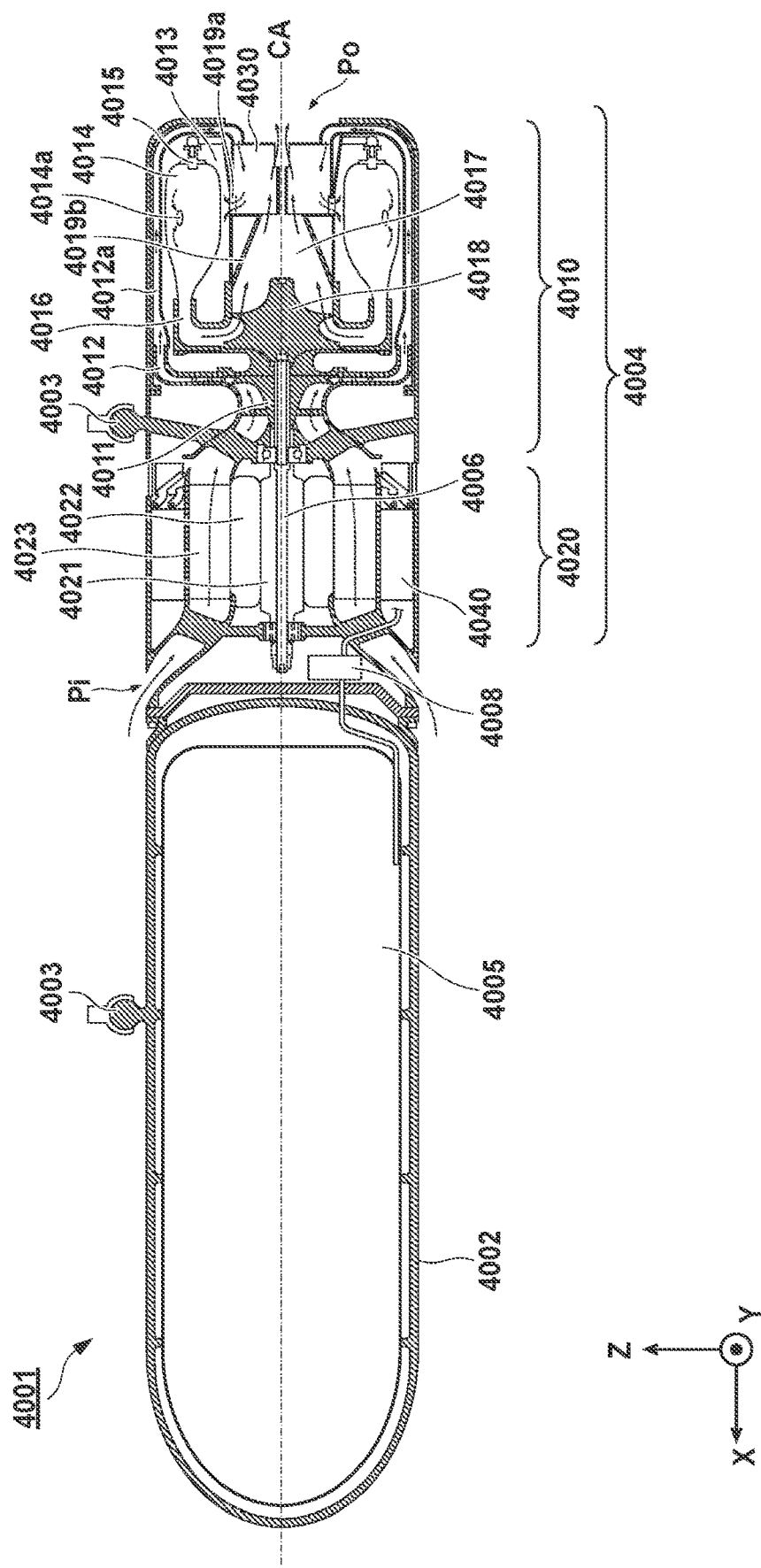
FIG. 22 is a sectional view of the power supply apparatus according to Embodiment 4-1.
Figure 23:
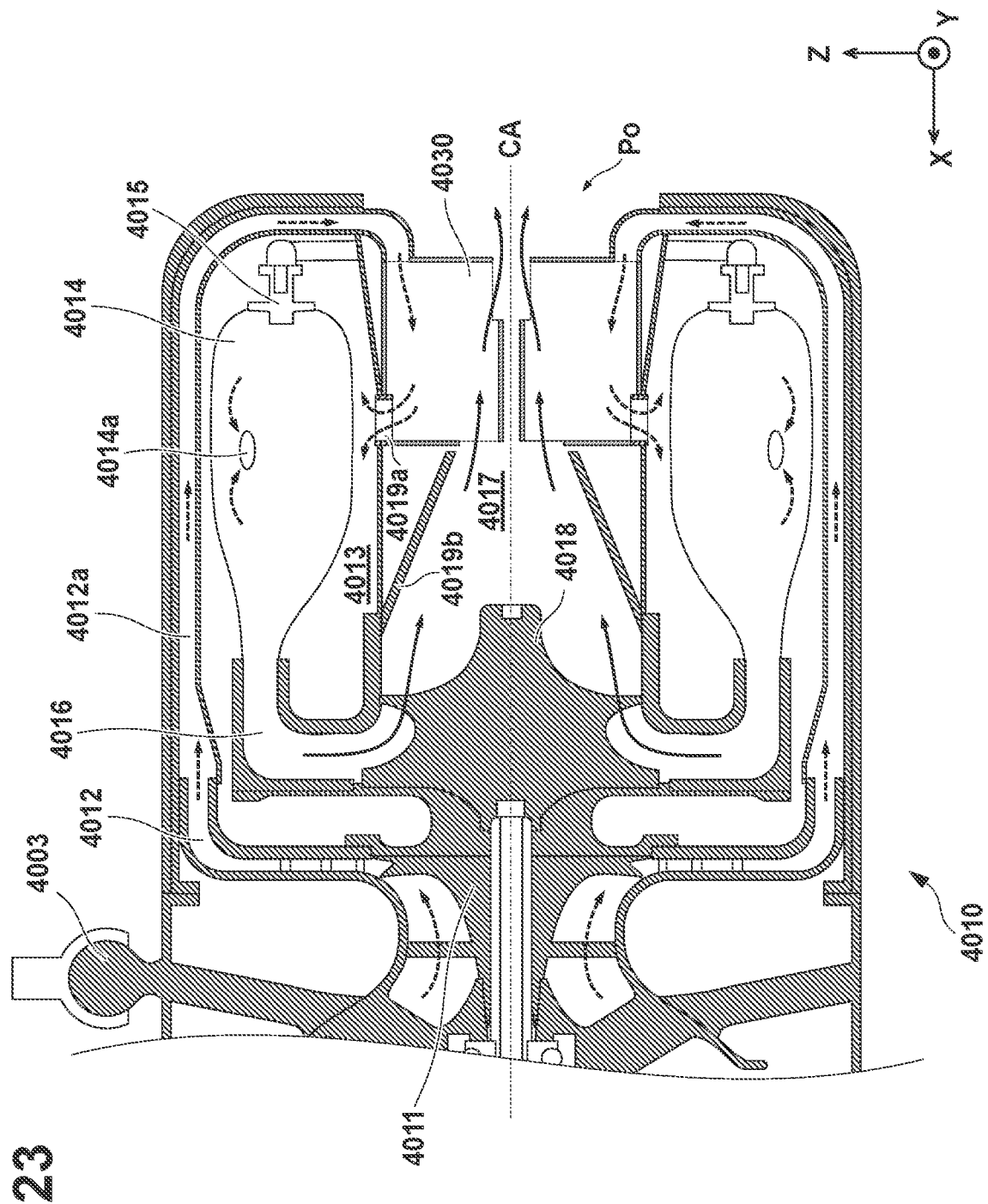
FIG. 23 is an enlarged sectional view showing the rear structure of the power supply apparatus according to Embodiment 4-1.

The power supply apparatus 4001 will be described next with reference to FIGS. 21 to 23. FIG. 21 is an outer view of the power supply apparatus 4001. FIG. 22 is a sectional view (internal structure) of the power supply apparatus 4001. FIG. 23 is an enlarged sectional view showing the rear structure of the power supply apparatus 4001. Note that in the drawings to be described below, a broken arrow indicates the path of a gas before combustion, and a solid arrow indicates the path of a gas after combustion.

The power supply apparatus 4001 includes a hollow housing 4002 that forms the outer wall. The housing 4002 has an outer shape long in the X direction (that is, a pod-like outer shape long in the X direction). When the housing 4002 arranged outside the airframe 4101 has such an outer shape, the air resistance during forward flight of the flying body 4100 can be reduced. Since the body portion of the housing 4002 according to this embodiment has a cylindrical shape, the influence of a cross wind can be made smaller. In addition, the distal end portion of the housing 4002 has a tapered shape whose diameter is reduced toward the front side. In this embodiment, the distal end portion of the housing 4002 is formed into a hemispherical shape but may have a triangular pyramid shape. When the distal end portion is formed into a tapered shape, the air resistance during forward flight of the flying body 4100 can further be reduced. Here, the shape of the housing 4002 is not limited to a cylindrical shape, and may be a square tubular shape or another tubular shape. In addition, the housing 4002 may include a portion with a cylindrical shape and a portion with a square tubular shape.

In addition, the housing 4002 is provided with the plurality of connecting mechanisms 4003 that connect the housing 4002 and the airframe 4101. The plurality of connecting mechanisms 4003 are provided on the housing 4002 while being apart in the front-and-rear direction of the flying body 4100, and connect the housing 4002 and the airframe 4101. The housing 4002 according to this embodiment includes a total of two connecting mechanisms 4003, that is, one on the front side and one on the rear side, and is connected by the plurality of (two) connecting mechanisms 4003 while being apart from the airframe 4101. The connecting mechanisms 4003 detachably connect the power supply apparatus 4001 (housing 4002) and the airframe 4101, and the structure may be a fastening structure using a bolt and a screw hole, or may be an engaging structure using a hook and a hole. When the power supply apparatus 4001 (housing 4002) is detachable from the airframe 4101, it is possible to facilitate exchange of the power supply apparatus 4001 and improve the maintainability.

A power generation unit 4004 and a fuel tank (reserving portion) 4005 are stored in the housing 4002. The power generation unit 4004 includes a gas turbine engine 4010, and a power generator 4020 that generates power by the output of the gas turbine engine 4010. The fuel tank 4005 reserves the fuel (methanol, gasoline, or the like) of the gas turbine engine 4010. The gas turbine engine 4010, the power generator 4020, and the fuel tank 4005 are preferably arrayed along the front-and-rear direction (X direction) of the flying body 4100, that is, the longitudinal direction of the housing 4002. In this embodiment, the power generator 4020 is arranged between the gas turbine engine 4010 and the fuel tank 4005 in the front-and-rear direction of the flying body 4100. In addition, the gas turbine engine 4010 and the power generator 4020 are provided on a common rotating shaft 4006 (coaxially). When the gas turbine engine 4010 rotationally drives the rotating shaft 4006, the power generator 4020 can generate power. With this arrangement, it is possible to arrange the gas turbine engine 4010 and the power generator 4020 without wasting a space and make the device compact. Note that the power generated by the power generation unit 4004 (power generator 4020) is supplied to the battery 4107 in the airframe 4101 via a cable (not shown) and stored.

The gas turbine engine 4010 includes a compressor including an impeller 4011 and a diffuser 4012. The impeller 4011 is attached to the rotating shaft 4006. Air taken from an inlet port Pi is sent to a heat exchanger 4030 via the diffuser 4012 and a channel 4012a along with the rotation of the impeller 4011. The channel 4012a is a passage configured to guide the compressed air sent from the diffuser 4012 to the heat exchanger 4030, and can be formed along the housing 4002. In addition, the heat exchanger 4030 is a unit that performs heat exchange (exchange of thermal energy) between the air sent from the diffuser 4012 and the combustion gas that is combusted in a combustion chamber 4014 and obtains a high temperature and a high pressure, and a detailed arrangement thereof will be described later. The air given the thermal energy in the heat exchanger 4030 is sent to a compression chamber 4013 via a guide member 4019a provided at the outlet of the heat exchanger 4030.

The compression chamber 4013 is a closed space defined between a tubular outer circumferential case (housing 4002) surrounding the gas turbine engine 4010 and a tubular inner circumferential case that is arranged inside the outer circumferential case and constitutes the outer wall of an exhaust pipe 4017. The compressed air held in the compression chamber 4013 is taken from an opening portion 4014a provided in the circumferential wall of the combustion chamber 4014 into the combustion chamber 4014. The combustion chamber 4014 is arranged along a circumferential direction with respect to an axis (center axis CA) extended from the rotating shaft 4006 as a center so as to surround the center axis CA. The combustion chamber 4014 is provided with a fuel injection nozzle 4015, and the fuel supplied from the fuel tank 4005 by a supply pump 4008 (supply unit) via a pipe is injected into the combustion chamber 4014 by the fuel injection nozzle 4015. At the time of start, an ignition device (not shown) ignites the gas mixture in the combustion chamber 4014. After that, combustion of the gas mixture continuously occurs in the combustion chamber 4014. A combustion gas that has obtained a high temperature and a high pressure in the combustion chamber 4014 jets out from a turbine nozzle 4016 to the tubular exhaust pipe 4017, and rotates a turbine 4018 attached to the rotating shaft 4006. The combustion gas is also guided by the guide member 4019b so as to be supplied into the heat exchanger 4030, and discharged, via the heat exchanger 4030, to the rear side from an exhaust port Po provided in the rear portion of the power supply apparatus 4001 (housing 4002).

The impeller 4011, the turbine 4018, and a rotor 4021 (permanent magnet or the like) of the power generator 4020 to be described later are provided on the rotating shaft 4006, and the impeller 4011 and the rotor 4021 can integrally be rotated by the rotation of the turbine 4018. Note that in this embodiment, the gas turbine engine 4010 exclusively aims at driving the power generator 4020, and actively using the exhaust gas flow as the propulsion force of the flying body 4100 is not assumed. However, a mode in which the exhaust gas flow is used as an auxiliary propulsion force is also possible.

The power generator 4020 includes the rotor 4021 such as a permanent magnet attached to the rotating shaft 4006, and a stator 4022 such as a coil disposed around the rotor 4021. When the rotating shaft 4006 is rotated by the gas turbine engine 4010, and the rotor 4021 attached to the rotating shaft 4006 rotates accordingly, the stator 4022 can generate power. In addition, a plurality of fins 4023 configured to cool the stator 4022 are provided around the stator 4022 in the circumferential direction of the rotating shaft 4006. The plurality of fins 4023 are arranged in a space to which the air taken from the inlet port Pi is guided. When the air passes between the plurality of fins 4023, the plurality of fins 4023 are cooled, and the stator 4022 can accordingly be cooled.

The power generation unit 4004 includes a power generation control unit 4040. The power generation control unit 4040 is, for example, an ECU (Electronic Control Unit), and includes a processor represented by a CPU, a storage device such as a semiconductor memory, an interface to an external device, and the like. The power generation control unit 4040 controls driving of the gas turbine and power generation of the power generator 4020. The power generation control unit 4040 may be configured to include a circuit that controls power generation of the power generator 4020, and a circuit that controls driving of the gas turbine engine 4010. The power generation control unit 4040 may use the battery 4107 in the airframe 4101 as a power supply. A storage battery (battery) may be provided in the power supply apparatus 4001 (in the housing 4002), and the storage battery may be used as a power supply.

When the power supply apparatus 4001 is arranged outside the airframe 4101, as described above, the degree of freedom in designing the airframe 4101 of the flying body 4100 can be improved. For example, it is possible to ensure a wider cabin space in the airframe 4101 and improve the comfort of crew. In addition, noise and vibrations generated by the operation of the power supply apparatus 4001 are reduced as compared to a case in which the power supply apparatus 4001 is provided in the airframe 4101, and silence can be improved. Furthermore, as compared to a case in which the power supply apparatus 4001 is provided in the airframe 4101, access to the inside of the power supply apparatus 4001 is easy, the maintenance can be facilitated, and the maintenance burden can be reduced. The power supply apparatus 4001 alone can be developed separately from the airframe 4101, various kinds of qualification tests and type certifications before mass production are easy, and mass production can be implemented early. The power supply apparatus 4001 has a shape long in the front-and-rear direction of the flying body 4100, that is, a low air resistance shape with a small front projection area. For this reason, even in the arrangement in which the power supply apparatus 4001 is arranged outside the airframe 4101, the fuel consumption performance of the flying body 4100 is not greatly lowered.

The heat exchanger 4030 will be described next. The power supply apparatus 4001 according to this embodiment discharges the combustion gas that has obtained a high temperature and a high pressure by the gas turbine engine 4010 from the exhaust port Po. This combustion gas has very high thermal energy. For this reason, if the thermal energy can be used, it may be advantageous in improving the power generation efficiency of the power generator 4020. Hence, the power supply apparatus 4001 according to this embodiment includes the heat exchanger 4030 (heat exchange unit) that performs heat exchange (exchange of thermal energy) between the air taken from the outside of the housing 4002 and sent from the diffuser 4012 and the combustion gas that is combusted in the combustion chamber 4014 and obtains a high temperature and a high pressure.

Figure 24:
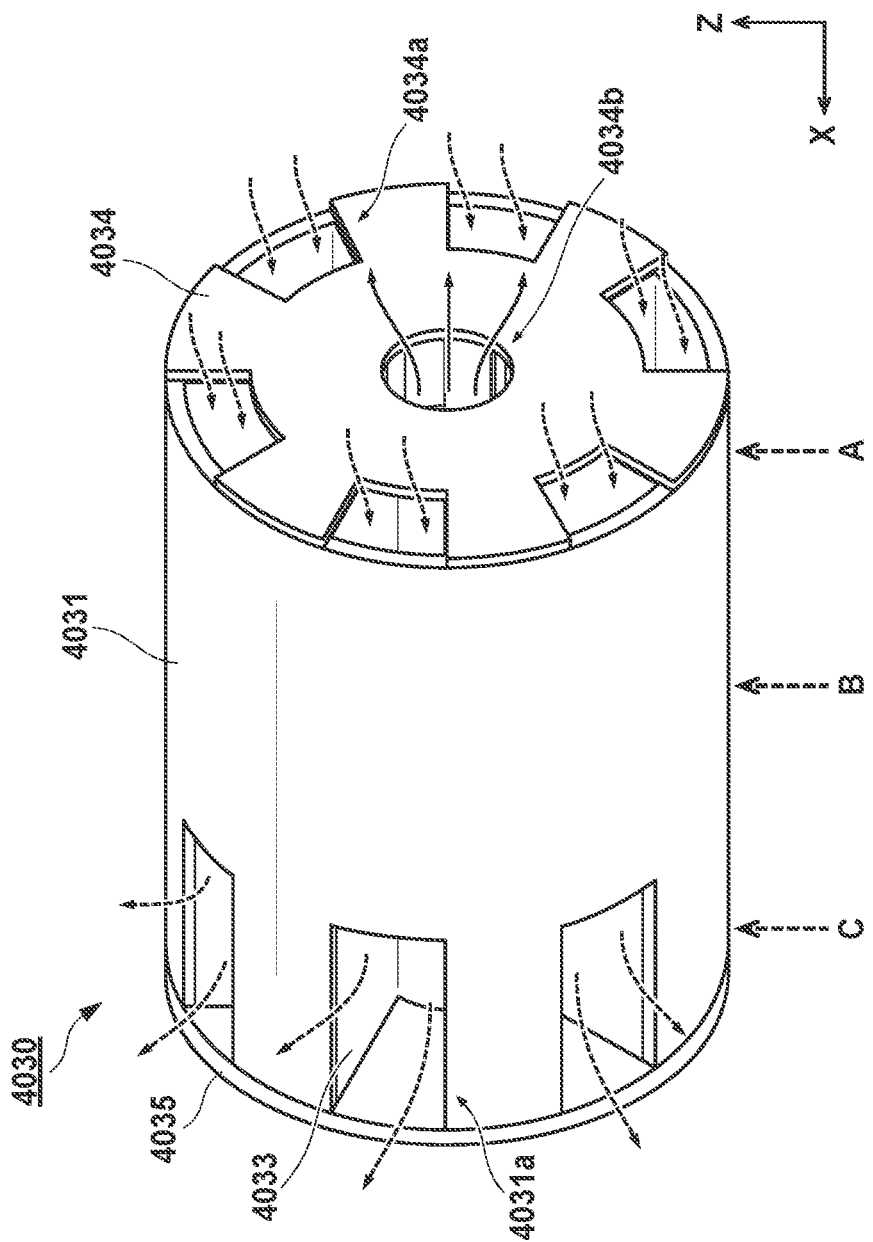
FIG. 24 is a perspective view of a heat exchanger viewed from a diagonal rear side.
Figure 25:
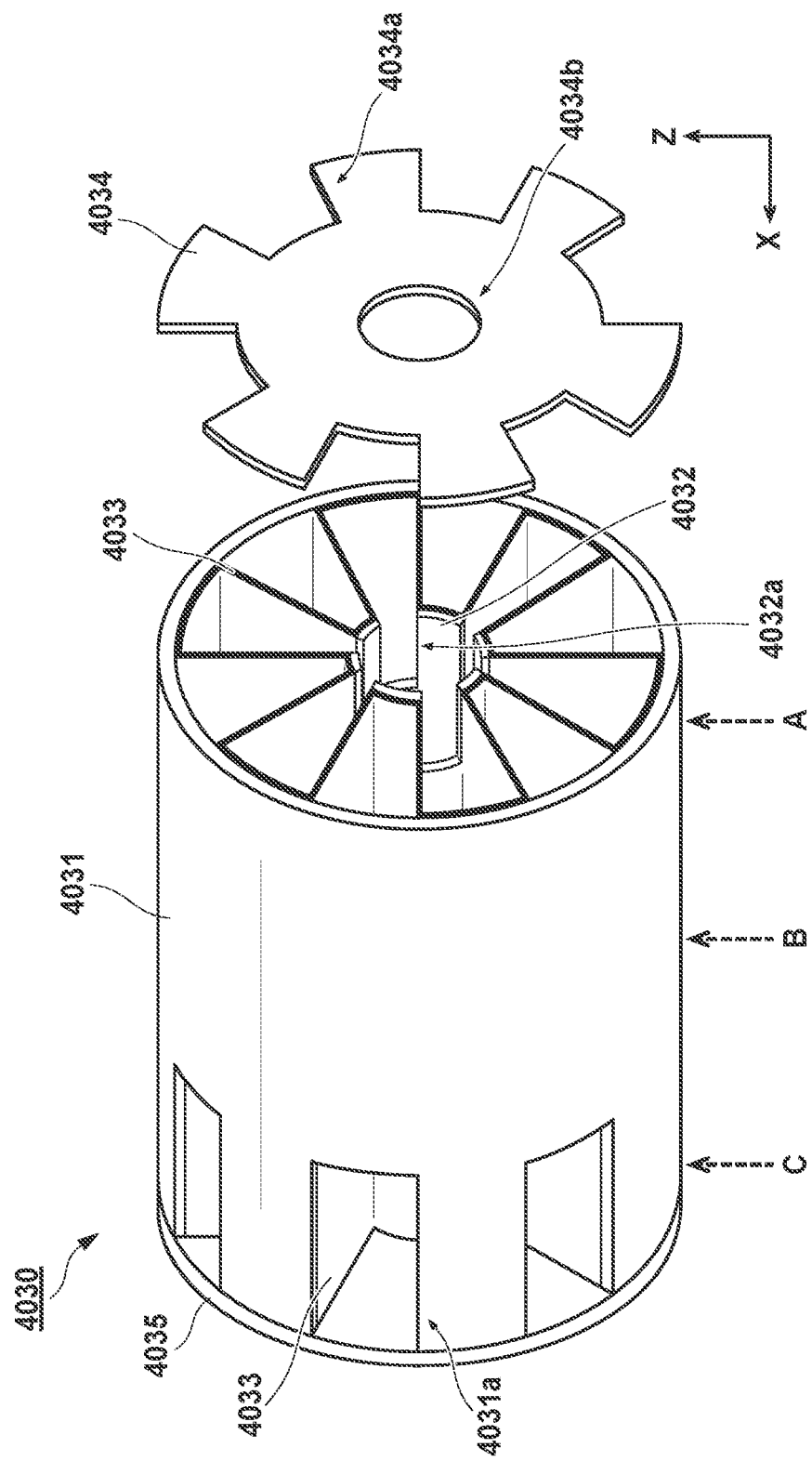
FIG. 25 is a view showing a state in which a first closing member is detached.
Figure 26:
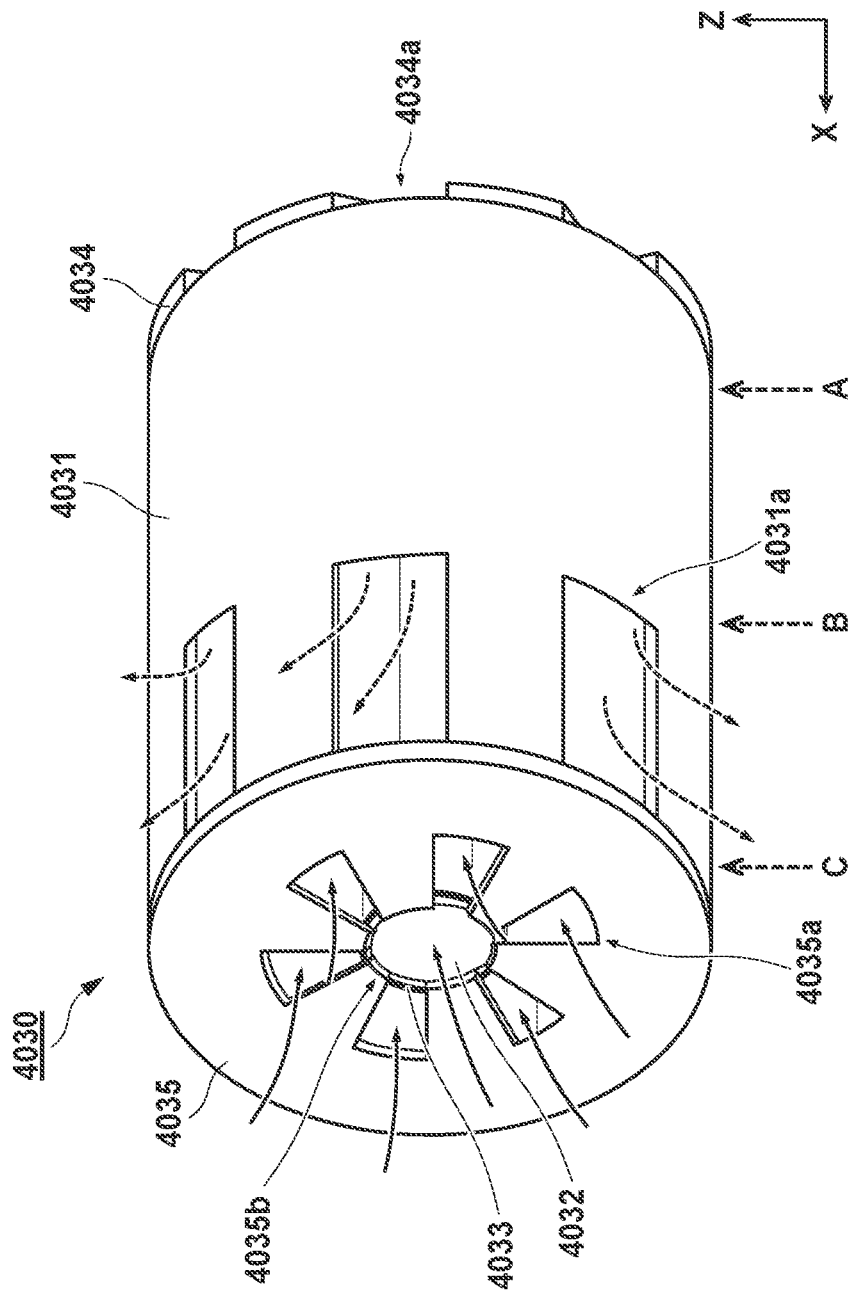
FIG. 26 is a perspective view of the heat exchanger viewed from a diagonal front side.
Figure 27:
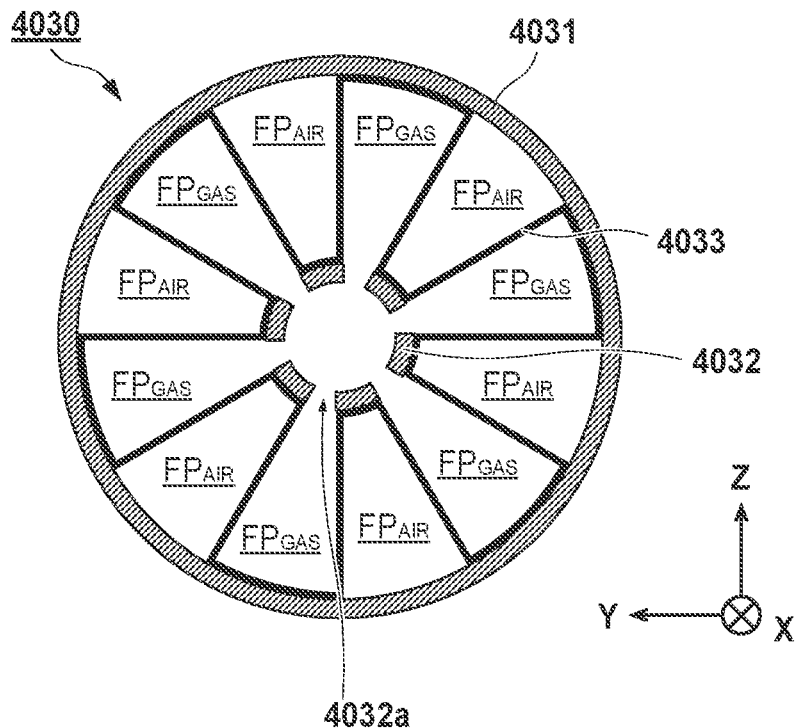
FIG. 27 is a Y-Z sectional view of the heat exchanger at a position A.
Figure 28:
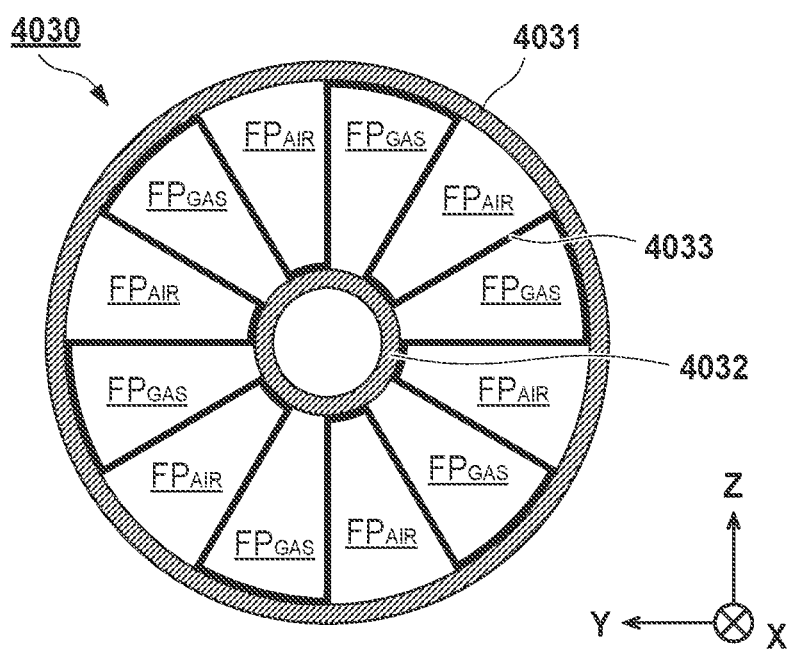
FIG. 28 is a Y-Z sectional view of the heat exchanger at a position B.
Figure 29:
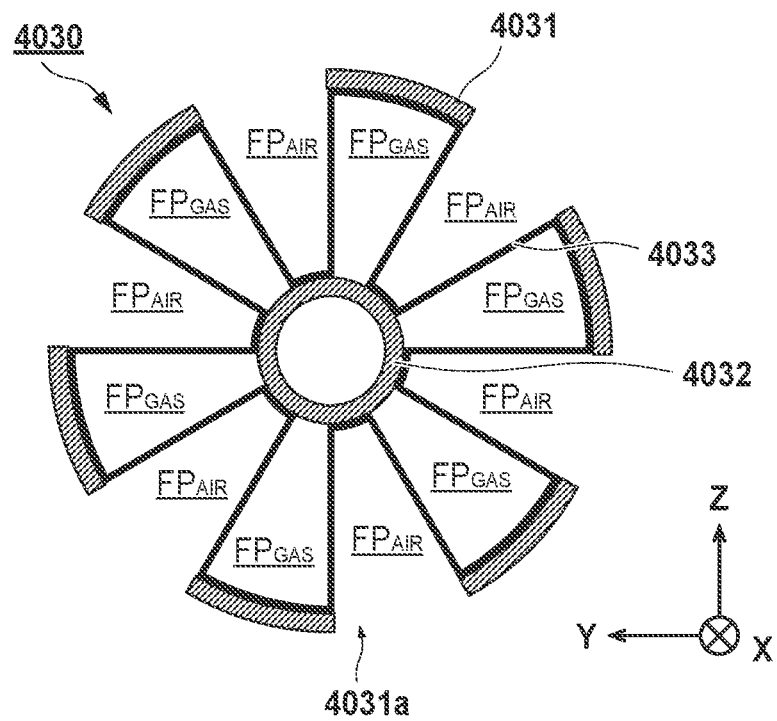
FIG. 29 is a Y-Z sectional view of the heat exchanger at a position C.

FIGS. 24 to 29 are views for explaining an example of the arrangement of the heat exchanger 4030 according to this embodiment. FIG. 24 is a perspective view of the heat exchanger 4030 viewed from a diagonal rear side. FIG. 25 shows a state in which a first closing member 4034 is detached in the heat exchanger 4030 shown in FIG. 24. FIG. 26 is a perspective view of the heat exchanger 4030 viewed from a diagonal front side. FIG. 27 is a Y-Z sectional view of the heat exchanger 4030 at a position A, FIG. 28 is a Y-Z sectional view of the heat exchanger 4030 at a position B, and FIG. 29 is a Y-Z sectional view of the heat exchanger 4030 at a position C. The positions A to C are positions in the front-and-rear direction (X direction) of the flying body, and indicated by arrows in FIGS. 24 to 26.

The heat exchanger 4030 is arranged in (attached to) the combustion chamber 4014, more specifically, in the exhaust pipe 4017 configured to discharge the combustion gas that is combusted in the combustion chamber 4014 and obtains a high temperature and a high pressure. In the example shown in FIGS. 22 and 23, the heat exchanger 4030 is attached to the inside of the tubular inner circumferential case that constitutes the outer wall of the exhaust pipe 4017. The heat exchanger 4030 according to this embodiment can include an outer circumferential member 4031, an inner circumferential member 4032, a partition wall member 4033, the first closing member 4034, and a second closing member 4035.

The outer circumferential member 4031 and the inner circumferential member 4032 are tubular (for example, cylindrical) members.

The outer circumferential member 4031 is configured to have an outer shape smaller than the inner diameter of the inner circumferential case that constitutes the outer wall of the exhaust pipe 4017 such that the outer circumferential member 4031 can be fitted in the inner circumferential case. As an example, the outer circumferential member 4031 is preferably configured to have an outer shape slightly smaller than the inner diameter of the inner circumferential case. In addition, the outer circumferential member 4031 includes opening portions 4031a (first opening portions) in parts of regions where air channels $FP_{AIR}$ to be described later are located, on the side of the second closing member 4035 (+X direction side). Each opening portion 4031a is connected to the compression chamber 4013 via the guide member 4019a, and the compressed air that has passed through the air channel $FP_{AIR}$ is sent from the opening portion 4031a to the compression chamber 4013 via the guide member 4019a.

The inner circumferential member 4032 has a diameter smaller than that of the outer circumferential member 4031 and is disposed inside the outer circumferential member 4031. The inner circumferential member 4032 includes opening portions 4032a (second opening portions) in parts of regions where gas channels $FP_{GAS}$ to be described later are located, on the side of the first closing member 4034 (−X direction side). Each opening portion 4032a is configured to guide the combustion gas that has passed through the gas channel $FP_{GAS}$ to the inside of the inner circumferential member 4032. That is, the combustion gas that has passed through the gas channel $FP_{GAS}$ is sent from the opening portion 4032a to the inside of the inner circumferential member 4032, and after that, discharged to the outside of the heat exchanger 4030 (the outside of the power supply apparatus 4001) via an opening portion 4034b of the first closing member 4034 to be described later.

The partition wall member 4033 configured to partition (separate) the air channels $FP_{AIR}$ (first channels) through which the compressed air sent from the diffuser 4012 passes and the gas channels $FP_{GAS}$ (second channels) through which the combustion gas that is combusted in the combustion chamber 4014 and obtains a high temperature and a high pressure passes is provided between the outer circumferential member 4031 and the inner circumferential member 4032. The partition wall member 4033 is preferably made of a material such as a metal with a high thermal conductivity such that heat exchange between the compressed air that flows through the air channels $FP_{AIR}$ and the combustion gas that flows through the gas channels $FP_{GAS}$ is efficiently performed. In addition, the partition wall member 4033 is preferably configured such that the air channels $FP_{AIR}$ and the gas channels $FP_{GAS}$ are alternately arranged in the circumferential direction (the rotation direction about the X-axis). In this embodiment, the partition wall member 4033 is configured such that the air channels $FP_{AIR}$ and the gas channels $FP_{GAS}$ are extended along the longitudinal direction (X direction) of the housing 4002. As an example, as shown in FIG. 25 or FIGS. 27 to 29, the partition wall member 4033 has a shape formed by folding a plate (for example, one metal plate) into a pleat and rounding it in the circumferential direction (the rotation direction about the X-axis). The outer surface is connected to the inner wall of the outer circumferential member 4031, and the inner surface is connected to the outer wall of the inner circumferential member 4032. In the example shown in FIG. 25 and FIGS. 27 to 29, the partition wall member 4033 is configured such that a plurality of (six) air channels $FP_{AIR}$ and a plurality of (six) gas channels $FP_{GAS}$ are alternately formed along the circumferential direction about the center axis CA. However, the number of air channels $FP_{AIR}$ and the number of gas channels $FP_{GAS}$ are not limited to six, and the partition wall member 4033 may be configured to form these in another number.

The first closing member 4034 is a member configured to close one end of the tubular outer circumferential member 4031, and has a function as a lid for the air channels $FP_{AIR}$ and the gas channels $FP_{GAS}$, which are formed by the outer circumferential member 4031, the inner circumferential member 4032, and the partition wall member 4033. The first closing member 4034 is a member connected to the outer circumferential member 4031, the inner circumferential member 4032, and the partition wall member 4033 on the rear side of the power supply apparatus 4001. As shown in FIGS. 24 and 25, in the first closing member 4034, opening portions 4034a (third opening portions) are provided in at least parts of the regions where the air channels $FP_{AIR}$ are located. As shown in FIGS. 22 and 23, a tube that forms the channel 4012a through which the compressed air sent from the diffuser 4012 passes is attached to each opening portion 4034a, and the compressed air that has passed through the channel 4012a is sent from the opening portion 4034a to the air channel $FP_{AIR}$. The compressed air that has passed through the air channel $FP_{AIR}$ is sent from the opening portion 4031a provided in the outer circumferential member 4031 to the compression chamber 4013 via the guide member 4019a. Additionally, as shown in FIGS. 24 and 25, in the first closing member 4034, the opening portion 4034b (fourth opening portion) is provided in at least a part of the region where the inner circumferential member 4032 is located. The combustion gas that has passed through the gas channels $FP_{GAS}$ is sent from the opening portions 4032a provided in the inner circumferential member 4032 to the inside of the inner circumferential member 4032, and after that, discharged from the opening portion 4034b of the first closing member 4034 to the outside of the heat exchanger 4030 (the outside of the power supply apparatus 4001).

The second closing member 4035 is a member configured to close the other end (the end on the opposite side of the end closed by the first closing member) of the tubular outer circumferential member 4031, and has a function as a lid for the air channels $FP_{AIR}$ and the gas channels $FP_{GAS}$, which are formed by the outer circumferential member 4031, the inner circumferential member 4032, and the partition wall member 4033. The second closing member 4035 is a member connected to the outer circumferential member 4031, the inner circumferential member 4032, and the partition wall member 4033 on the front side of the power supply apparatus 4001. As shown in FIG. 26, in the second closing member 4035, opening portions 4035a (fifth opening portions) are provided in at least parts of the regions where the gas channels $FP_{GAS}$ are located, and the combustion gas that is combusted in the combustion chamber 4014 and obtains a high temperature and a high pressure flows from the opening portions 4035a to the gas channels $FP_{GAS}$. As described above, the combustion gas that has passed through the gas channels $FP_{GAS}$ is sent from the opening portions 4032a provided in the inner circumferential member 4032 to the inside of the inner circumferential member 4032, and after that, discharged from the opening portion 4034b of the first closing member 4034 to the outside of the heat exchanger 4030 (the outside of the power supply apparatus 4001). Additionally, in the second closing member 4035, an opening portion 4035b (sixth opening portion) can be provided in at least a part of the region where the inner circumferential member 4032 is located. The combustion gas that has flowed from the opening portion 4035b to the inside of the inner circumferential member 4032 is discharged from the opening portion 4034b of the first closing member 4034 to the outside of the heat exchanger 4030. Note that when increasing the amount of the combustion gas to be passed through the gas channels $FP_{GAS}$ to increase the exchange amount of thermal energy with the compressed air, the opening portion 4035b need not be provided in the second closing member 4035, or the size of the opening portion 4035b may be adjusted.

In the heat exchanger 4030 with the above-described arrangement, heat exchange is performed, via the partition wall member 4033, between the compressed air passing through the air channels $FP_{AIR}$ and the high-temperature combustion gas passing through the gas channels $FP_{GAS}$. That is, thermal energy is supplied, via the partition wall member 4033, from the high-temperature combustion gas passing through the gas channels $FP_{GAS}$ to the compressed air flowing through the air channels $FP_{AIR}$. This makes it possible to effectively use the thermal energy of the combustion gas, efficiently perform combustion of the gas mixture in the gas turbine engine 4010 (combustion chamber 4014), and improve the power generation efficiency of the power generator 4020. This is also advantageous from the viewpoint of safety of the power supply apparatus 4001 because the temperature of the combustion gas discharged from the power supply apparatus 4001 (housing 4002) can be lowered.

Figure 30:
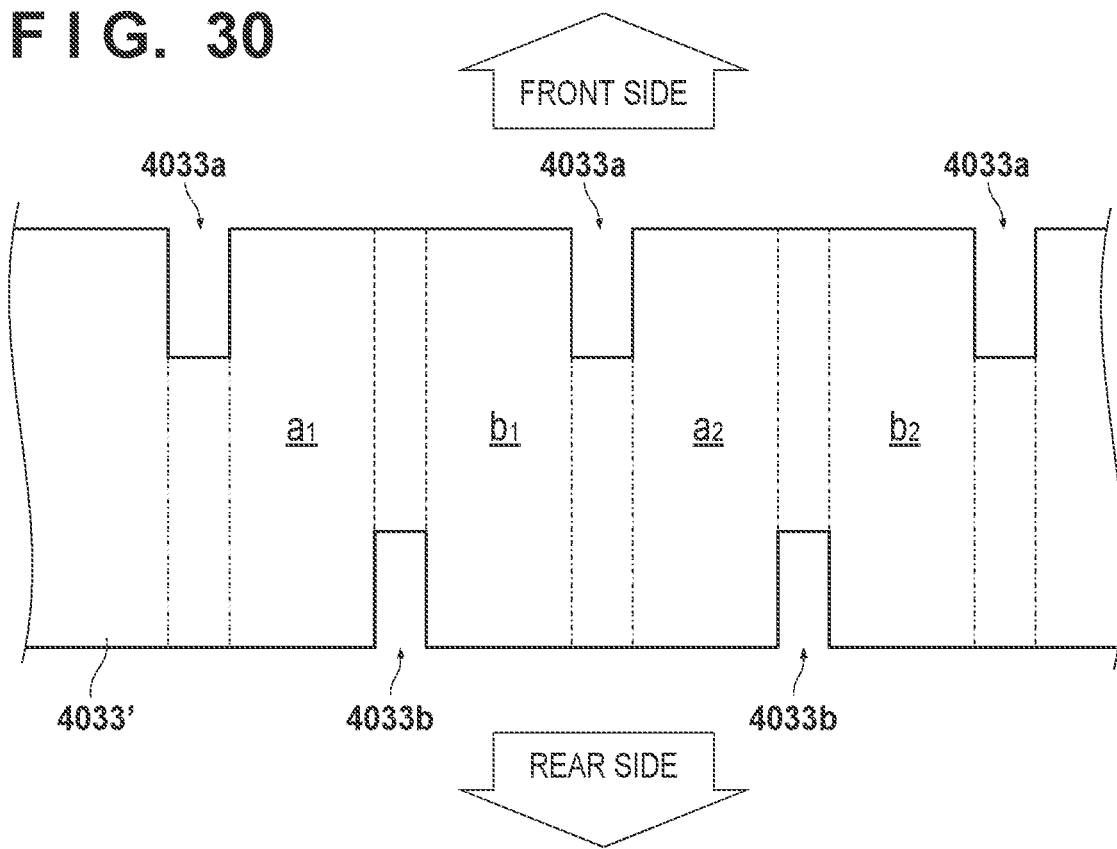
FIG. 30 is a developed view of a partition wall member.

According to the above-described arrangement example of the heat exchanger 4030, in the partition wall member 4033 formed into a pleat, the spaces (regions) opened to the outside are defined as the air channels $FP_{AIR}$, and the spaces (regions) opened to the inside are defined as the gas channels $FP_{GAS}$. However, the reverse is also possible. That is, the spaces opened to the outside may be defined as the gas channels $FP_{GAS}$, and the spaces opened to the inside may be defined as the air channels $FP_{AIR}$. In this case, in the partition wall member 4033, as shown in FIG. 30, a notch portion 4033a can be provided at each of positions corresponding to the opening portions 4031a of the outer circumferential member 4031, and a notch portion 4033b can be provided at each of positions corresponding to the opening portions 4032a of the inner circumferential member 4032. FIG. 30 shows an example of a developed view of the partition wall member 4033 (that is, a view of a plate 4033' before folded into a pleat to form the partition wall member 4033). The plate 4033' can be a metal plate. In the plate 4033' shown in FIG. 30, the notch portion 4033a is formed in correspondence with the position of the opening portion 4031a of the outer circumferential member 4031, and the notch portion 4033b is formed in correspondence with the position of the opening portion 4032a of the inner circumferential member 4032. When the plate 4033' is bent by valley-folding at the broken lines and mountain-folding at the alternate long and short dashed lines on the sheet surface such that planes a1 and b1 face each other, and planes a2 and b2 face each other, the partition wall member 4033 can be formed from the plate 4033'.

Embodiment 4-2

Figure 31:
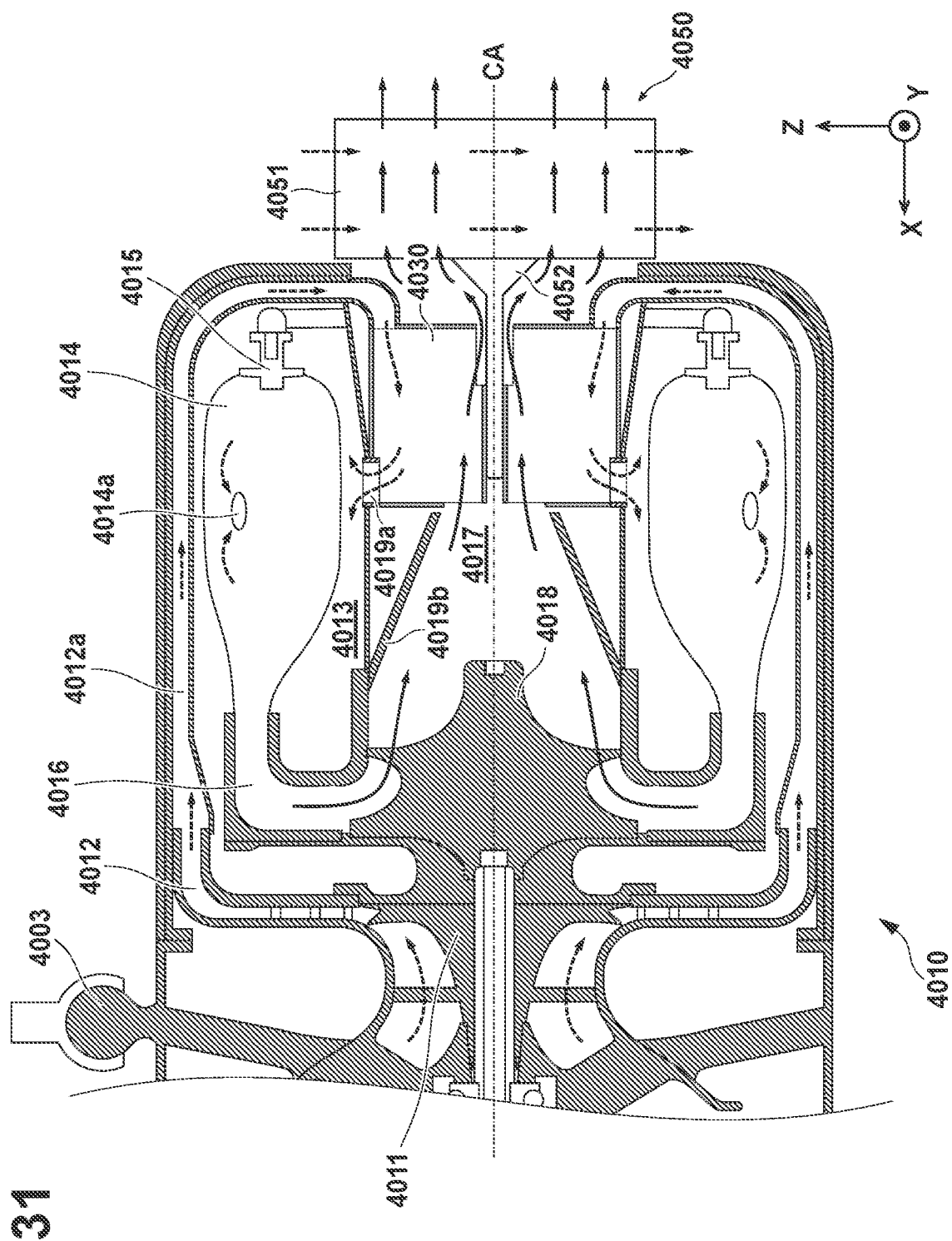
FIG. 31 is an enlarged sectional view showing the rear structure of a power supply apparatus according to Embodiment 4-2.

FIG. 31 is an enlarged sectional view showing the rear structure of a power supply apparatus 4001 according to Embodiment 4-2. This embodiment basically takes over Embodiment 4-1 but is different from Embodiment 4-1 in that a second heat exchanger 4050 (second heat exchange unit) is added to the power supply apparatus 4001.

The second heat exchanger 4050 is attached to an exhaust port Po of the power supply apparatus 4001, and can include a heat exchange member 4051 and a connecting member 4052.

Figure 32:
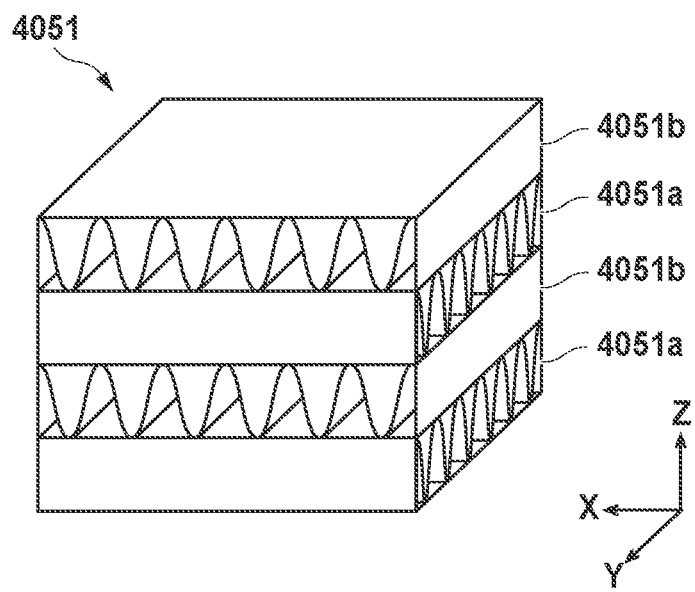
FIG. 32 is a view showing an example of the shape of the heat exchange member of a second heat exchanger.

The heat exchange member 4051 performs heat exchange (exchange of thermal energy) between a combustion gas discharged from the exhaust port Po of the power supply apparatus 4001 (that is, a heat exchanger 4030 (an opening portion 4034b of a first closing member 4034)) and air outside the power supply apparatus 4001 (housing 4002). For example, the heat exchange member 4051 is made of a material such as a metal with a high thermal conductivity, and has a shape formed by alternately stacking a first channel layer 4051a and a second channel layer 4051b, as shown in FIG. 32. The heat exchange member 4051 shown in FIG. 32 has a shape formed by alternately stacking two first channel layers 4051a and two second channel layers 4051b. However, the number of first channel layers 4051a and the number of second channel layers 4051b are not limited to two, and may be one, or three or more.

The first channel layer 4051a is a channel configured to flow the combustion gas discharged from the heat exchanger 4030 (the opening portion 4034b of the first closing member 4034). The first channel layer 4051a is formed by folding a metal plate into a pleat so as to form a channel that flows the combustion gas discharged from the heat exchanger 4030 in a first direction. The first direction is a direction (−X direction) in which the combustion gas is discharged from the exhaust port Po. The second channel layer 4051b is a channel configured to flow the air outside the power supply apparatus 4001 (housing 4002). The second channel layer 4051b is formed by folding a metal plate into a pleat so as to form a channel that flows the outside air in a second direction different from the first direction. The second direction may be a direction (for example, the Y direction or the Z direction) perpendicular to the first direction.

The connecting member 4052 is a member configured to mechanically connect the heat exchange member 4051 of the second heat exchanger 4050 to the heat exchanger 4030. As shown in FIG. 31, the connecting member 4052 is connected (joined) to the heat exchange member 4051 and is also configured to be fitted inside the inner circumferential member 4032 of the heat exchanger 4030. When the connecting member 4052 is formed in this way, the second heat exchanger 4050 can optionally be added to the power supply apparatus 4001 later.

As described above, in the power supply apparatus 4001 according to this embodiment, the second heat exchanger 4050 that performs heat exchange (exchange of thermal energy) between the combustion gas discharged from the heat exchanger 4030 and the air outside the power supply apparatus 4001 (housing 4002) is also provided. This is advantageous from the viewpoint of safety of the power supply apparatus 4001 because the temperature of the combustion gas discharged from the power supply apparatus 4001 (housing 4002) can be lowered (dispersed).

Other Embodiments

In Embodiments 4-1 and 4-2, a helicopter has been exemplified as the flying body 4100. The present invention can be applied not only to such a rotorcraft but also to aircrafts such as a fixed-wing aircraft and an airship and also to a flying type personal mobility, a spaceship, a space shuttle, and the like. The fixed-wing aircraft can include a glider aircraft represented by a glider and an aircraft represented by a propeller plane. The present invention is also applicable to a flying body that is not of electric propulsion type.

The connecting portion of the power supply apparatus 4001 can be set not only to the bottom surface of the airframe 4101 but also to the upper surface of the wing portion of the airframe 4101 or the bottom surface of the wing portion of the airframe 4101. The power supplied by the power supply apparatus 4001 may be power supplied to a power load that forms a driving source such as a motor, power supplied to a power load other than the driving source, or power supplied to both. A plurality of power supply apparatuses 4001 may be provided in one flying body. When providing a plurality of power supply apparatuses, they may be juxtaposed in the widthwise direction of the flying body, or may be arranged in a line in the front-and-rear direction of the flying body.

Summary of Fourth Embodiment

The fourth embodiment discloses at least the following power supply apparatus.
1. A power supply apparatus according to the fourth embodiment is
a power supply apparatus (for example, 4001) configured to supply power to a power load (for example, 4105, 4106) of a flying body (for example, 4100), comprising:
a power generator (for example, 4020) including a rotating shaft (for example, 4006);
an engine (for example, 4010) configured to rotationally drive the rotating shaft;
a housing (for example, 4002) arranged outside an airframe (for example, 4101) of the flying body and configured to store the power generator and the engine; and
a heat exchanger (for example, 4030) configured to perform heat exchange between a combustion gas discharged from the engine and air supplied to the engine.

According to this arrangement, it is possible to improve the power generation efficiency of the power generator by effectively using the thermal energy of the combustion gas and improving the combustion efficiency of the engine. This is also advantageous from the viewpoint of safety of the power supply apparatus because the temperature of the combustion gas discharged from the power supply apparatus (housing) can be lowered.
2. In the fourth embodiment,
the housing includes an exhaust pipe (for example, 4017) configured to discharge the combustion gas from the engine, and
the heat exchanger is arranged inside the exhaust pipe.

According to this arrangement, it is possible to make the power supply apparatus (housing) compact.
3. In the fourth embodiment,
the engine includes a combustion chamber (for example, 4014) configured to combust a gas mixture of air and fuel and discharge the combustion gas generated by the combustion,
the combustion chamber is arranged, along a circumferential direction about an axis (for example, CA) extended from the rotating shaft, in the housing to surround the axis, and the heat exchanger is arranged inside the combustion chamber.

According to this arrangement, it is possible to make the power supply apparatus (housing) compact.
4. In the fourth embodiment,
the heat exchanger includes a partition wall member (for example, 4033) configured to partition a first channel (for example, $FP_{GAS}$) serving as a channel of the combustion gas discharged from the engine and a second channel (for example, $FP_{AIR}$) serving as a channel of the air supplied to the engine.

According to this arrangement, it is possible to efficiently perform heat exchange between the combustion gas discharged from the engine and the air supplied to the engine.
5. In the fourth embodiment,
a plurality of first channels and a plurality of second channels are alternately formed along a circumferential direction about an axis (for example, CA) extended from the rotating shaft.

According to this arrangement, it is possible to efficiently perform heat exchange between the combustion gas discharged from the engine and the air supplied to the engine.
6. In the fourth embodiment,
the partition wall member has a shape formed by folding a plate into a pleat and rounding the plate in the circumferential direction.

According to this arrangement, it is possible to easily form the partition wall member of the heat exchanger and improve the heat exchange efficiency between the combustion gas and the air.
7. In the fourth embodiment,
the heat exchanger includes a tubular outer circumferential member (for example, 4031) and a tubular inner circumferential member (for example, 4032) arranged inside the outer circumferential member, and the partition wall member is arranged between the outer circumferential member and the inner circumferential member.

According to this arrangement, it is possible to improve the strength of the easily formed partition wall member.
8. In the fourth embodiment,
the heat exchanger includes a first closing member (for example, 4034) configured to close one end of the tubular outer circumferential member, and a second closing member (for example, 4035) configured to close the other end of the outer circumferential member,
the outer circumferential member includes a first opening portion (for example, 4031*a*) in a part of a region where the first channel is located, on a side of the second closing member,
the inner circumferential member includes a second opening portion (for example, 4032*a*) in a part of a region where the second channel is located, on a side of the first closing member,
the first closing member includes a third opening portion (for example, 4034*a*) in at least a part of the region where the first channel is located, and includes a fourth opening portion (for example, 4034*b*) in at least a part of a region where the inner circumferential member is located, the second closing member includes a fifth opening portion (for example, 4035*a*) in at least a part of the region where the second channel is located, and in the heat exchanger, the air passes through the first channel via the third opening portion of the first closing member and is supplied to the engine via the first opening portion of the outer circumferential member, and the combustion gas passes through the second channel via the fifth opening portion of the second closing member and is discharged via the second opening portion of the inner circumferential member and the fourth opening portion of the first closing member.

According to this arrangement, it is possible to provide a detailed arrangement of the heat exchanger that performs heat exchange between the combustion gas and the air.

9. In the fourth embodiment, the power supply apparatus further comprises a second heat exchanger (for example, 4050) configured to perform heat exchange between the combustion gas discharged from the heat exchanger and air outside the housing.

According to this arrangement, it is advantageous from the viewpoint of safety of the power supply apparatus because the temperature of the combustion gas discharged from the power supply apparatus (housing) can be lowered (dispersed).

10. In the fourth embodiment, the second heat exchanger includes a connecting member (for example, 4052) configured to connect the heat exchanger.

According to this arrangement, it is possible to easily attach the second heat exchanger to the power supply apparatus including the heat exchanger.

11. In the fourth embodiment, the power supply apparatus further comprises a second heat exchanger (for example, 4050) configured to perform heat exchange between the combustion gas discharged from the heat exchanger and air outside the housing, wherein the second heat exchanger includes a connecting member (for example, 4052) configured to connect the heat exchanger and the second heat exchanger by fitting in the inner circumferential member of the heat exchanger.

According to this arrangement, it is possible to easily optionally add (attach) the second heat exchanger to the power supply apparatus including the heat exchanger later.

12. In the fourth embodiment, in the housing, the power generator and the engine are arrayed along a front-and-rear direction of the flying body.

According to this arrangement, it is possible to arrange the engine and the power generator without wasting a space and make the power supply apparatus compact.

13. In the fourth embodiment, the power supply apparatus further comprises a tank (for example, 4005) configured to reserve fuel of the engine, wherein the tank is stored in the housing.

According to this arrangement, since the power supply apparatus can be formed as one unit that generates power only by supplying fuel, exchange or addition of a power supply apparatus to the airframe of the flying body can easily be performed.

Fifth Embodiment

An electric propulsion type flying body including an electric driving source such as a motor has been proposed. For example, U.S. Pat. No. 9,248,908 discloses an electric propulsion type helicopter including a motor that is driven by power of a battery. U.S. Pat. No. 8,727,271 discloses an electric propulsion type helicopter including a motor that is driven by power of a battery or a gas turbine engine and a power generator.

In an arrangement in which a power supply apparatus such as a battery is disposed in the airframe of a flying body, like U.S. Pat. No. 9,248,908 or 8,727,271, to ensure the disposition space, the degree of freedom in designing another space in the airframe such as a cabin space lowers. Hence, it is considered that the power supply apparatus is arranged outside. This is advantageous if the maintainability of the power supply apparatus is high.

It is an object of this embodiment to improve the maintainability of a power supply apparatus arranged outside the airframe of a flying body.

Embodiment 5-1

Figure 33:
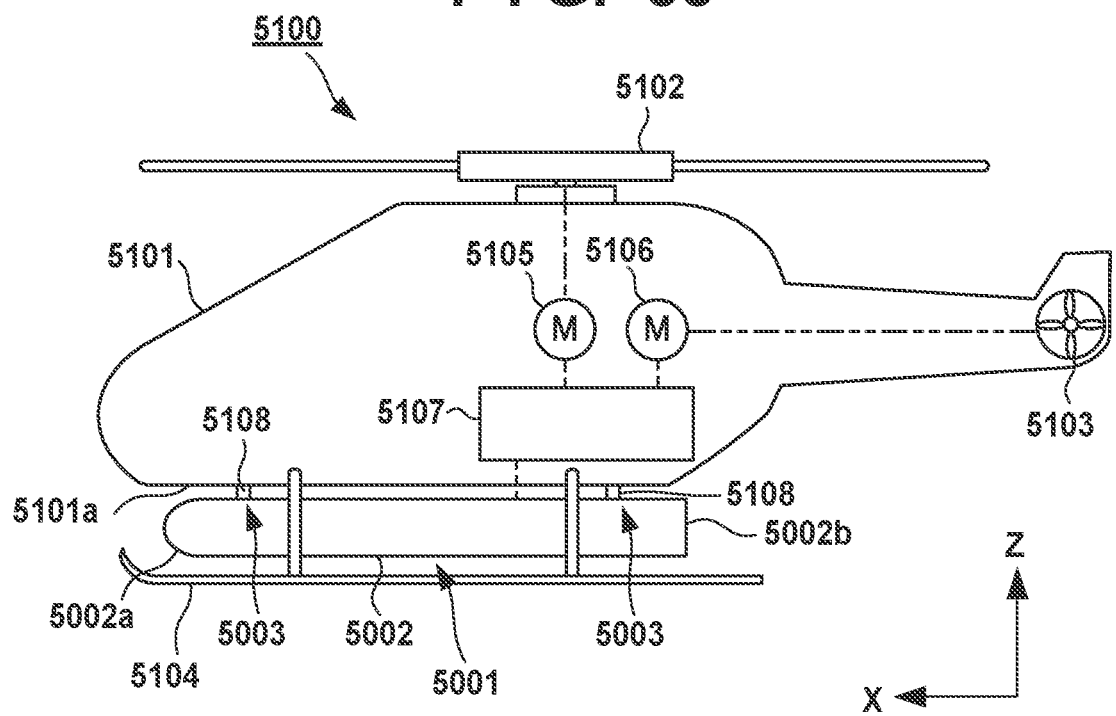
FIG. 33 is a schematic view of a flying body including a power supply apparatus according to Embodiment 5-1.

FIG. 33 is a schematic view of a flying body 5100 including a power supply apparatus 5001 according to Embodiment 5-1. In FIG. 33, arrows X, Y, and Z represent the front-and-rear direction, the widthwise direction (left-and-right direction), and the up-and-down direction of the flying body 5100, respectively. The flying body 5100 according to this embodiment is an electric propulsion type flying body using motors 5105 and 5106 as driving sources and, more particularly, a helicopter.

The flying body 5100 includes an airframe 5101, a main rotor 5102 provided on the upper side of the airframe 5101, a tail rotor 5103 provided in the rear portion of the airframe 5101, and a skid 5104. The motor 5105 is a driving source that rotates the main rotor 5102, and the motor 5106 is a driving source that rotates the tail rotor 5103. Driving of the motors 5105 and 5106 is controlled by a control device 5107 using power supplied from the power supply apparatus 5001.

Figure 34:
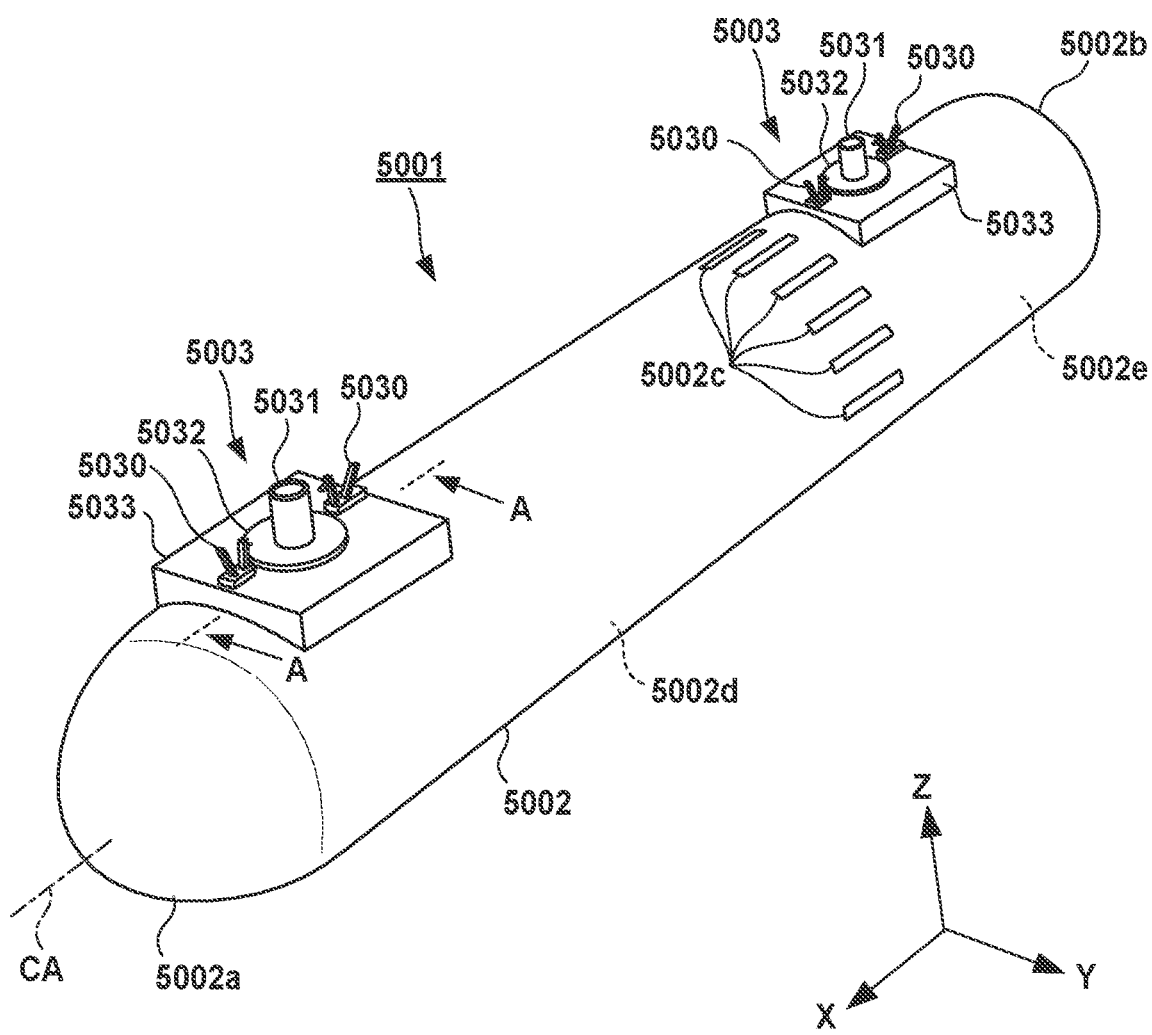
FIG. 34 is a perspective view of the power supply apparatus shown in FIG. 33.

The power supply apparatus 5001 functions as the main power supply of the flying body 5100, and supplies not only the driving power for the motors 5105 and 5106 but also power to each electric load in the flying body 5100. The power supply apparatus 5001 will be described with reference to FIG. 34 in addition to FIG. 33. FIG. 34 is a perspective view of the power supply apparatus 5001.

The power supply apparatus 5001 includes a housing 5002 that forms the outer wall, and a plurality of connecting portions 5003 that connect the housing 5002 and the airframe 5101. The connecting portions 5003 are connected to connected portions 5108 of the airframe 5101. The housing 5002 is arranged outside the airframe 5101 and, in this embodiment, supported at the center in the Y direction while being hung from a bottom wall 5101*a* of the airframe 5101 via the connecting portions 5003. When the housing 5002 is arranged outside the airframe 5101, occupation of the internal space of the airframe 5101 by the power supply apparatus 5001 can be avoided. This contributes to expansion of a cabin, improvement of the layout property of other constituent components, and improvement of the maintainability of the power supply apparatus 5001.

The housing 5002 has an outer shape long in the X direction, and in this embodiment, has a pod-like outer shape long in the X direction. In other words, the X direction is the longitudinal direction of the housing 5002. When the housing 5002 has such an outer shape, the air resistance during forward flight of the flying body 5100 can be reduced while arranging the housing 5002 outside the airframe 5101. The housing 5002 according to this embodiment is a cylindrical hollow body long in the X direction. The influence of a cross wind can be made smaller. The housing 5002 can be formed by, for example, connecting a plurality of cylindrical components in the X direction. In FIG. 34, a center axis CA represents the center axis of the cylinder.

Of a distal end portion 5002a and a rear end portion 5002b of the housing 5002, the distal end portion 5002a has a tapered shape whose diameter is reduced toward the front side. In this embodiment, the distal end portion has a hemispherical shape but may have a triangular pyramid shape. When the distal end portion 5002a is formed into a tapered shape, the air resistance during forward flight of the flying body 5100 can further be reduced. A plurality of air intake ports 5002c configured to take air into the power generation unit 5004 to be described later are formed in the housing 5002. Each air intake port 5002c is a slit-like opening long in the X direction, and a plurality of air intake ports 5002c are formed in the circumferential direction of the housing 5002.

The plurality of (here, two) connecting portions 5003 are provided apart in the X direction. One connecting portion 5003 may be provided at the center of the housing 5002 in the X direction. The housing 5002 is connected by the connecting portions 5003 while being apart from the airframe 5101. Details of the connecting portions 5003 will be described later.

Figure 35:
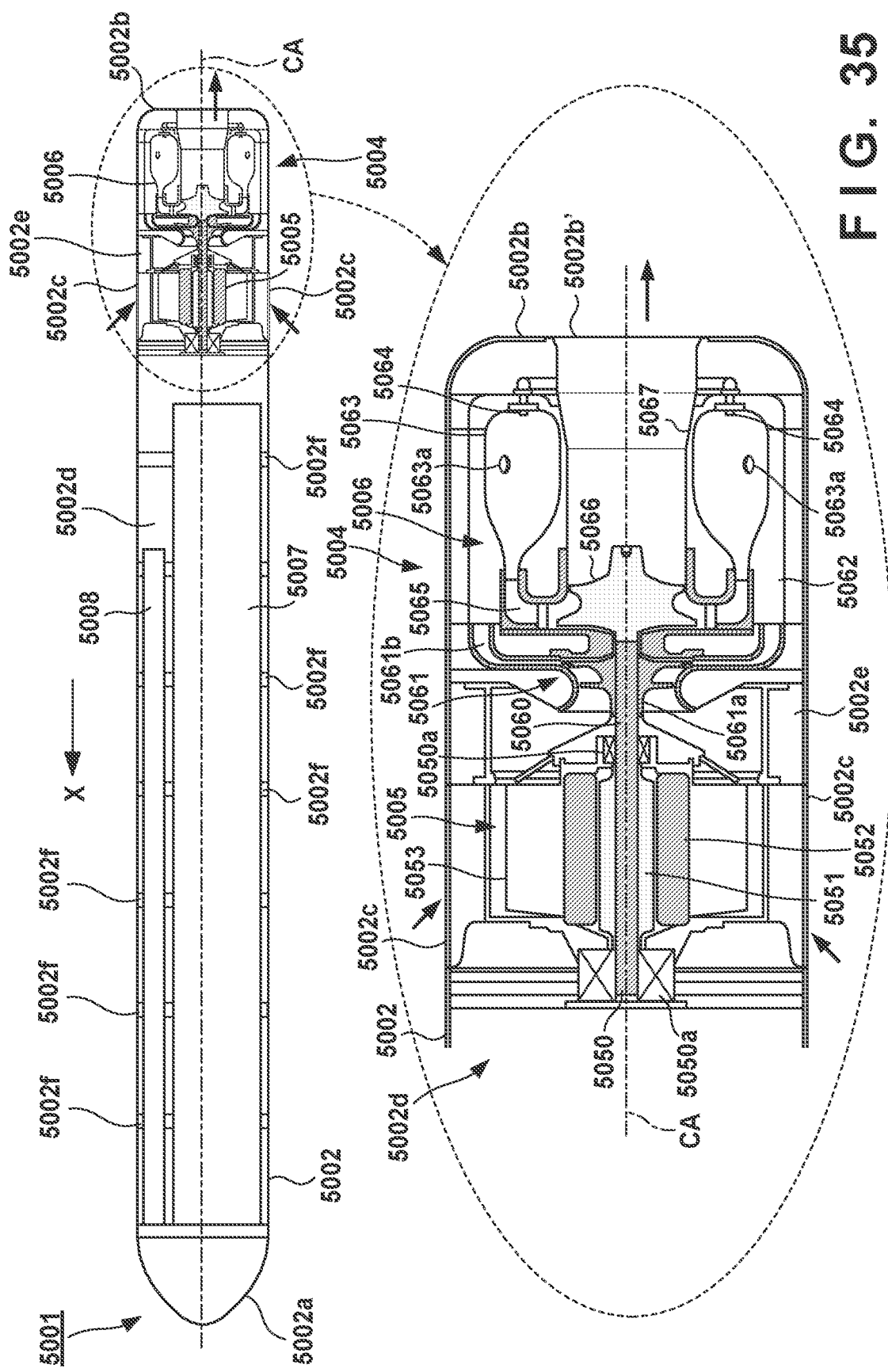
FIG. 35 shows an explanatory view and a partial enlarged view of the internal structure of the power supply apparatus shown in FIG. 33.

The internal structure of the housing 5002 will be described next with reference to FIG. 35. FIG. 35 shows an explanatory view and a partial enlarged view of the internal structure of the power supply apparatus, and corresponds to a sectional view of the power supply apparatus 5001 passing through the center axis CA.

The internal space of the housing 5002 is roughly divided into a reserving portion 5002d on the front side and a storage portion 5002e on the rear side. The reserving portion 5002d and the storage portion 5002e are arranged in the longitudinal direction (X direction) of the housing 5002. With this layout, the power supply apparatus 5001 that is long in the X direction and has a low air resistance can easily be formed. A plurality of annular reinforcing members 5002f are provided on the inner circumferential surface of the housing 5002 while being apart in the X direction, thereby improving the strength of the housing 5002.

The power generation unit 5004 is stored in the storage portion 5002e. The reserving portion 5002d is a space that reserves the fuel (light oil or the like) of the power generation unit 5004. In this embodiment, a fuel tank 5007 is stored. However, the reserving portion 5002d itself may form a fuel tank. The fuel tank 5007 is a tubular hollow body long in the X direction, and the reserved fuel is supplied to the power generation unit 5004 by a pump (not shown). In this embodiment, the range in the X direction in the housing 5002 is designed larger for the reserving portion 5002d than the storage portion 5002e, and the reserving portion 5002d can reserve more fuel. This can increase the cruising range of the flying body 5100.

In this embodiment, the reserving portion 5002d is used as a space to store a control unit 5008. The control unit 5008 controls the power generation unit 5004. In this embodiment, the control unit 5008 is provided in the power supply apparatus 5001. However, the control unit 5008 may not be provided in the power supply apparatus 5001, and the control unit 5107 of the flying body 5100 may control the power generation unit 5004.

The power generation unit 5004 includes a power generator 5005 and a gas turbine engine 5006, and the power generator 5005 generates power by the output of the gas turbine engine 5006. The gas turbine engine 5006 includes a rotating shaft 5050 provided on the same axis as the rotation axis CA of the housing 5002. When the rotating shaft 5050 is provided on the same axis as the rotation axis CA, the larger gas turbine engine 5006 can be stored in the housing 5002 having a cylindrical shape without wasting a space.

The gas turbine engine 5006 includes a compressor 5061. The compressor 5061 includes an impeller 5061a attached to a rotating shaft 5060, and a diffuser 5061b. Along with the rotation of the impeller 5061a, air is sent from the air intake ports 5002c to a compression chamber 5062 while being compressed via the diffuser 5061b.

The compressed air in the compression chamber 5062 flows into a combustion chamber 5063 from opening portions 5063a provided in the peripheral wall of the combustion chamber 5063 or other opening portions (not shown). In the combustion chamber 5063, a plurality of fuel injection nozzles 5064 are provided in the circumferential direction of the rotation axis CA. The fuel reserved in the fuel tank 5007 is supplied to the fuel injection nozzles 5064 via a pipe (not shown), and the fuel injection nozzles 5064 inject the fuel into the combustion chamber 5063. At the time of start, an ignition device (not shown) ignites the gas mixture in the combustion chamber 5063. After that, combustion of the gas mixture continuously occurs in the combustion chamber 5063.

A combustion gas flow that has obtained a high temperature and a high pressure in the combustion chamber 5063 jets out from a turbine nozzle 5065 to a tubular exhaust pipe 5067 on the same axis as the center axis CA, and rotates a turbine 5066 attached to the rotating shaft 5060 in the process. The turbine 5066, the rotating shaft 5060, and the impeller 5061a integrally rotate. An exhaust portion 5002b' that is an opening portion communicating with the exhaust pipe 5067 is formed at the rear end portion 5002b of the housing 5002, and the combustion gas flow (exhaust gas flow) is discharged to the rear side of the housing 5002. In this embodiment, since the gas turbine engine 5006 is arranged to be adjacent to the rear end portion 5002b of the housing 5002, exhaust to the rear side can smoothly be performed. Note that in this embodiment, the gas turbine engine 5006 exclusively aims at driving the power generator 5005, and actively using the exhaust gas flow as the propulsion force of the flying body 5100 is not assumed. However, a mode in which the exhaust gas flow is used as an auxiliary propulsion force can also be employed.

The power generator 5005 includes the rotating shaft 5050 on the same axis as the rotating shaft 5060. That is, the rotating shaft 5050 is also provided on the same axis as the center axis CA, and the larger power generator 5005 can be stored in the housing 5002 having a cylindrical shape without wasting a space. In this embodiment, the rotating shaft 5050 and the rotating shaft 5060 are integrally formed. Bearings 5050a that rotatably support the rotating shaft 5050

(and the rotating shaft 5060) are provided at the two end portions of the power generator 5005 in the X direction.

A rotor 5051 such as a permanent magnet is provided on the rotating shaft 5050, and a stator 5052 such as a coil is provided around the rotor 5051. A plurality of cooling fins 5053 are provided around the stator 5052 in the circumferential direction of the rotating shaft 5050, and cool the power generator 5005 by air cooling.

The control unit 5008 includes a circuit that controls power generation of the power generator 5005, and a circuit that controls driving of the gas turbine engine 5006. An auxiliary power supply such as a lead battery may be provided as a power supply at the time of activation of the control unit 5008. The auxiliary power supply may be provided in the power supply apparatus 5001, or an auxiliary power supply provided on the side of the airframe 5101 may be used. The power generated by the power generator 5005 is supplied to the control unit 5107 of the flying body 5100 via a cable 5009 (shown in FIG. 37 and the like). The control unit 5008 and the control unit 5107 may be communicable, and the control unit 5008 may perform power generation control in accordance with an instruction from the control unit 5107.

In the power supply apparatus 5001 having the above-described arrangement, the gas turbine engine 5006 is driven by the fuel reserved in the fuel tank 5007, the rotating shaft 5050 is rotated by the rotation of the rotating shaft 5060, which is the output of the gas turbine engine 5006, and the power generator 5005 generates power. The generated power is supplied to the flying body 5100 and used to drive the motors 5105 and 5106.

Since the power supply apparatus 5001 is arranged outside the airframe 5101, the degree of freedom in designing the airframe 5101 of the flying body 5100 can be improved. For example, it is possible to ensure a wider cabin space in the airframe 5101 and improve the comfort of crew. In addition, noise and vibrations generated by the operation of the power supply apparatus 5001 are reduced as compared to a case in which the power supply apparatus 5001 is provided in the airframe 5101, and silence improves. Furthermore, as compared to a case in which the power supply apparatus 5001 is provided in the airframe 5101, access to the inside of the power supply apparatus 5001 is easy, the maintenance can be facilitated, and the maintenance burden can be reduced. The power supply apparatus 5001 alone can be developed separately from the airframe 5101, various kinds of qualification tests and type certifications before mass production are easy, and mass production can be implemented early. The housing 5002 of the power supply apparatus 5001 has a shape long in the front-and-rear direction of the flying body 5100, and forms a pod having a low air resistance shape with a small front projection area. For this reason, even in the arrangement in which the power supply apparatus 5001 is arranged outside the airframe 5101, the fuel consumption performance (air resistance reduction) of the flying body 5100 is not greatly lowered. Since the gas turbine engine 5006 of the power supply apparatus 5001 does not aim at generating the propulsion force of the flying body 5100, the rigidity of the connecting portions 5003 can be low, and the structure can be relatively simple.

[Connecting Portion]

Figure 37:
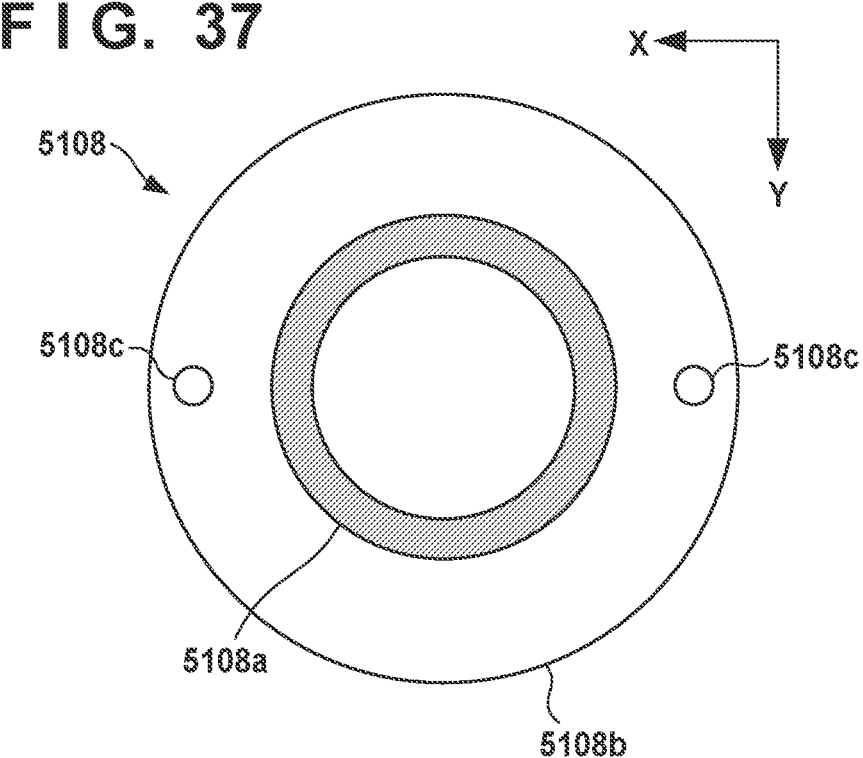
FIG. 37 is a sectional view taken along a line B-B in FIG. 36.
Figure 38:
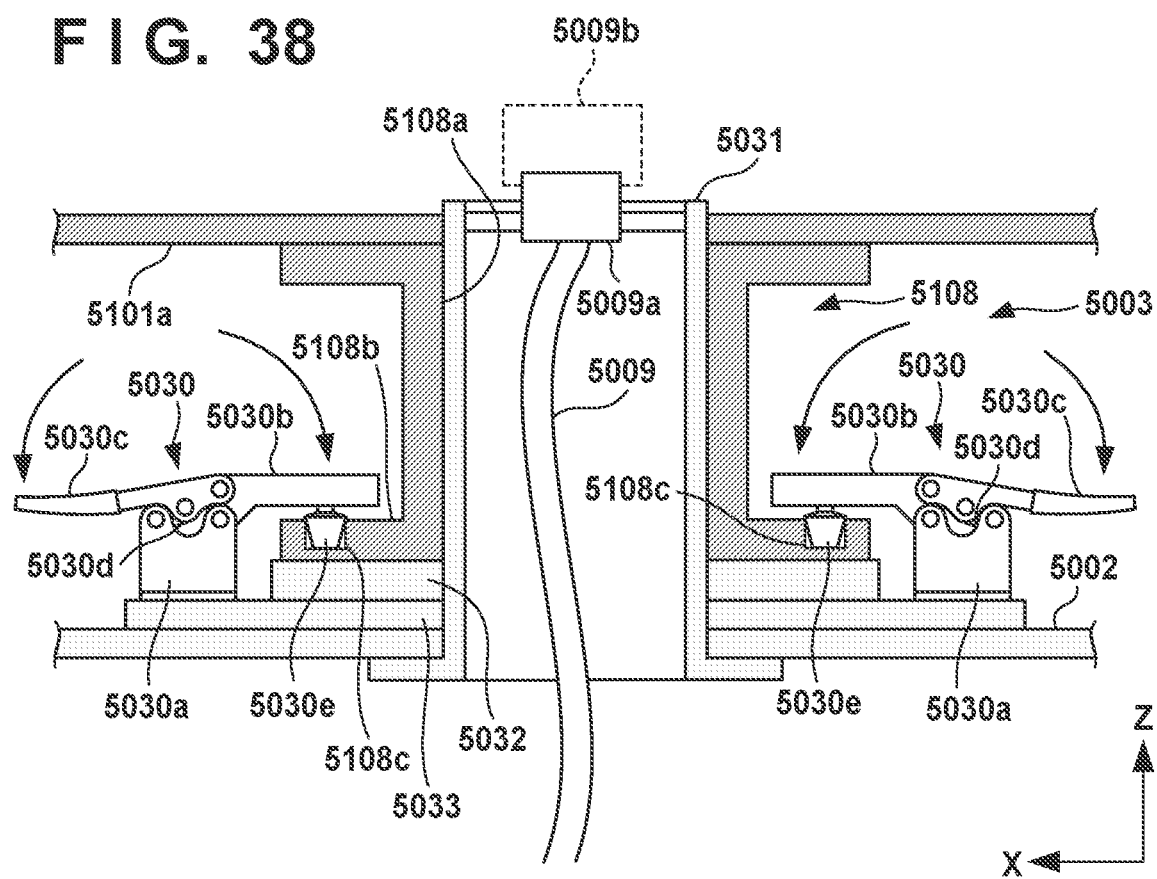
FIG. 38 is a sectional view of the connecting portion at the time of connection.

The connecting portion 5003 will be described with reference to FIG. 34 and FIGS. 36 to 38. FIG. 36 is a sectional view taken along a line A-A in FIG. 34, and shows a sectional view of the connected portion 5108 together with a sectional view of the connecting portion 5003. FIG. 36 shows a separated state in which the connecting portion 5003 and the connected portion 5108 are not connected. FIG. 37 is a sectional view taken along a line B-B in FIG. 36, and shows a sectional view of the connected portion 5108. FIG. 38 is a sectional view showing a connected state.

The connecting portion 5003 includes a plurality of clamp mechanisms 5030 that releasably fix the connected portion 5108 to the housing 5002. In this embodiment, two clamp mechanisms 5030 are arranged in one connecting portion 5003 so as to face each other in the X direction. The clamp mechanisms 5030 are arranged on a base portion 5033 provided on the housing 5002. The base portion 5033 forms a flat surface on which the clamp mechanisms 5030 and the like are grounded. Since the clamp mechanisms 5030 are arranged outside the housing 5002, works from the inside of the airframe 5101 or works from the inside of the power supply apparatus 5001 are rarely performed at the time of attaching/detaching the power supply apparatus 5001 to/from the airframe 5101.

A disc-shaped mount portion 5032 on which the distal end of the connected portion 5108 contacts and is overlaid is provided on the base portion 5033. The mount portion 5032 is arranged between the two clamp mechanisms 5030. A flange portion 5108*b* of the connected portion 5108 is sandwiched between the clamp mechanisms 5030 and the mount portion 5032, thereby fixing the power supply apparatus 5001 to the airframe 5101.

In the connecting portion 5003, an insertion portion 5031 stands to project to the side of the airframe 5101. The insertion portion 5031 is a tubular member and is provided to extend through the mount portion 5032, the base portion 5033, and the outer wall of the housing 5002. The connected portion 5108 includes a tubular body 5108*a*, and the flange portion 5108*b* at the distal end of the tubular body 5108*a*. The insertion portion 5031 is inserted into the tubular body 5108*a*. In the connected state, the inside of the airframe 5101 and the inside of the housing 5002 communicate via the internal space of the insertion portion 5031.

The cable 5009 that electrically connects the airframe 5101 and the power supply apparatus 5001 passes through the internal space of the insertion portion 5031. The cable 5009 includes a plurality of kinds of wires. The plurality of kinds of wires include, for example, a power line that supplies the power generated by the power generator 5005 to the airframe 5101, and a communication line of a control signal. When the cable 5009 passes through the inside of the connecting portion 5003 and the connected portion 5108, the cable 5009 is not exposed and can be protected.

A connector 5009*a* of the cable 5009 is fixed to an end portion of the insertion portion 5031. In a connecting work, when the insertion portion 5031 is inserted into the connected portion 5108, the connector 5009*a* is connected to a connector 5009*b* on the side of the airframe 5101. Hence, a wiring work is an unnecessary or easy work, and the connecting work can be completed only by works from the outside of the airframe 5101.

In this embodiment, all the insertion portion 5031, the tubular body 5108*a*, and the flange portion 5108*b* have a circular section. However, these may have a square section. In addition, the connected portion 5108 may be a solid member, and in this mode, the insertion portion 5031 is unnecessary, and the cable 5009 is wired outside the connecting portion 5003.

The clamp mechanism 5030 is a manual toggle clamp. The clamp mechanism 5030 may be of an electric type. However, the manual type is more advantageous because of simplicity and is advantageous from the viewpoint of durability as well. In addition, when the toggle type clamp is used, lock and release operations can be performed by one touch, and the burden on the operator can be reduced.

The clamp mechanism 5030 includes a fixed link 5030a, an operating link 5030b, a handle link 5030c, and an intermediate link 5030d. The fixed link 5030a is fixed to the base portion 5033. The operating link 5030b is swingably connected to the fixed link 5030a via a pin 5030i. The handle link 5030c is swingably connected to the operating link 5030b via a pin 5030f. The intermediate link 5030d is swingably connected to the handle link 5030c via a pin 5030h. The intermediate link 5030d is also swingably connected to the fixed link 5030a via a pin 5030g. A clamp pad 5030e is fixed to the operating link 5030b.

The operator operates the handle link 5030c, thereby switching the clamp mechanism 5030 between a locked state and a released state. FIG. 36 shows a mode in which the clamp mechanism 5030 is in the released state. FIG. 38 shows a mode in which the clamp mechanism 5030 is in the locked state. As indicated by arrows in FIG. 38, when the handle link 5030c is rotated downward in the released state, the operating link 5030b also rotates downward, and the state of the clamp mechanism 5030 is mechanically stabilized. To return the clamp mechanism from the locked state to the released state, an almost reverse operation is performed.

In the locked state, the clamp pad 5030e is fitted in a concave portion 5108c provided in the flange portion 5108b. Two concave portions 5108c are arranged at different portions of the flange portion 5108b. The clamp pad 5030e of one clamp mechanism 5030 is fitted in one of the two concave portions 5108c, and the clamp pad 5030e of the other clamp mechanism 5030 is fitted in the other concave portion 5108c. The power supply apparatus 5001 is thus fixed to the airframe 5101. Since the flange portion 5108b is locked at the plurality of portions, the power supply apparatus 5001 can firmly be fixed to the airframe 5101 with respect to external forces such as winds from multiple directions.

As described above, according to this embodiment, the power supply apparatus 5001 can be attached/detached to/from the airframe 5101 by operating the clamp mechanisms 5030 outside the airframe 5101 and the power supply apparatus 5001. It is therefore possible to improve the maintainability of the power supply apparatus 5001.

Embodiment 5-2

Figure 39:
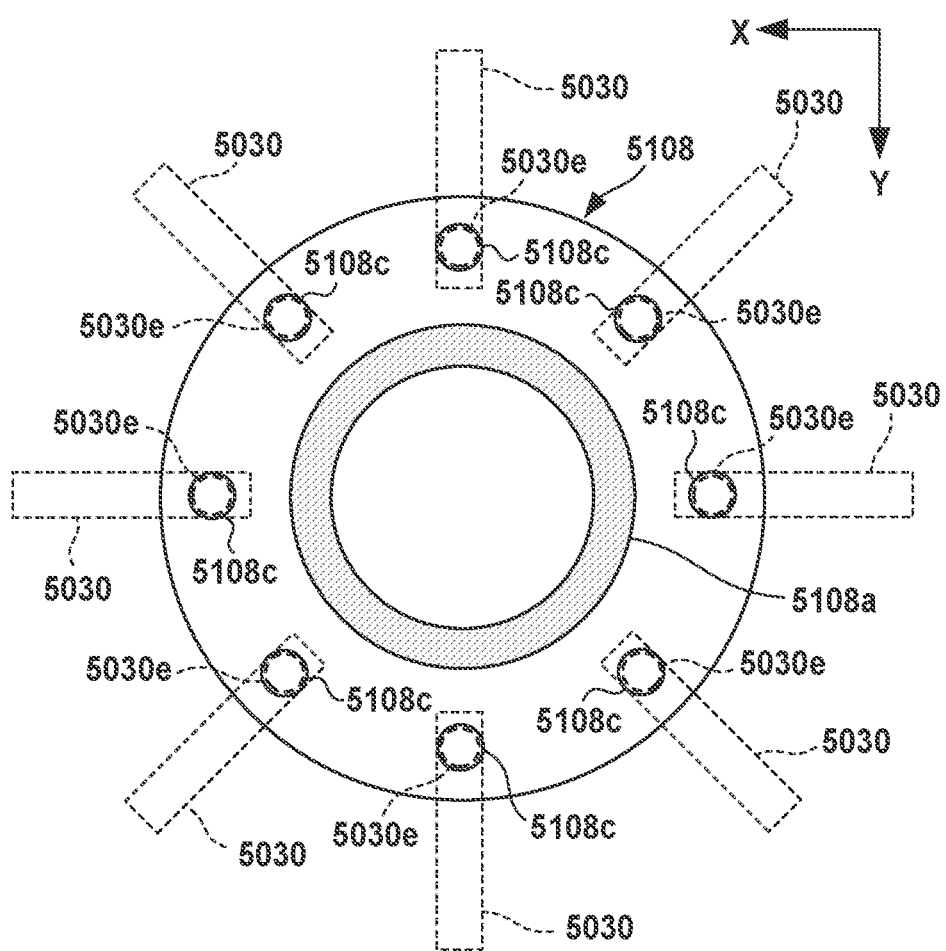
FIG. 39 is an explanatory view showing another arrangement example.

In Embodiment 5-1, two clamp mechanisms 5030 are provided for one connecting portion 5003. However, the number of clamp mechanisms may be three or more. FIG. 39 shows an example, and corresponds to the sectional view of FIG. 37.

In the example shown in FIG. 39, eight clamp mechanisms 5030 are provided. The eight clamp mechanisms 5030 are arranged at equal angles (equal pitches) in the circumferential direction concentrically with the center of a tubular body 5108a. A concave portion 5108c is individually provided for each clamp mechanism 5030.

When the number of clamp mechanisms 5030 is increased, the fixing force of a power supply apparatus 5001 to an airframe 5101 can be increased. In addition, the power supply apparatus 5001 can more firmly be fixed to the airframe 5101 with respect to external forces such as winds from multiple directions.

Embodiment 5-3

Figure 40:
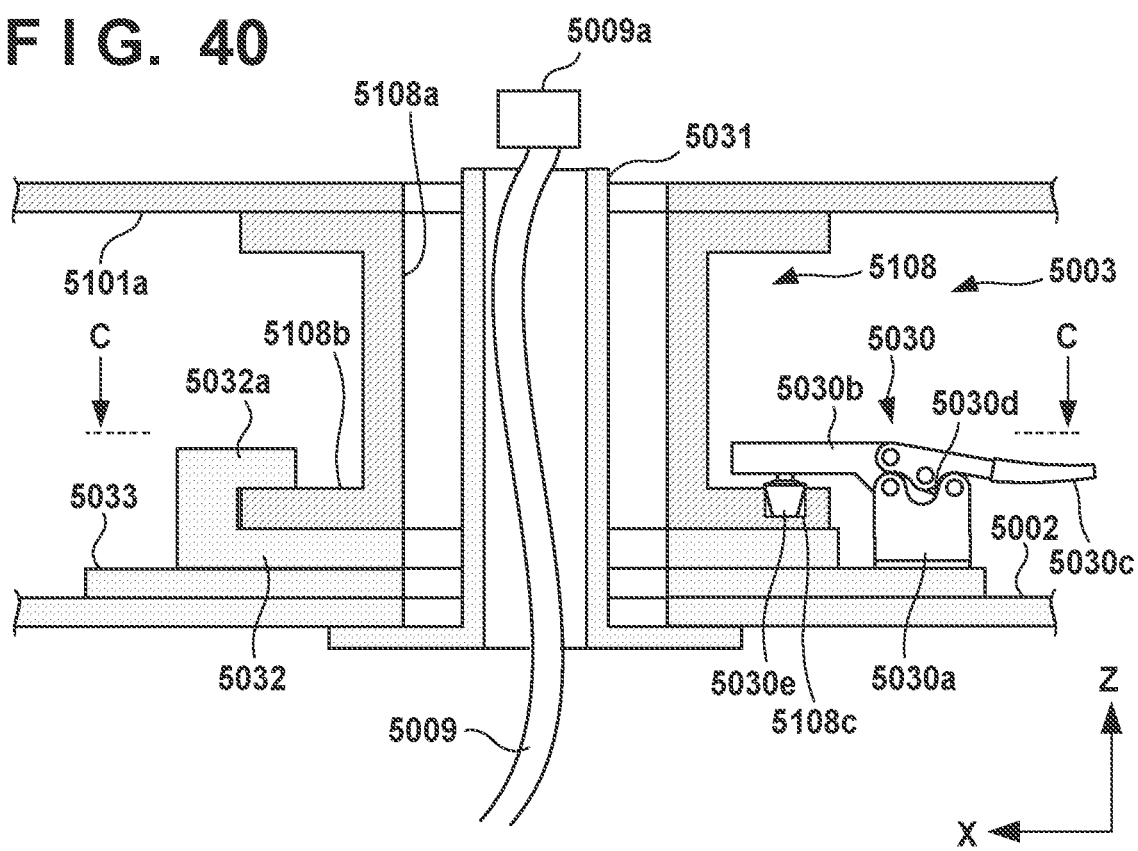
FIG. 40 is an explanatory view showing still another arrangement example.
Figure 41:
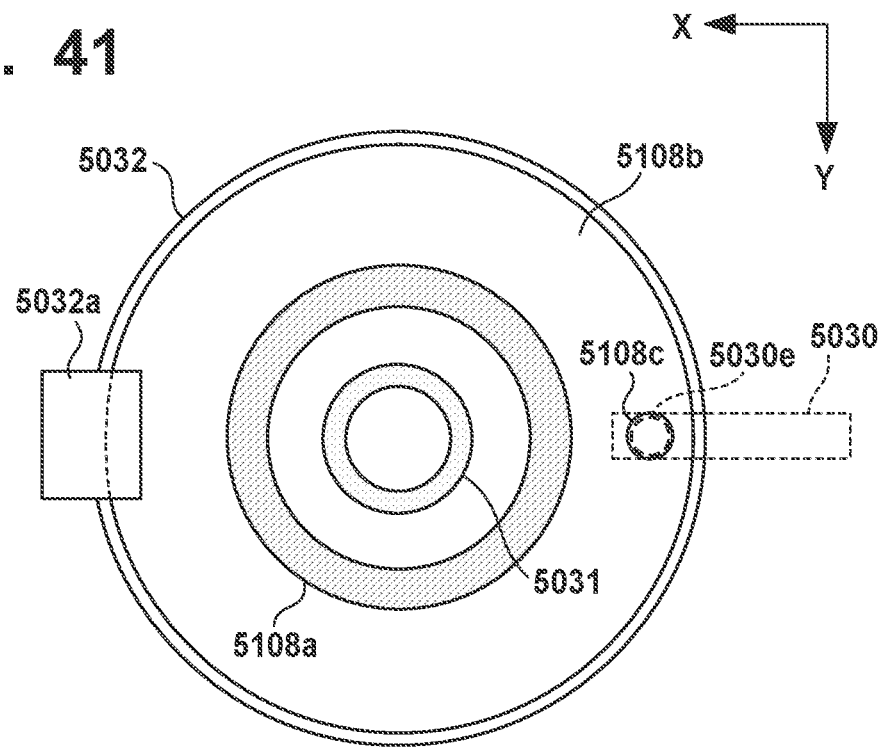
FIG. 41 is a sectional view taken along a line C-C in FIG. 40.

In Embodiment 5-1, two clamp mechanisms 5030 are provided for one connecting portion 5003. However, the number of clamp mechanisms may be one. FIG. 40 shows an example, and corresponds to the sectional view of FIG. 38. FIG. 41 is a sectional view taken along a line C-C in FIG. 40.

In the example shown in FIGS. 40 and 41, a connector 5009a of a cable 5009 is not fixed to an end portion of an insertion portion 5031, and a connecting work is performed on the side of an airframe 5101 at the time of connecting work. Such a form can also be employed.

In the example shown in FIGS. 40 and 41, only a clamp mechanism 5030 on the right side in the example of FIG. 38 is provided for one connecting portion 5003, and an engaging portion 5032a is provided in place of the clamp mechanism 5030 on the left side. The engaging portion 5032a is a portion formed integrally with a mount portion 5032 and having a C-shaped section. A flange portion 5108b is engaged with the engaging portion 5032a to lock the clamp mechanism 5030, thereby fixing a power supply apparatus 5001 to the airframe 5101. It is possible to fix the power supply apparatus 5001 to the airframe 5101 by a smaller number of clamp mechanisms 5030 and reduce the man-hour of the attaching/detaching work. Note that in the example shown in FIGS. 40 and 41, a structure with a plurality of clamp mechanisms 5030 can also be employed.

Other Embodiments

In Embodiments 5-1 to 5-3, the combination of the gas turbine engine 5006 and the power generator 5005 has been exemplified as the power generation unit 5004. However, the present invention is not limited to this. The power generation unit 5004 may be a fuel cell, or may be an internal combustion engine (for example, a reciprocal engine) other than a gas turbine engine.

In Embodiments 5-1 to 5-3, a helicopter has been exemplified as the flying body. The present invention can be applied not only to such a rotorcraft but also to aircrafts such as a fixed-wing aircraft and an airship and also to a flying type personal mobility, and the like. The fixed-wing aircraft can include a glider aircraft represented by a glider and an aircraft represented by a propeller plane. The present invention is also applicable to a flying body that is not of electric propulsion type.

The connecting portion of the power supply apparatus can be set not only to the bottom surface of the airframe but also to the upper surface of the wing portion of the airframe or the bottom surface of the wing portion of the airframe. The power supplied by the power supply apparatus may be power supplied to a power load that forms a driving source such as a motor, power supplied to a power load other than the driving source, or power supplied to both.

A plurality of power supply apparatuses may be provided in one flying body. When providing a plurality of power supply apparatuses, they may be juxtaposed in the widthwise direction of the flying body, or may be arranged in a line in the front-and-rear direction of the flying body.

In Embodiments 5-1 to 5-3, an example in which the housing 5002 has a cylindrical shape has been described. However, the shape may be another tubular shape such as a square tubular shape. In addition, the housing 5002 may include a portion with a cylindrical shape and a portion with a square tubular shape.

Summary of Fifth Embodiment

The fifth embodiment discloses at least the following power supply apparatus.

1. A power supply apparatus (5001) according to the fifth embodiment is
a power supply apparatus that supplies power to a power load (5105, 5106) of a flying body (5100), comprising: power generation unit (5004);
a hollow housing (5002) including a reserving portion (5002*d*) configured to reserve fuel of the power generation unit, and a storage portion (5002*e*) configured to store the power generation unit; and
a connecting portion (5003) configured to separably connect the housing (5002) to an airframe (5101) of the flying body,
wherein the housing (5002) has a shape long in a front-and-rear direction of the flying body and is arranged outside the airframe (5101), and
the connecting portion (5003) is arranged outside the housing (5002) and includes a clamp mechanism (5030) configured to releasably fix a connected portion (5108) of the airframe (5101) to the housing (5002).

According to this embodiment, the power supply apparatus can be attached/detached to/from the airframe by operating the clamp mechanism outside the airframe and the power supply apparatus. It is therefore possible to improve the maintainability of the power supply apparatus.

2. In the fifth embodiment,
the clamp mechanism (5030) is a manual clamp mechanism.

According to this embodiment, it is advantageous from the viewpoint of simplicity and durability.

3. In the fifth embodiment,
the clamp mechanism (5030) is a toggle clamp.

According to this embodiment, it is advantageous from the viewpoint of operability.

4. In the fifth embodiment,
the connected portion (5108) comprises:
a tubular body (5108*a*); and
a flange portion (5108*b*) at a distal end of the tubular body, and
the clamp mechanism (5030) releasably fixes the flange portion (5108*b*) to the housing (5002).

According to this embodiment, it is possible to reduce the weight of the connected portion, and it is also possible to fix the power supply apparatus to the airframe by clamping the flange portion by the clamp mechanism.

5. In the fifth embodiment,
the clamp mechanism (5030) comprises a plurality of clamp mechanisms, and
the plurality of clamp mechanisms (5030) fix different portions of the flange portion (5108*b*) to the housing (5002).

According to this embodiment, it is possible to firmly fix power supply apparatus to the airframe.

6. In the fifth embodiment,
the connecting portion comprises a tubular insertion portion (5031) to be inserted into the tubular body (5108*a*).

According to this embodiment, it is possible to make the internal space of the airframe communicate with the internal space of the power supply apparatus.

7. In the fifth embodiment,
a cable (5009) configured to electrically connect the flying body (5100) and the power supply apparatus (5001) passes through an internal space of the insertion portion (5031).

According to this embodiment, it is possible to use the internal space of the insertion portion as the wiring space of the cable and protect the cable.

8. In the fifth embodiment,
the power generation unit includes:
a gas turbine engine (5006); and
a power generator (5005) configured to generate power by an output of the gas turbine engine,
a rotating shaft (5060, 5050) of each of the gas turbine engine and the power generator is arranged on the same axis as a center axis (C) of the housing, and
the reserving portion, the power generator, and the gas turbine engine are arranged in this order from a front side in the front-and-rear direction of the flying body.

According to this embodiment, the power generation unit can spatially efficiently be stored in the housing having a cylindrical shape by employing the gas turbine engine. In addition, when a gas turbine engine with relatively small noise is used, the silence can be improved. Also, since the internal space of the housing can efficiently be used and, particularly, the gas turbine engine is located at the tail, it is possible to increase the exhaust efficiency and also use the exhaust gas flow as an auxiliary propulsion force.

Sixth Embodiment

In a system for generating power by the output of an internal combustion engine, if the flight altitude becomes high, the fluidity of fuel may lower due to overcooling. In this case, the fuel may not sufficiently be supplied to the internal combustion engine.

It is an object of this embodiment to provide a power supply apparatus capable of retaining the heat of fuel.

Embodiment 6-1

Figure 42:
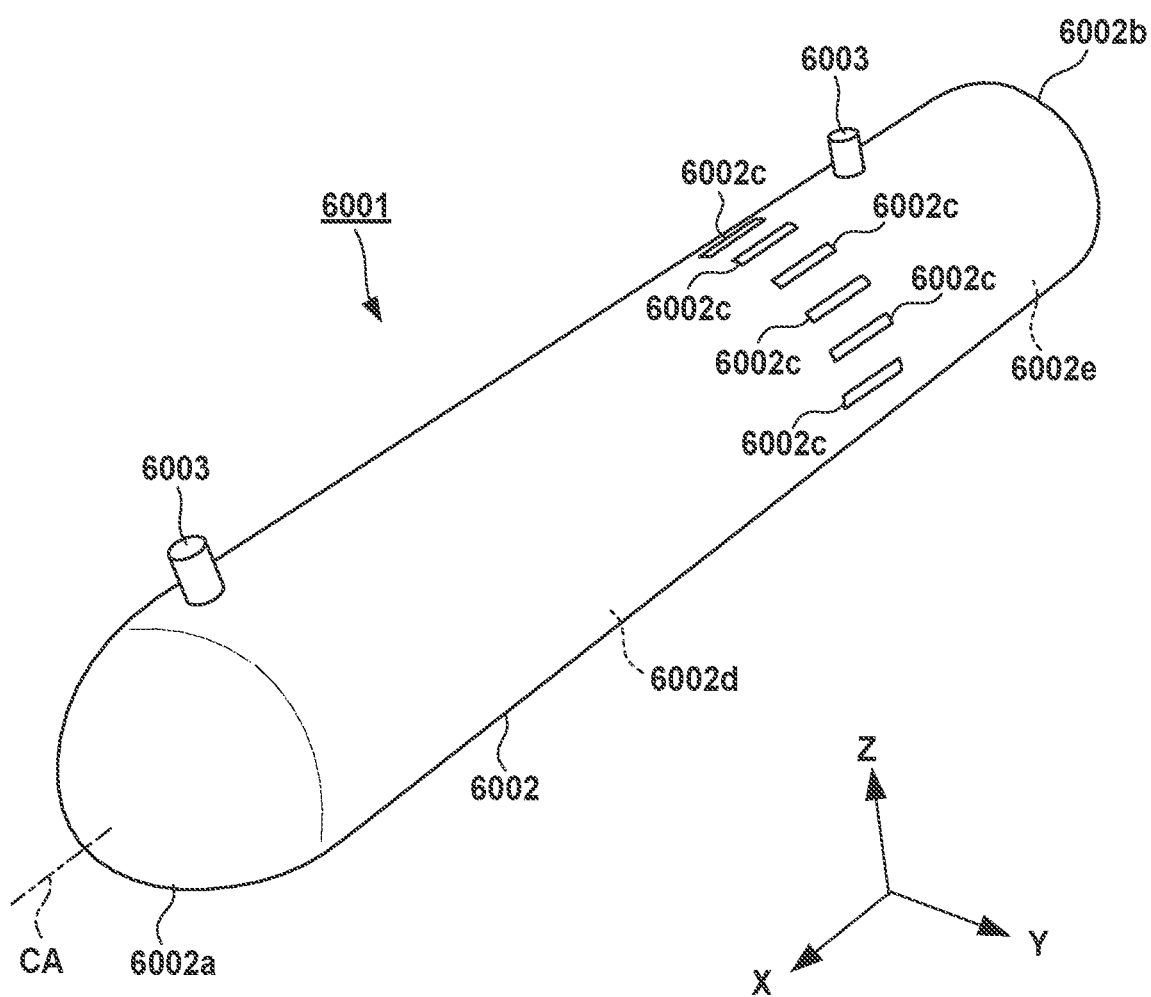
FIG. 42 is a perspective view of a power supply apparatus according to Embodiment 6-1.

The outline of a flying body according to Embodiment 6-1 is the same as that of the flying body 5100 described in the fifth embodiment except that a power supply apparatus 6001 is provided in place of the power supply apparatus 5001. FIG. 42 is a perspective view of the power supply apparatus 6001 according to Embodiment 6-1.

The power supply apparatus 6001 includes a housing 6002 that forms the outer wall, and a plurality of connecting portions 6003 that connect the housing 6002 and an airframe 6101. The housing 6002 is arranged outside the airframe 6101 and, in this embodiment, supported at the center in the Y direction while being hung from a bottom wall 6101*a* of the airframe 6101 via the connecting portions 6003. When the housing 6002 is arranged outside the airframe 6101, occupation of the internal space of the airframe 6101 by the power supply apparatus 6001 can be avoided. This contributes to expansion of a cabin, improvement of the layout property of other constituent components, and improvement of the maintainability of the power supply apparatus 6001.

The housing 6002 has an outer shape long in the X direction, and in this embodiment, has a pod-like outer shape long in the X direction. In other words, the X direction is the longitudinal direction of the housing 6002. When the housing 6002 has such an outer shape, the air resistance during forward flight of the flying body 6100 can be reduced while arranging the housing 6002 outside the airframe 6101. The housing 6002 according to this embodiment is a cylindrical hollow body long in the X direction. The influence of a cross wind can be made smaller. The housing 6002 can be formed by, for example, connecting a plurality of cylindrical components in the X direction. In FIG. 42, a center axis CA represents the center axis of the cylinder.

Of a distal end portion 6002a and a rear end portion 6002b of the housing 6002, the distal end portion 6002a has a tapered shape whose diameter is reduced toward the front side. In this embodiment, the distal end portion has a hemispherical shape but may have a triangular pyramid shape. When the distal end portion 6002a is formed into a tapered shape, the air resistance during forward flight of the flying body 6100 can further be reduced. A plurality of air intake ports 6002c configured to take air into a power generation unit 6004 to be described later are formed in the housing 6002. Each air intake port 6002c is a slit-like opening long in the X direction, and a plurality of air intake ports 6002c are formed in the circumferential direction of the housing 6002.

The plurality of (here, two) connecting portions 6003 are provided apart in the X direction. The housing 6002 is connected by the connecting portions 6003 while being apart from the airframe 6101. The connecting portions 6003 may inseparably connect the power supply apparatus 6001 and the airframe 6101 by welding or the like, or may detachably connect the power supply apparatus 6001 and the airframe 6101. The structure that detachably connects these may be a fastening structure using a bolt and a screw hole, or may be an engaging structure using a hook and a hole. When the power supply apparatus 6001 is detachable from the airframe 6101, this contributes to exchange of the power supply apparatus 6001 or improvement of maintainability.

Figure 43:
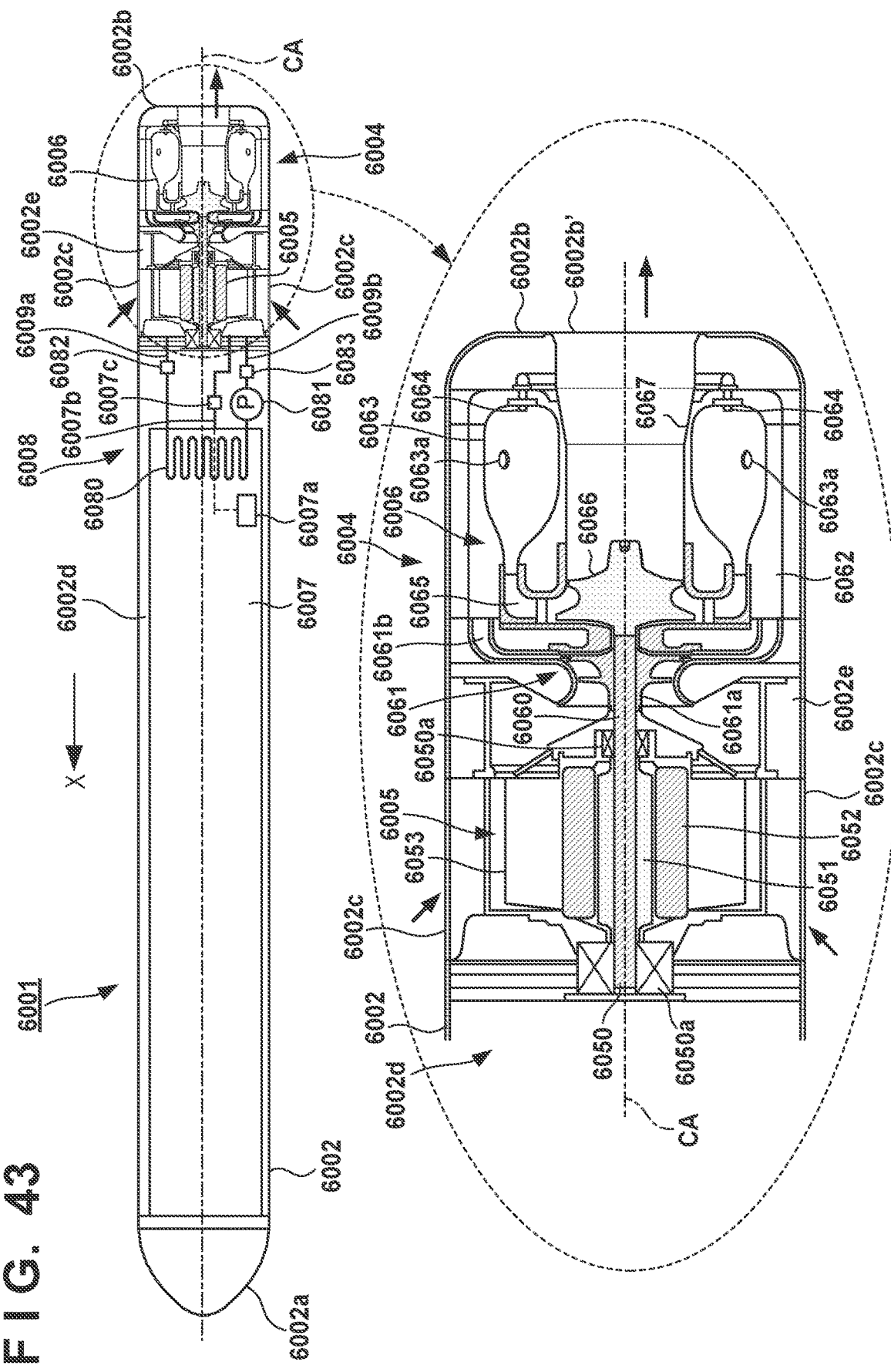
FIG. 43 shows an explanatory view and a partial enlarged view of the internal structure of the power supply apparatus shown in FIG. 42.

The internal structure of the housing 6002 will be described next with reference to FIG. 43. FIG. 43 shows an explanatory view and a partial enlarged view of the internal structure of the power supply apparatus 6001, and corresponds to a sectional view of the power supply apparatus 6001 passing through the center axis CA.

The internal space of the housing 6002 is roughly divided into a reserving portion 6002d on the front side and a storage portion 6002e on the rear side. The reserving portion 6002d and the storage portion 6002e are arranged in the longitudinal direction (X direction) of the housing 6002. With this layout, the power supply apparatus 6001 that is long in the X direction and has a low air resistance can easily be formed.

The power generation unit 6004 is stored in the storage portion 6002e. The reserving portion 6002d is a space that reserves the fuel (light oil or the like) of the power generation unit 6004. In this embodiment, a fuel tank 6007 is stored. However, the reserving portion 6002d itself may form a fuel tank. The fuel tank 6007 is a tubular hollow body long in the X direction, and the reserved fuel is supplied to the power generation unit 6004 by an electric fuel pump 6007a via a pipe 6007b and a filter 6007c. In this embodiment, the fuel pump 6007a is arranged in the internal space of the fuel tank 6007. However, the fuel pump 6007a may be arranged outside the fuel tank 6007. In this embodiment, the range in the X direction in the housing 6002 is designed larger for the reserving portion 6002d than the storage portion 6002e, and the reserving portion 6002d can reserve more fuel. This can increase the cruising range of the flying body 6100.

The power generation unit 6004 includes a power generator 6005 and a gas turbine engine 6006, and the power generator 6005 generates power by the output of the gas turbine engine 6006. The gas turbine engine 6006 includes a rotating shaft 6050 provided on the same axis as the rotation axis CA of the housing 6002. When the rotating shaft 6050 is provided on the same axis as the rotation axis CA, the larger gas turbine engine 6006 can be stored in the housing 6002 having a cylindrical shape without wasting a space.

The gas turbine engine 6006 includes a compressor 6061. The compressor 6061 includes an impeller 6061a attached to a rotating shaft 6060, and a diffuser 6061b. Along with the rotation of the impeller 6061a, air is sent from the air intake ports 6002c to a compression chamber 6062 while being compressed via the diffuser 6061b.

The compressed air in the compression chamber 6062 flows into a combustion chamber 6063 from opening portions 6063a provided in the peripheral wall of the combustion chamber 6063 or other opening portions (not shown). In the combustion chamber 6063, a plurality of fuel injection nozzles 6064 are provided in the circumferential direction of the rotation axis CA. The fuel reserved in the fuel tank 6007 is supplied to the fuel injection nozzles 6064 via a pipe (not shown), and the fuel injection nozzles 6064 inject the fuel into the combustion chamber 6063. At the time of start, an ignition device (not shown) ignites the gas mixture in the combustion chamber 6063. After that, combustion of the gas mixture continuously occurs in the combustion chamber 6063.

A combustion gas flow that has obtained a high temperature and a high pressure in the combustion chamber 6063 jets out from a turbine nozzle 6065 to a tubular exhaust pipe 6067 on the same axis as the center axis CA, and rotates a turbine 6066 attached to the rotating shaft 6060 in the process. The turbine 6066, the rotating shaft 6060, and the impeller 6061a integrally rotate. An exhaust portion 6002b' that is an opening portion communicating with the exhaust pipe 6067 is formed at the rear end portion 6002b of the housing 6002, and the combustion gas flow (exhaust gas flow) is discharged to the rear side of the housing 6002. In this embodiment, since the gas turbine engine 6006 is arranged to be adjacent to the rear end portion 6002b of the housing 6002, exhaust to the rear side can smoothly be performed. Note that in this embodiment, the gas turbine engine 6006 exclusively aims at driving the power generator 6005, and actively using the exhaust gas flow as the propulsion force of the flying body 6100 is not assumed. However, a mode in which the exhaust gas flow is used as an auxiliary propulsion force can also be employed.

The power generator 6005 includes the rotating shaft 6050 on the same axis as the rotating shaft 6060. That is, the rotating shaft 6050 is also provided on the same axis as the center axis CA, and the larger power generator 6005 can be stored in the housing 6002 having a cylindrical shape without wasting a space. In this embodiment, the rotating shaft 6050 and the rotating shaft 6060 are integrally formed. Bearings 6050a that rotatably support the rotating shaft 6050 (and the rotating shaft 6060) are provided at the two end portions of the power generator 6005 in the X direction.

A rotor 6051 such as a permanent magnet is provided on the rotating shaft 6050, and a stator 6052 such as a coil is provided around the rotor 6051. A plurality of cooling fins 6053 are provided around the stator 6052 in the circumferential direction of the rotating shaft 6050, and cool the power generator 6005 by air cooling.

In the housing 6002, a circuit (not shown) that controls power generation of the power generator 6005 and a circuit (not shown) that controls driving of the gas turbine engine 6006 are provided. An auxiliary power supply such as a lead battery may be provided as a power supply at the time of activation of these control circuits. The auxiliary power supply may be provided in the power supply apparatus 6001, or an auxiliary power supply provided on the side of the airframe 6101 may be used. The power generated by the power generator 6005 is supplied to a control unit 6107 of the flying body 6100 via a cable (not shown). The cable may pass through the inside of the connecting portion 6003.

In the power supply apparatus 6001 having the above-described arrangement, the gas turbine engine 6006 is driven by the fuel reserved in the fuel tank 6007, the rotating shaft 6050 is rotated by the rotation of the rotating shaft 6060, which is the output of the gas turbine engine 6006, and the power generator 6005 generates power. The generated power is supplied to the flying body 6100 and used to drive motors 6105 and 6106.

Since the power supply apparatus 6001 is arranged outside the airframe 6101, the degree of freedom in designing the airframe 6101 of the flying body 6100 can be improved. For example, it is possible to ensure a wider cabin space in the airframe 6101 and improve the comfort of crew. In addition, noise and vibrations generated by the operation of the power supply apparatus 6001 are reduced as compared to a case in which the power supply apparatus 6001 is provided in the airframe 6101, and silence improves. Furthermore, as compared to a case in which the power supply apparatus 6001 is provided in the airframe 6101, access to the inside of the power supply apparatus 6001 is easy, the maintenance can be facilitated, and the maintenance burden can be reduced. The power supply apparatus 6001 alone can be developed separately from the airframe 6101, various kinds of qualification tests and type certifications before mass production are easy, and mass production can be implemented early. The housing 6002 of the power supply apparatus 6001 has a shape long in the front-and-rear direction of the flying body 6100, and forms a pod having a low air resistance shape with a small front projection area. For this reason, even in the arrangement in which the power supply apparatus 6001 is arranged outside the airframe 6101, the fuel consumption performance (air resistance reduction) of the flying body 6100 is not greatly lowered. Since the gas turbine engine 6006 of the power supply apparatus 6001 does not aim at generating the propulsion force of the flying body 6100, the rigidity of the connecting portions 6003 can be low, and the structure can be relatively simple.

[Heat Retaining Device]

The heat retaining device 6008 for fuel will be described with reference to FIG. 43. When the altitude of the flying body 6100 is high, the fluidity of the fuel in the fuel tank 6007 may lower due to overcooling caused by a decrease in the air temperature. More specifically, for example, water contained in the fuel may freeze and crystalize. This makes it difficult for the fuel to pass through the filter 6007*c*, and fuel supply to the gas turbine engine 6006 may be insufficient. The heat retaining device 6008 is a device configured to retain the heat of the fuel to avoid such a situation and, particularly, retains the heat of the fuel using the heat of lubricant oil used in the gas turbine engine 6006.

The heat retaining device 6008 includes a heat exchanger 6080 and an electric pump 6081. The heat exchanger 6080 is provided inside the fuel tank 6007 and immersed in the fuel reserved in the fuel tank 6007. The heat exchanger 6080 is a member that forms a passage through which the lubricant oil can flow. In the example shown in FIG. 43, the heat exchanger 6080 is single pipe bended in a zigzag shape, and its two end portions are extended to the outside of the fuel tank 6007. Note that the form of the heat exchanger 6080 is not limited to this, and heat exchangers in various forms can be employed.

Pipes 6009*a* and 6009*b* are pipes communicating with the circulation passage of the lubricant oil of the power generation unit 6004 and are extended from the power generation unit 6004 to the reserving portion 6002*d*. The circulation passage is, for example, a passage that supplies the lubricant oil to the bearing 6050*a* of the rotating shaft 6050 or the rotating shaft 6060, and the like and collects the lubricant oil. The pipe 6009*a* is a pipe on the OUT side to which the lubricant oil is discharged, and is connected, via a connector 6082, to one end of the pipe that forms the heat exchanger 6080. The pipe 6009*b* is a pipe on the IN side from which the lubricant oil is supplied, and is connected to the pipe of the electric pump 6081 via a connector 6083. The electric pump 6081 is connected to the other end of the pipe that forms the heat exchanger 6080.

When the electric pump 6081 is driven, the lubricant oil in the power generation unit 6004 circulates through pipe 6009*a* heat exchanger 6080 electric pump 6081 pipe 6009*b* power generation unit 6004. The lubricant oil is heated when passing through the gas turbine engine 6006 of high temperature and exchanges heat with the fuel when passing through the heat exchanger 6080. This can retain the heat of the fuel.

The heat exchanger 6080 may be arranged over all of the region of the fuel tank 6007 in the X direction. In this arrangement, however, the capacity of the heat exchanger 6080 is too large, and the heat exchange efficiency may lower. In this embodiment, the heat exchanger 6080 is arranged only at the end portion of the fuel tank 6007 on the side of the storage portion 6002*e* in the X direction, and is adjacent to the intake port of the fuel pump 6007*a*. It is therefore possible to heat the fuel immediately before supplied to the gas turbine engine 6006 via the pipe 6007*b* and the filter 6007*c* and effectively prevent overcooling of the fuel.

Embodiment 6-2

A reserving portion 6002*d* may be formed by a plurality of reserving portions, and a heat exchanger 6080 may be arranged in a reserving portion of a small capacity. FIG. 44 is a view showing an example.

In this embodiment, in place of the fuel tank 6007 according to Embodiment 6-1, a fuel tank 6007A of a large capacity and a fuel tank 6007B of a small capacity are arranged in the X direction. The fuel tank 6007A and the fuel tank 6007B are connected via a pipe 6007*d* and a fuel pump 6007*a*. The fuel pump 6007*a* press-feeds fuel from the fuel tank 6007A to the fuel tank 6007B. Hence, the fuel in the fuel tank 6007A passes through the fuel tank 6007B and is supplied to a gas turbine engine 6006 via a pipe 6007*b* and a filter 6007*c*. Note that the fuel pump 6007*a* may be provided in the fuel tank 6007A, or may be provided in the fuel tank 6007B.

The heat exchanger 6080 is arranged in the fuel tank 6007B. Since the fuel tank 6007B has a relatively small capacity, the effect of heating the fuel by the heat exchanger 6080 can be increased. Additionally, in the fuel tank 6007B, the fuel immediately before supplied to the gas turbine engine 6006 can be heated, and overcooling of the fuel can effectively be prevented.

Note that in the example shown in FIG. 44, the fuel tanks 6007A and 6007B are arranged in the reserving portion 6002*d* to form a plurality of reserving portions. It is also possible to use a structure in which the internal space of a housing 6002 is divided by a wall body to form a reserving portion corresponding to the fuel tank 6007A and a reserving portion corresponding to the fuel tank 6007B, and tanks of separate members are not used.

Embodiment 6-3

Figure 46:
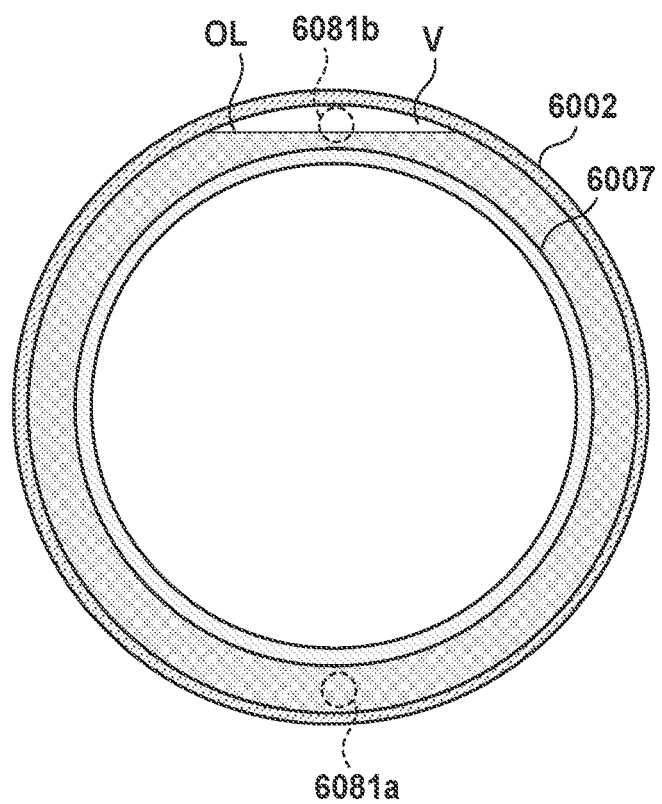
FIG. 46 is a sectional view taken along a line A-A in FIG. 45.

The heat of fuel may be retained by circulating lubricant oil around a fuel tank 6007. FIG. 45 is a view showing an example, and FIG. 46 is a sectional view taken along a line A-A in FIG. 45.

A heat retaining device 6008 according to this embodiment has a structure in which lubricant oil OL is circulated in a space V between the fuel tank 6007 and a housing 6002 instead of using the heat exchanger 6080 according to Embodiment 6-1. More specifically, in the housing 6002, a pair of partition walls 6002f are arranged apart in the X direction. Each partition wall 6002f is a disc-shaped wall material having an opening in which the fuel tank 6007 is fitted. Between the pair of partition walls 6002f, the tubular space V defined by the outer wall surface of the fuel tank 6007 and the inner wall surface of the housing 6002 is formed. The space V may be formed over all of the region of a reserving portion 6002d in the X direction. However, when the space V is partially formed, as in this embodiment, a small amount of lubricant oil OL suffices.

The heat retaining device 6008 includes electric pumps 6081A and 6081B. The electric pump 6081B is connected to a pipe 6009a via a connector 6082, and the pipe on the discharge side enters the space V through the partition wall 6002f The electric pump 6081A is connected to a pipe 6009b via a connector 6083, and the pipe on the intake side enters the space V through the partition wall 6002f Note that a structure in which only one of the electric pumps 6081A and 6081B is provided is also possible.

When the electric pumps 6081A and 6081B are driven, the lubricant oil in a power generation unit 6004 circulates through pipe 6009a electric pump 6081B pipe 6081b space V pipe 6081a electric pump 6081A pipe 6009b power generation unit 6004. The lubricant oil is heated when passing through a gas turbine engine 6006 of high temperature, and is introduced into the space V to heat the fuel via the fuel tank 6007. In addition, the lubricant oil introduced into the space V also functions as a heat insulating medium of high temperature between the outside air outside the housing 6002 and the fuel tank 6007.

Embodiment 6-4

Figure 47:
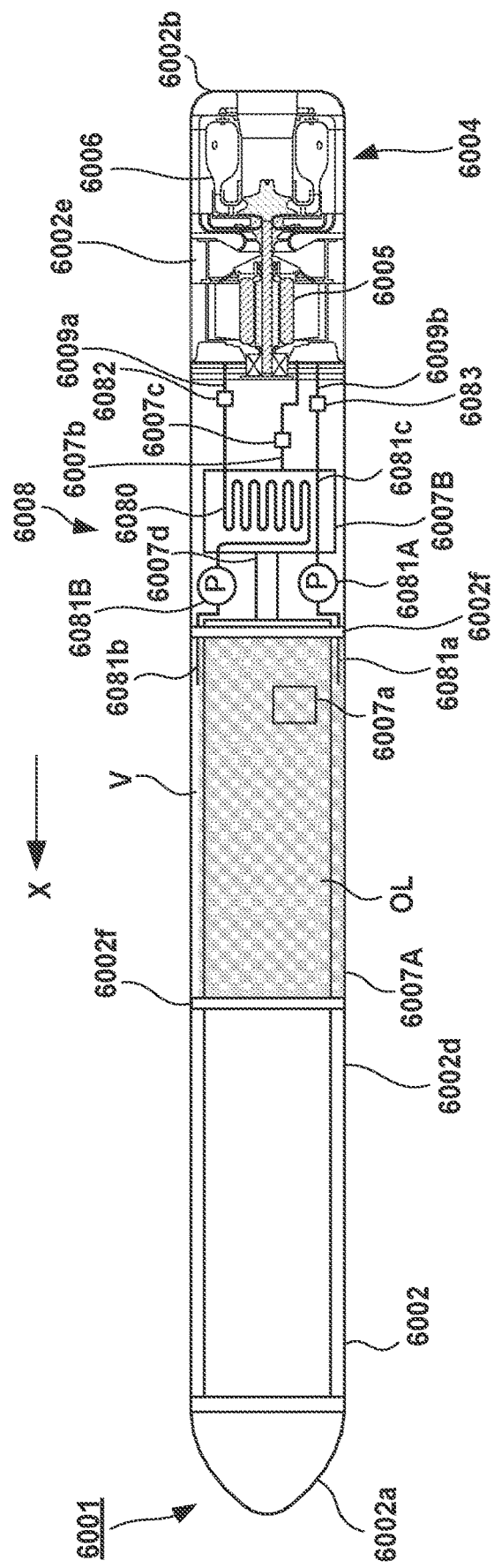
FIG. 47 is a view of the internal structure of a power supply apparatus according to still another example.

Embodiment 6-3 and Embodiment 6-1 or Embodiment 6-2 can be combined. FIG. 47 shows an example in which Embodiment 6-3 and Embodiment 6-2 are combined. In the example shown in FIG. 47, a space V is formed around a fuel tank 6007A. A heat exchanger 6080 is arranged in a fuel tank 6007B. One end of a pipe that forms the heat exchanger 6080 is connected to a pipe 6009a via a connector 6082. The other end of the pipe that forms the heat exchanger 6080 is connected to a pump 6081B. A pump 6081A and a pipe 6009b are connected via a pipe 6081c and a connector 6083. The pipe 6081c passes through the inside of the fuel tank 6007B. The pipe 6081c may be a bent zigzag and arranged in the fuel tank 6007B to form a heat exchanger similar to the heat exchanger 6080.

When the electric pumps 6081A and 6081B are driven, the lubricant oil in a power generation unit 6004 circulates through pipe 6009a→heat exchanger 6080→electric pump 6081B→pipe 6081b→space V→pipe 6081a→electric pump 6081A→pipe 6081c→pipe 6009b→power generation unit 6004. It is possible to obtain the heat retaining effect of each of Embodiment 6-2 and Embodiment 6-3.

Other Embodiments

In Embodiments 6-1 to 6-4, the combination of the gas turbine engine 6006 and the power generator 6005 has been exemplified as the power generation unit 6004. However, the present invention is not limited to this. The power generation unit 6004 may be an internal combustion engine (for example, a reciprocal engine) other than a gas turbine engine.

In Embodiments 6-1 to 6-4, a helicopter has been exemplified as the flying body. The present invention can be applied not only to such a rotorcraft but also to aircrafts such as a fixed-wing aircraft and an airship and also to a flying type personal mobility, a spaceship, a space shuttle, and the like. The fixed-wing aircraft can include a glider aircraft represented by a glider and an aircraft represented by a propeller plane. The present invention is also applicable to a flying body that is not of electric propulsion type.

The connecting portion of the power supply apparatus can be set not only to the bottom surface of the airframe but also to the upper surface of the wing portion of the airframe or the bottom surface of the wing portion of the airframe. The power supplied by the power supply apparatus may be power supplied to a power load that forms a driving source such as a motor, power supplied to a power load other than the driving source, or power supplied to both.

A plurality of power supply apparatuses may be provided in one flying body. When providing a plurality of power supply apparatuses, they may be juxtaposed in the widthwise direction of the flying body, or may be arranged in a line in the front-and-rear direction of the flying body.

In Embodiments 6-1 to 6-4, an example in which the housing 6002 has a cylindrical shape has been described. However, the shape may be another tubular shape such as a square tubular shape. In addition, the housing 6002 may include a portion with a cylindrical shape and a portion with a square tubular shape.

Summary of Sixth Embodiment

The sixth embodiment discloses at least the following power supply apparatus.
1. A power supply apparatus (6001) according to the sixth embodiment is
a power supply apparatus that supplies power to a power load (6105, 6106) of a flying body (6100), comprising:
power generation unit (6004);
a hollow housing (6002) including a reserving portion (6002d) configured to reserve fuel of the power generation unit, and a storage portion (6002e) configured to store the power generation unit;
a connecting portion (6003) configured to connect the housing (6002) to an airframe (6101) of the flying body; and
heat retaining unit (6008) for remaining heat of the fuel,
wherein the housing (6002) has a shape long in a front-and-rear direction of the flying body (6100) and is arranged outside the airframe (6101),
the power generation unit (6004) includes:
an internal combustion engine (6006); and
a power generator (6005) configured to generate power by an output of the internal combustion engine, and the heat retaining unit (6008) retains the heat of the fuel by heat of lubricant oil that circulates in the internal combustion engine.

According to this embodiment, it is possible to provide a power supply apparatus capable of retaining the heat of the fuel.

2. In the sixth embodiment, the heat retaining unit (6008) includes a heat exchanger (6080) provided to be immersed in the fuel in the reserving portion (6002d) and including a pipe through which the lubricant oil passes.

According to this embodiment, it is possible to heat the fuel by heat exchange between the fuel and the lubricant oil.

3. In the sixth embodiment, the reserving portion (6002d) includes a first reserving portion (6007A) and a second reserving portion (6007B), the fuel reserved in the first reserving portion (6007A) is supplied to the internal combustion engine (6006) via the second reserving portion (6007B), and the heat retaining unit (6008) includes a heat exchanger (6080) provided to be immersed in the fuel in the second reserving portion (6007B) and including a pipe through which the lubricant oil passes.

According to this embodiment, it is possible to efficiently heat the fuel.

4. In the sixth embodiment, the second reserving portion (6007B) has a capacity smaller than that of the first reserving portion (6007A).

According to this embodiment, it is possible to more efficiently heat the fuel.

5. In the sixth embodiment, a tank (6007) configured to reserve the fuel is provided in the reserving portion (6002d), and the heat retaining unit (6008) circulates the lubricant oil between the internal combustion engine (6006) and a space (V) between the tank (6007) and the housing (6002).

According to this embodiment, the heat retaining effect for the fuel can be improved using the lubricant oil as a heat insulating medium.

6. In the sixth embodiment, a first tank (6007A) and a second tank (6007B) both configured to reserve the fuel are provided in the reserving portion (6002d), the fuel reserved in the first tank (6007A) is supplied to the internal combustion engine (6006) via the second tank (6007B), and the heat retaining unit (6008) includes:

a heat exchanger (6080) provided to be immersed in the fuel in the second tank (6007B) and including a pipe through which the lubricant oil passes; and a pump (6081A, 6081B) configured to circulate the lubricant oil between a space (V) between the first tank (6007A) and the housing (6002), the heat exchanger (6080), and the internal combustion engine (6006).

According to this embodiment, it is possible to obtain both the heating effect and heat retaining effect for the lubricant oil.

7. In the sixth embodiment, the reserving portion (6002d) and the storage portion (6002e) are arranged in a longitudinal direction of the housing.

According to this embodiment, the housing has a shape long in the front-and-rear direction of the flying body, and has a low air resistance shape with a small front projection area. Hence, even in the arrangement in which the power supply apparatus is arranged outside the airframe, the fuel consumption performance (air resistance reduction) of the flying body is not greatly lowered.

8. In the sixth embodiment, the first reserving portion, the second reserving portion, the power generator, and the internal combustion engine are arranged in this order from a front side in the front-and-rear direction of the flying body.

According to this embodiment, since the internal space of the housing can efficiently be used and, particularly, the internal combustion engine is located at the tail, it is possible to increase the exhaust efficiency and also use the exhaust gas flow as an auxiliary propulsion force.

9. In the sixth embodiment, the first tank, the second tank, the power generator, and the internal combustion engine are arranged in this order from a front side in the front-and-rear direction of the flying body.

According to this embodiment, since the internal space of the housing can efficiently be used and, particularly, the internal combustion engine is located at the tail, it is possible to increase the exhaust efficiency and also use the exhaust gas flow as an auxiliary propulsion force.

10. In the sixth embodiment, the internal combustion engine is a gas turbine engine, a rotating shaft of each of the gas turbine engine and the power generator is arranged on the same axis as a center axis of the housing, and the reserving portion, the power generator, and the gas turbine engine are arranged in this order from a front side in the front-and-rear direction of the flying body.

According to this embodiment, since the internal space of the housing can efficiently be used and, particularly, the internal combustion engine is located at the tail, it is possible to increase the exhaust efficiency and also use the exhaust gas flow as an auxiliary propulsion force.

Seventh Embodiment

In an arrangement in which a power supply apparatus such as a battery is disposed in the airframe of a flying body, like U.S. Pat. No. 9,248,908, to ensure the disposition space, the degree of freedom in designing another space in the airframe such as a cabin space lowers.

If a housing that has a long shape and stores a fuel tank and a power supply apparatus is provided outside the airframe of the flying body to ensure a space in the airframe, a case in which it is difficult to suck fuel from the fuel tank because of the influence of a posture change of the flying body may occur, and a case in which the fuel cannot stably be supplied to the power supply apparatus may occur.

Considering the above-described problem, it is an object of this embodiment to provide a flying body including a power supply apparatus capable of stably supplying fuel independently of the influence of a posture change of the flying body.

Embodiment 7-1

The outline of a flying body according to Embodiment 7-1 is the same as that of the flying body 3100 described in the third embodiment except that a power supply apparatus 7001 is provided in place of the power supply apparatus 3001. The power supply apparatus 7001 functions as the main power supply of a flying body 7100, and supplies not only the driving power for motors 7105 and 7106 but also power to each electric load in the flying body 7100.

The power supply apparatus 7001 includes a housing 7002 that forms the outer wall, and a plurality of connecting portions 7003 that connect the housing 7002 and an airframe 7101. The housing 7002 is arranged outside the airframe 7101 and, in this embodiment, supported at the center in the Y direction while being hung from the bottom wall of the airframe 7101 via the connecting portions 7003. When the housing 7002 is arranged outside the airframe 7101, occupation of the internal space of the airframe 7101 by the power supply apparatus 7001 can be avoided. This contributes to expansion of a cabin, improvement of the layout property of other constituent components, and improvement of the maintainability of the power supply apparatus 7001.

Figure 48:
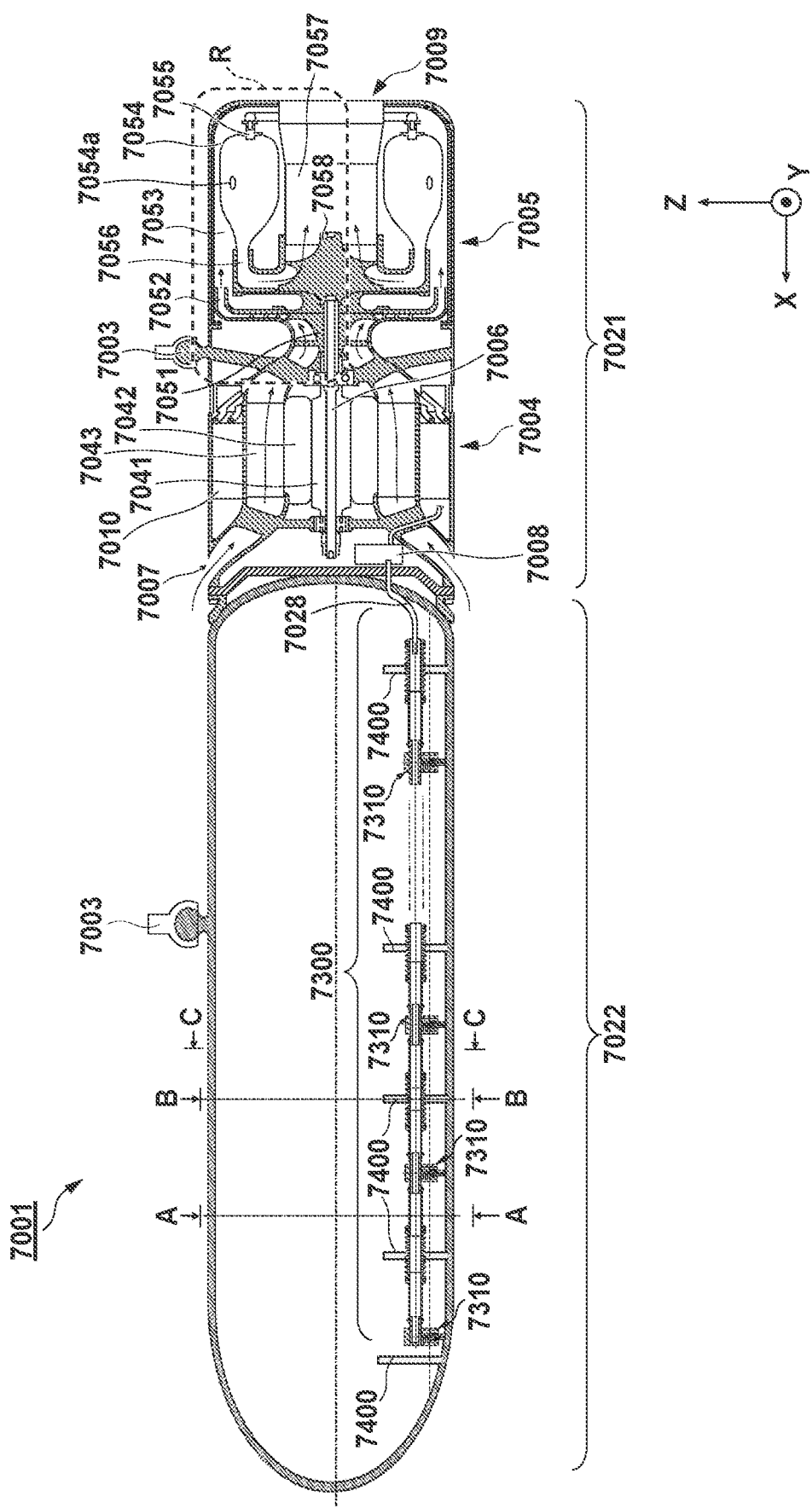
FIG. 48 is a view for explaining the internal structure of a power supply apparatus according to Embodiment 7-1.

The power supply apparatus 7001 will be described next with reference to FIG. 48. FIG. 48 is a sectional view of the power supply apparatus 7001. The power supply apparatus 7001 includes the hollow housing 7002 that forms the outer wall, and the plurality of connecting portions 7003 that connect the housing 7002 and the airframe 7101.

The housing 7002 has an outer shape long in the X direction (that is, a pod-like outer shape long in the X direction). Hence, in other words, it can be said that the X direction defined in this embodiment is the longitudinal direction of the housing 7002. When the housing 7002 arranged outside the airframe 7101 has such an outer shape, the air resistance during forward flight of the flying body 7100 can be reduced. Since the body portion of the housing 7002 according to this embodiment has an almost columnar shape, the influence of a cross wind can be made smaller. In addition, the distal end portion of the housing 7002 has a tapered shape whose diameter is reduced toward the front side. In this embodiment, the distal end portion of the housing 7002 is formed into a hemispherical shape but may have a triangular pyramid shape. When the distal end portion is formed into a tapered shape, the air resistance during forward flight of the flying body 7100 can further be reduced.

The plurality of connecting portions 7003 are provided on the housing 7002 while being apart in the front-and-rear direction of the flying body 7100, and connect the housing 7002 and the airframe 7101. The housing 7002 according to this embodiment includes a total of two connecting portions 7003, that is, one on a storage portion 7021 to be described later and one on a fuel tank 7022, and is connected by the plurality of (for example, two) connecting portions 7003 while being apart from the airframe 7101. The connecting portions 7003 detachably connect the power supply apparatus 7001 (housing 7002) and the airframe 7101, and the structure may be a fastening structure using a bolt and a screw hole, or may be an engaging structure using a hook and a hole. When the power supply apparatus 7001 (housing 7002) is detachable from the airframe 7101, it is possible to facilitate exchange of the power supply apparatus 7001 and improve the maintenability.

[Internal Structure of Housing]

The internal structure of the housing 7002 will be described next. The housing according to this embodiment includes the storage portion 7021 that stores a power supply unit, and the fuel tank 7022 serving as a reserving portion that reserves the fuel of the power supply unit. As the fuel reserved in the fuel tank 7022, for example, methanol, gasoline, or the like can be used. The storage portion 7021 and the fuel tank 7022 are arrayed along the front-and-rear direction (longitudinal direction: X direction) of the flying body 7100 and separably connected by connecting portions. In this embodiment, the fuel tank 7022 is arranged on the front side of the flying body 7100, and the storage portion 7021 is arranged on the rear side of the flying body 7100.

The power supply unit stored in the storage portion 7021 includes a power generator 7004, and a gas turbine engine 7005. The power generator 7004 generates power by the output of the gas turbine engine 7005. In this embodiment, the power generator 7004 and the gas turbine engine 7005 are provided on a common rotating shaft 7006. When the gas turbine engine 7005 rotationally drives the rotating shaft 7006, the power generator 7004 can generate power. With this arrangement, it is possible to arrange the power generator 7004 and the gas turbine engine 7005 without wasting a space and make the device compact.

The gas turbine engine 7005 includes a compressor including an impeller 7051 and a diffuser 7052. The impeller 7051 is attached to the rotating shaft 7006. Air taken from an air intake port 7007 is sent to a compression chamber 7053 while being compressed via the diffuser 7052 along with the rotation of the impeller 7051. The compressed air held in the compression chamber 7053 is taken from an opening portion 7054a provided in the circumferential wall of a combustion chamber 7054 or another opening portion into the combustion chamber 7054. The combustion chamber 7054 is provided with a fuel injection nozzle 7055, and the fuel taken from the fuel tank 7022 by a fuel pump 7008 (supply unit) via a pipe 7028 is injected (supplied) into the combustion chamber 7054 by the fuel injection nozzle 7055. At the time of start, an ignition device (not shown) ignites the gas mixture in the combustion chamber 7054. After that, combustion of the gas mixture continuously occurs in the combustion chamber 7054.

A combustion gas that has obtained a high temperature and a high pressure in the combustion chamber 7054 jets out from a turbine nozzle 7056 to a tubular exhaust pipe 7057, rotates a turbine 7058 attached to the rotating shaft 7006, and is discharged to the rear side from an exhaust port 7009 provided in the rear portion of the power supply apparatus 7001. The impeller 7051, the turbine 7058, and a rotor 7041 (permanent magnet or the like) of the power generator 7004 to be described later are provided on the rotating shaft 7006, and the impeller 7051 and the rotor 7041 can integrally be rotated by the rotation of the turbine 7058. Note that in this embodiment, the gas turbine engine 7005 exclusively aims at driving the power generator 7004, and actively using the exhaust gas flow as the propulsion force of the flying body 7100 is not assumed. However, a mode in which the exhaust gas flow is used as an auxiliary propulsion force is also possible.

The power generator 7004 includes the rotor 7041 such as a permanent magnet attached to the rotating shaft 7006, and a stator 7042 such as a coil disposed around the rotor 7041. When the rotating shaft 7006 is rotated by the gas turbine engine 7005, and the rotor 7041 attached to the rotating shaft 7006 rotates accordingly, the stator 7042 can generate power. In addition, a plurality of fins 7043 configured to cool the stator 7042 are provided around the stator 7042 in the circumferential direction of the rotating shaft 7006. The plurality of fins 7043 are arranged in a space to which the air taken from the air intake port 7007 is guided. When the air passes between the plurality of fins 7043, the plurality of fins 7043 are cooled, and the stator 7042 can accordingly be cooled.

A control unit 7010 includes a circuit that controls power generation of the power generator 7004, and a circuit that controls driving of the gas turbine engine 7005. An auxiliary power supply such as a battery may be provided as a power supply at the time of activation of the control unit 7010. The auxiliary power supply may be provided in the housing 7002, or may be provided in the airframe 7101. The power generated by the power generator 7004 is supplied to power loads (motors 7105 and 7106 and the like) in the airframe 7101 via a cable (not shown). The cable may pass through the inside of the connecting portions 7003. In addition, the control unit 7010 of the power supply apparatus 7001 may be communicable with the control device 7107 in the airframe 7101, or may be configured to perform power generation control in accordance with an instruction from the control device 7107.

When the power supply apparatus 7001 is arranged outside the airframe 7101, as described above, the degree of freedom in designing the airframe 7101 of the flying body 7100 can be improved. For example, it is possible to ensure a wider cabin space in the airframe 7101 and improve the comfort of crew. In addition, noise and vibrations generated by the operation of the power supply apparatus 7001 are reduced as compared to a case in which the power supply apparatus 7001 is provided in the airframe 7101, and silence can be improved. Furthermore, as compared to a case in which the power supply apparatus 7001 is provided in the airframe 7101, access to the inside of the power supply apparatus 7001 is easy, the maintenance can be facilitated, and the maintenance burden can be reduced. The power supply apparatus 7001 alone can be developed separately from the airframe 7101, various kinds of qualification tests and type certifications before mass production are easy, and mass production can be implemented early. The power supply apparatus 7001 has a shape long in the front-and-rear direction of the flying body 7100, that is, a low air resistance shape with a small front projection area. For this reason, even in the arrangement in which the power supply apparatus 7001 is arranged outside the airframe 7101, the fuel consumption performance of the flying body 7100 is not greatly lowered. Since the gas turbine engine 7005 of the power supply apparatus 7001 does not aim at generating the propulsion force of the flying body 7100, the rigidity of the connecting portions 7003 can be low, and the structure can be relatively simple.

[Arrangement of Fuel Suction Device 7300]

A fuel suction device 7300 will be described next with reference to FIGS. 48 and 49. As shown in FIG. 48, the fuel suction device 7300 is arranged in the fuel tank 7022 along the front-and-rear direction (longitudinal direction: X direction).

The fuel suction device 7300 includes suction units 7310 that are arranged inside the fuel tank 7022 (reserving portion) and suck the fuel, and hollow connecting portions 7320 (tubular connecting portions) that are connected to the plurality of suction units 7310 arranged in the front-and-rear direction (longitudinal direction) of the fuel tank 7022 (reserving portion) and can be deformed in accordance with the movement of the plurality of suction units 7310. The fuel sucked by the plurality of suction units 7310 is sucked into the connecting portions 7320 by the suction force of the fuel pump 7008, and the connecting portions 7320 supply the fuel sucked by the plurality of suction units 7310 toward the power generator 7004 (to be also expressed as "supply the fuel to the power generator 7004" hereinafter).

(Arrangement of Connecting Portion 7320)

The connecting portion 7320 is formed as a hollow tubular member capable of flowing the fuel sucked by the plurality of suction units 7310 toward the fuel pump 7008. The connecting portion 7320 has an elastic characteristic that allows it to be deformed in accordance with the movement of the suction units 7310 when the plurality of suction units 7310 move by the weight of their own along with a posture change of the flying body 7100. If the suction units 7310 move by the weight of their own toward the direction in which the fuel is stored, the connecting portions 7320 move by the elastic characteristic (elastic deformation) to follow the movement of the suction units. By the elastic characteristic (elastic deformation) of the connecting portions 7320, the suction units 7310 can change the direction to the direction (downward in the vertical direction) in which the fuel is stored in the fuel tank 7022 in accordance with the flight posture of the flying body 7100.

Figure 49:
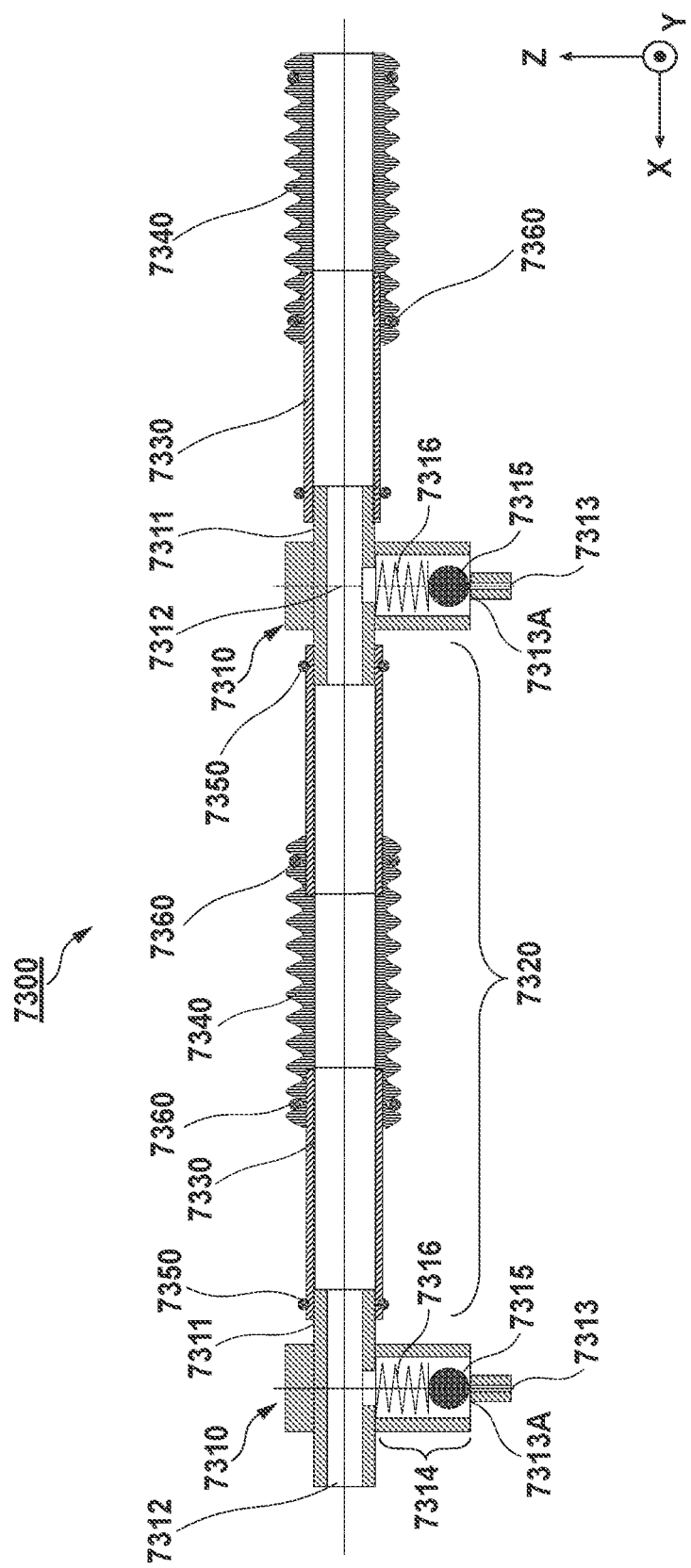
FIG. 49 is a view showing the arrangement of a fuel suction device according to Embodiment 7-1.

As shown in FIGS. 48 and 49, the connecting portion 7320 includes, as members of different elastic characteristics, a hollow flexible member 7330 connected to the suction unit 7310, and a hollow joint member 7340 connected to the flexible member 7330, and supplies the fuel sucked by the suction unit 7310 to the power generator 7004 via the flexible member 7330 and the joint member 7340.

As shown in FIG. 49, the inner diameter portion at an end portion of the flexible member 7330 is inserted into (fitted on) the outer diameter portion of a coupling portion 7311, and in this state, engages with the coupling portion 7311 by the pressing force of an engaging member 7350 such as a snap ring. The outer diameter portion at the other end portion of the flexible member 7330 is inserted into (fitted in) the inner diameter portion of the joint member 7340, and in this state, engages with the joint member 7340 by the pressing force of an engaging member 7360 such as a snap ring.

By the pressing force of the engaging member 7350, the coupling portion 7311 of the suction unit 7310 and the connecting portion 7320 (flexible member 7330) are in an engaging state in which the relative movement in the X direction is suppressed. In addition, by the pressing force of the engaging member 7360, the flexible member 7330 and the joint member 7340 are in an engaging state in which the relative movement in the X direction is suppressed.

The flexible member 7330 and the joint member 7340 are members with different elastic deformation characteristics (for example, elastic moduli). For example, the joint member 7340 can be formed by a member having an elastic modulus E2 larger than an elastic modulus E1 of the flexible member 7330. The magnitude relationship of the elastic moduli may be reversed. When a plurality of members having different elastic characteristics, for example, the flexible member 7330 and the joint member 7340 are combined and connected in series, the degree of freedom of elastic deformation can be increased, and the follow-up property corresponding to the movement of the suction unit 7310, which occurs based on the posture change of the flying body 7100, can be increased.

The fuel suction device 7300 is connected to the fuel pump 7008 (supply unit) via the pipe 7028, and the fuel from the fuel suction device 7300 is supplied to the power generator 7004 via the pipe 7028 and the fuel pump 7008 (supply unit). That is, the connecting portions 7320 supply the fuel sucked by the plurality of suction units 7310 to the power generator 7004.

Note that the arrangement of the connecting portion 7320 is not limited to the arrangement as shown in FIGS. 48 and 49, and the connecting portion 7320 need only be able to move following the movement of the suction units by the elastic characteristic (elastic deformation) of the connecting portion 7320 when the suction units 7310 move by the weight of their own. The connecting portion 7320 may be formed by one of the flexible member 7330 and the joint member 7340.

For example, the connecting portion 7320 may include the hollow joint member 7340 connected to the plurality of suction units 7310, and the fuel sucked by the plurality of suction units 7310 may be supplied to the power generator 7004 via the joint member 7340. Alternatively, the connecting portion 7320 may include the hollow flexible member 7330 connected to the plurality of suction units 7310, and the fuel sucked by the plurality of suction units 7310 may be supplied to the power generator 7004 via the flexible member 7330.

In the arrangement of the fuel suction device 7300 shown in FIGS. 48 and 49, an example in which, between the two suction units 7310, two flexible members 7330 are connected to the two end portions of one joint member 7340 is shown. However, the arrangement of the fuel suction device 7300 according to this embodiment is not limited to this example. For example, between the two suction units 7310, two joint members 7340 can be connected to the two end portions of one flexible member 7330. In addition, the number of flexible members 7330 and joint member 7340 may further be increased.

[Arrangement of Suction Unit 7310]

Each of the plurality of suction units 7310 includes the coupling portion 7311 connected to the connecting portion 7320, a suction port 7313 that sucks the fuel into a hollow channel 7312 formed in the coupling portion 7311, and a stop valve 7314 that opens/closes the suction port 7313. The channel 7312 and the suction port 7313 communicate via the internal space of the stop valve 7314. The stop valve 7314 includes a spherical member 7315 (for example, a metal ball) that seals the suction port 7313, and an elastic member 7316 (for example, a spring) that biases the spherical member 7315.

To prevent air from flowing into the channel 7312 in a state in which the suction port 7313 is sealed by the spherical member 7315, a tapered surface (not shown) conforming to the surface shape of the spherical member 7315 is formed at an opening upper end portion 7313A of the suction port 7313 that contacts the spherical member 7315. When the suction pressure in the channel 7312 of the suction unit 7310 becomes larger than the weight of the spherical member 7315 and the biasing force of the elastic member 7316 by the suction of the fuel pump 7008, the spherical member 7315 rises in the Z direction (upward in the vertical direction), and the stop valve 7314 is set in an open state. When the stop valve 7314 is set in the open state, each of the plurality of suction units 7310 sucks the fuel from the suction port 7313 into the channel 7312, the sucked fuel flows from the channel 7312 to the connecting portion 7320 by the suction of the fuel pump 7008, and the connecting portion 7320 supplies the fuel sucked by the plurality of suction units 7310 to the power generator 7004.

When the suction pressure in the channel 7312 of the suction unit 7310 becomes equal to or smaller than the weight of the spherical member 7315 and the biasing force of the elastic member 7316 by the stop of the suction of the fuel pump 7008, the spherical member 7315 lowers in the Z direction (downward in the vertical direction). By the biasing force of the elastic member 7316, the spherical member 7315 comes into contact (tight contact) with the opening upper end portion 7313A of the suction port 7313, and the stop valve 7314 changes to a closed state.

In a state in which the fuel is not sucked, the stop valve 7314 is set in the closed state, thereby preventing air from flowing (mixing) and preventing a phenomenon (air entrainment) in which the suction pressure lowers, and the fuel supply amount decreases at the time of operating the fuel pump 7008.

[Arrangement of Partition Wall 7400]

Figure 50:
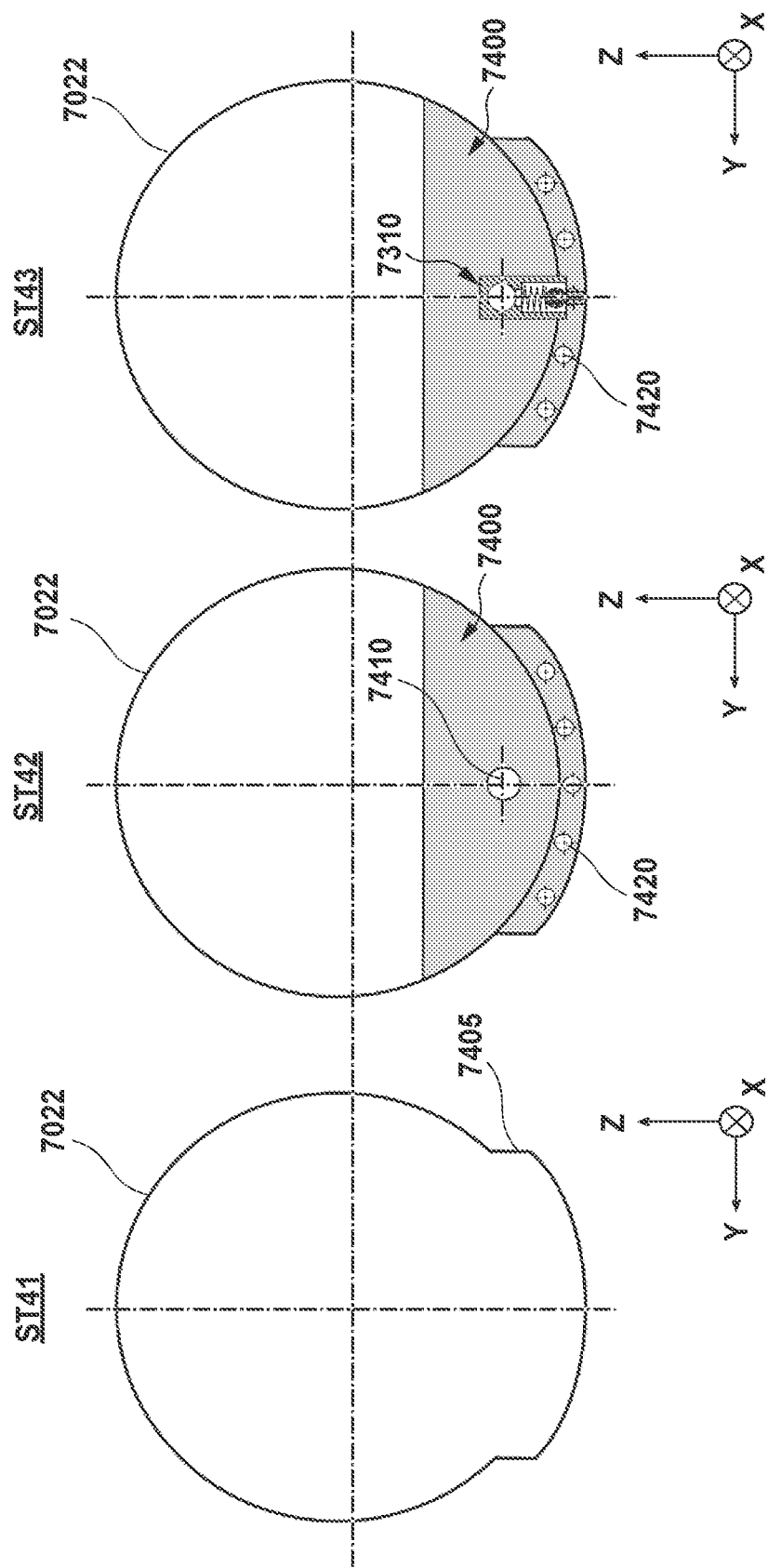
FIG. 50 is a view showing the structure of a partition wall shown in FIG. 48.

A partition wall 7400 provided in the fuel tank 7022 will be described next with reference to FIGS. 50 and 51. ST41 in FIG. 50 is a view showing the schematic shape of a section (for example, a section taken along a line A-A in FIG. 48) of the fuel tank 7022 where the partition wall 7400 is not provided, and the fuel suction device 7300 is not illustrated. ST42 in FIG. 50 is a view showing the schematic sectional shape of the fuel tank 7022 in which the partition wall 7400 is provided, and is a view schematically showing a section taken along a line B-B in FIG. 48. ST43 in FIG. 50 is a view schematically showing the positional relationship between the partition wall 7400 and the suction unit 7310, and is a view showing the section taken along the line B-B in FIG. 48, viewed from the direction of arrows C.

As indicated by ST41 in FIG. 50, a lower fuel reserving portion 7405 formed into a concave shape is formed in the lower portion of the fuel tank 7022. When the lower fuel reserving portion 7405 with the concave shape is formed, the fuel is readily stored in the lower fuel reserving portion 7405. The fuel tank 7022 (reserving portion) includes the partition walls 7400 that divide the inside of the fuel tank 7022 in the front-and-rear direction. In the partition wall 7400, a through hole 7410 through which the connecting portion 7320 (the flexible member 7330 and the joint member 7340) extends, and communication holes 7420 that communicate to flow the fuel stored in the lower fuel reserving portion 7405 between the regions divided by the partition wall 7400 are formed. In the example of ST42, one through hole 7410 is formed. When providing a plurality of fuel suction devices 7300 parallelly in the fuel tank 7022, a plurality of through holes 7410 are provided in accordance with the number of fuel suction devices 7300 arranged. As indicated by ST43, the suction unit 7310 sucks the fuel stored in the lower fuel reserving portion 7405, and the connecting portion 7320 connected to the suction unit 7310 supplies the fuel sucked by the suction unit 7310 to the power generator 7004.

Figure 51:
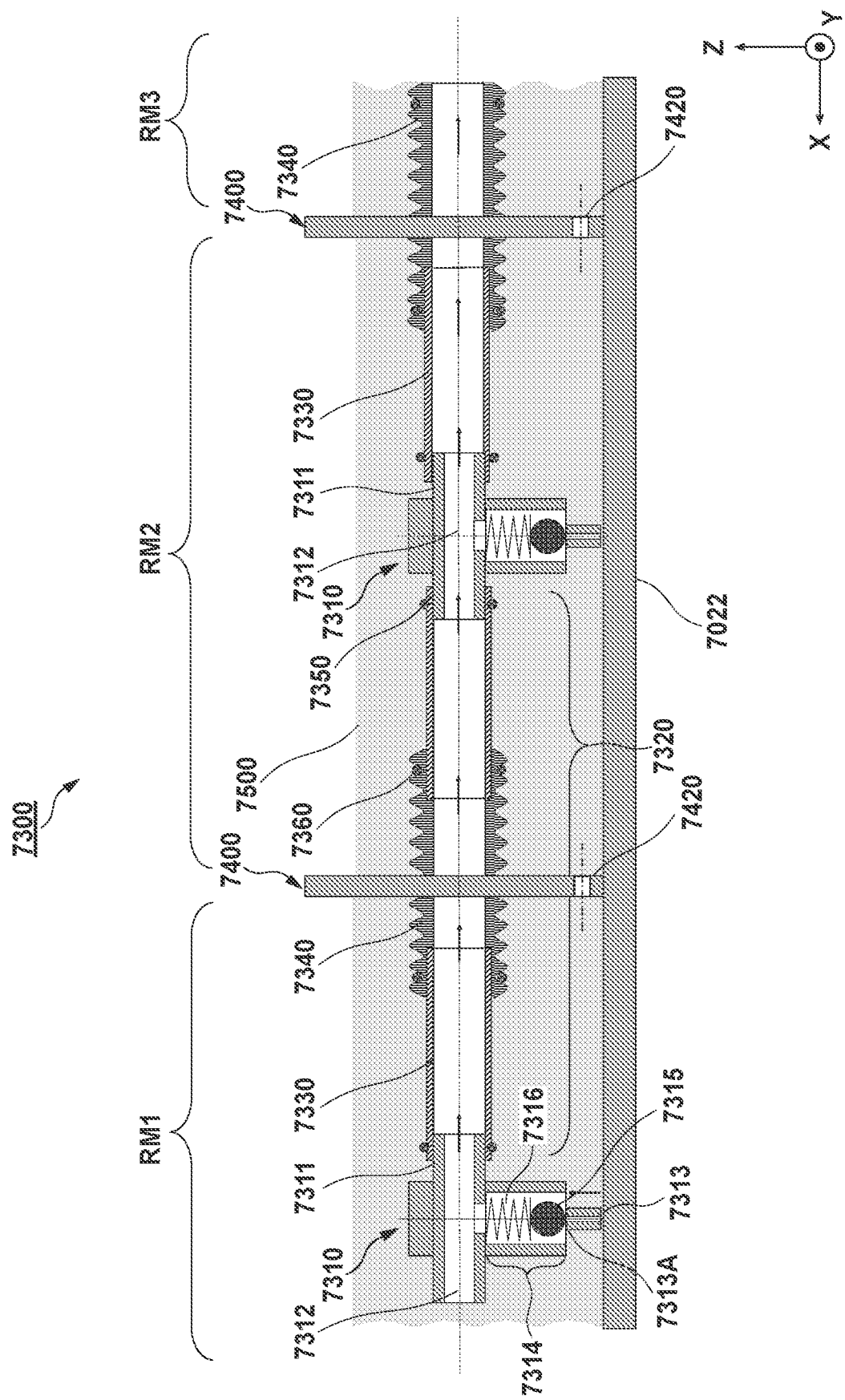
FIG. 51 is a view showing a state in which the fuel suction device is arranged in a fuel tank.

FIG. 51 is a view showing a state in which the fuel suction device 7300 is arranged in the fuel tank 7022. As shown in FIG. 51, the fuel tank 7022 (reserving portion) includes the plurality of partition walls 7400 that divide the inside of the fuel tank 7022 in the front-and-rear direction (X direction). At least one of the plurality of suction units 7310 is arranged in each region divided by the partition walls. In accordance with the posture of the flying body 7100, fuel 7500 can flow between the regions (for example, between a region RM1 and a region RM2 or between the region RM2 and a region RM3) via the communication holes 7420. The fuel 7500 stored in each region divided by the partition walls 7400 is sucked by the suction unit 7310 arranged in the region. The connecting portion 7320 connected to the suction unit 7310 supplies the fuel sucked by the suction unit 7310 to the power generator 7004.

When the partition walls 7400 as shown in FIG. 51 are provided in the fuel tank 7022, the fuel can readily be collected in the regions divided by the partition walls 7400. The fuel suction device (the suction unit 7310 and the connecting portion 7320) provided in each region sucks the fuel, and the sucked fuel is supplied to the power generator 7004, thereby increasing the fuel supply stability and preventing air entrainment from occurring.

Embodiment 7-2

In Embodiment 7-1, an arrangement example in which the fuel suction device 7300 is arranged along the front-and-rear direction (longitudinal direction: X direction) of the fuel tank 7022 has been described. However, the suction units 7310 of the fuel suction device 7300 may be arranged along the circumferential direction of the fuel tank 7022.

Figure 52:
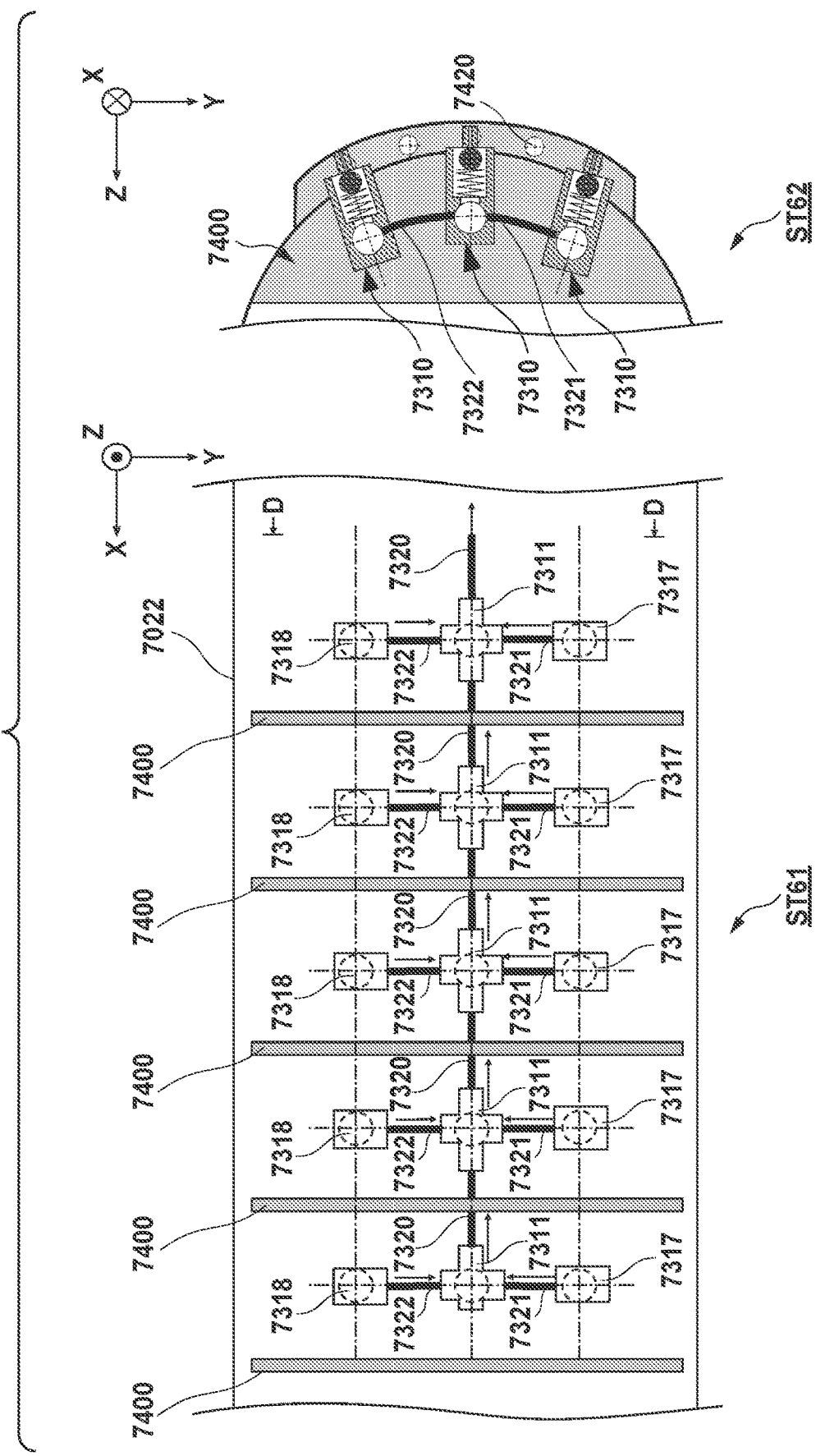
FIG. 52 is a view showing the arrangement of a fuel suction device according to Embodiment 7-2.

FIG. 52 is a view showing an example of the arrangement of a fuel suction device 7300 according to Embodiment 7-2. ST61 in FIG. 52 is a view showing the X-Y plane of a fuel tank 7022 viewed from the Z direction, and ST62 in FIG. 52 is a view showing the Y-Z plane of the fuel tank 7022 viewed from the direction of arrows D.

A plurality of suction units 7310 of the fuel suction device 7300 according to Embodiment 7-2 are arranged in a direction (circumferential direction: Y direction) crossing (almost orthogonal to) the front-and-rear direction (longitudinal direction: X direction) of the fuel tank 7022 (reserving portion). A coupling portion 7311 of the suction unit 7310 provided at the center has an almost cross shape in a planar view of the X-Y plane, and includes a hollow channel that connects a connecting portion 7320 extending in the front-and-rear direction and connecting portions 7321 and 7322 extending in the circumferential direction. Suction units 7317 and 7318 provided in the circumferential direction (Y direction) are connected via the connecting portions 7321 and 7322.

The suction units 7317 and 7318 have the same structure as the suction unit 7310 described with reference to FIG. 49, and fuel sucked by the suction units 7317 and 7318 flows into a channel 7312 (FIG. 49) of the suction unit 7310 via the connecting portions 7321 and 7322. The fuel then flows from the channel 7312 of the suction unit 7310 to the connecting portion 7320, and the connecting portion 7320 supplies the fuel sucked by the plurality of suction units 7310, 7317, and 7318 to a power generator 7004.

When the plurality of suction units 7310 are provided in the front-and-rear direction (X direction) and the circumferential direction (Y direction) of the fuel tank 7022, the fuel is sucked by the fuel suction device (the suction units 7310 and the connecting portions 7320) provided in a wider range of the fuel tank 7022, and the sucked fuel is supplied to the power generator 7004, thereby increasing the fuel supply stability and preventing air entrainment from occurring.

Embodiment 7-3

Figure 53:
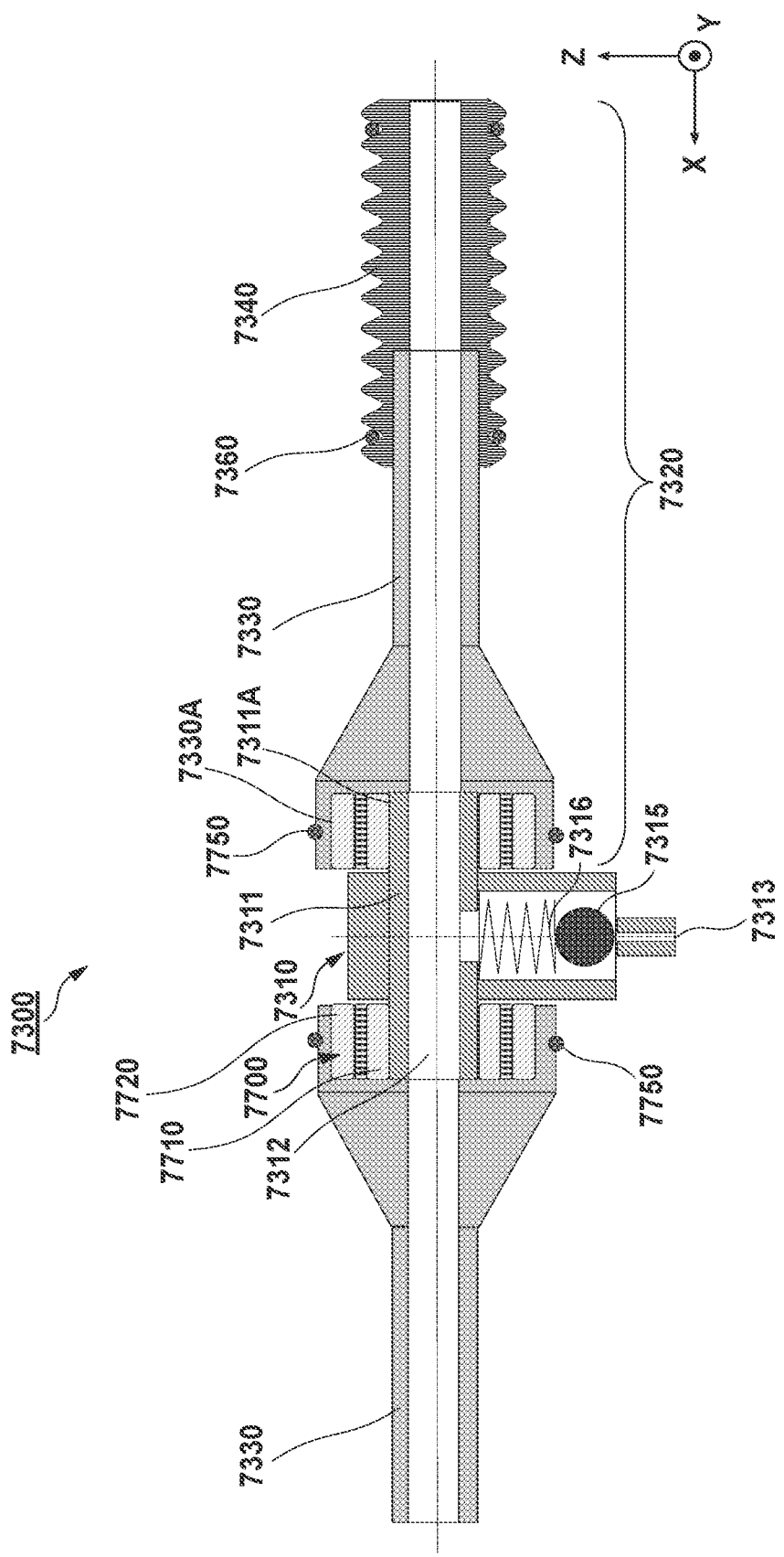
FIG. 53 is a view showing the arrangement of a fuel suction device according to Embodiment 7-3.

FIG. 53 is a view showing the arrangement of a fuel suction device 7300 according to Embodiment 7-3. The fuel suction device 7300 includes a rotation support portion provided between a coupling portion 7311 of each of a plurality of suction units 7310 and the inner diameter portion of a connecting portion 7320.

As shown in FIG. 53, the coupling portion 7311 of the suction unit 7310 is supported by bearings 7700 serving as rotation support portions. An outer diameter portion 7311A of the coupling portion 7311 is supported by an inner ring 7710 of the bearing 7700, and an outer ring 7720 of the bearing 7700 is supported by an inner diameter portion 7330A of the connecting portion 7320 (flexible member 7330).

For each of the plurality of suction units 7310, in a state in which the bearing 7700 is attached between the outer diameter portion 7311A of the coupling portion 7311 and the inner diameter portion 7330A of the connecting portion 7320 (flexible member 7330), by the pressing force of an engaging member 7750 such as a snap ring, the coupling portion 7311 of the suction unit 7310, the bearing 7700, and the connecting portion 7320 (flexible member 7330) are in an engaging state in which the relative movement in the X direction is suppressed.

As the arrangement of the connecting portion 7320, FIG. 53 shows an example of the flexible member 7330. However, this is not limited to the flexible member 7330, and the outer ring of the bearing 7700 can also be supported by the inner diameter portion of a joint member 7340. The type of the bearing 7700 is not particularly limited, and various bearings can be used. For example, when a needle roller bearing is used, the size and weight of the fuel suction device 7300 can be reduced. In addition, the arrangement of the fuel suction device 7300 according to Embodiment 7-3 can also be applied to the fuel suction device described in Embodiment 7-2.

The rotation support portions (bearings 7700) support rotation of the plurality of suction units 7310 about an axis along the front-and-rear direction of a housing 7002 (fuel tank 7022). When the bearing 7700 is provided between the coupling portion 7311 and the connecting portion 7320 (in the example of FIG. 53, the flexible member 7330) to support the suction unit 7310, the suction unit 7310 can rotate about the axis along the front-and-rear direction of the housing 7002 (fuel tank 7022) in accordance with a posture change of the flying body 7100. It is possible to increase the degree of freedom of the fuel suction direction by the plurality of suction units 7310, and therefore, it is possible to increase the fuel supply stability and prevent air entrainment from occurring.

Other Embodiments

In Embodiments 7-1 to 7-3, a helicopter has been exemplified as the flying body. The present invention can be applied not only to such a rotorcraft but also to aircrafts such as a fixed-wing aircraft and an airship and also to a flying type personal mobility, a spaceship, a space shuttle, and the like. The fixed-wing aircraft can include a glider aircraft represented by a glider and an aircraft represented by a propeller plane. The present invention is also applicable to a flying body that is not of electric propulsion type.

The connecting portion of the power supply apparatus can be set not only to the bottom surface of the airframe but also to the upper surface of the wing portion of the airframe or the bottom surface of the wing portion of the airframe. The power supplied by the power supply apparatus may be power supplied to a power load that forms a driving source such as a motor, power supplied to a power load other than the driving source, or power supplied to both.

A plurality of power supply apparatuses may be provided in one flying body. When providing a plurality of power supply apparatuses, they may be juxtaposed in the width-wise direction of the flying body, or may be arranged in a line in the front-and-rear direction of the flying body.

In Embodiments 7-1 to 7-3, an example in which the housing 7002 has a cylindrical shape has been described. However, the shape may be another tubular shape such as a square tubular shape. In addition, the housing 7002 may include a portion with a cylindrical shape and a portion with a square tubular shape.

Summary of Seventh Embodiment

The seventh embodiment discloses at least the following flying body including a power supply apparatus.

Arrangement 1. A flying body (for example, 7100) including a power supply apparatus (for example, 7001) according to the seventh embodiment is a flying body (7100) including a power supply apparatus (7001) that includes power generation unit (for example, 7004) and a hollow housing (for example, 7002) and is configured to supply power to a power load, the hollow housing having a long shape and including a reserving portion (for example, 7022) configured to reserve fuel of the power generation unit and a storage portion (for example, 7021) configured to store the power generation unit, wherein the power supply apparatus (7001) comprises:

a plurality of suction unit (for example, 7310), arranged inside the reserving portion (7022), for sucking the fuel; and hollow connecting unit (for example, 7320) connected to the plurality of suction unit (7310) arranged in a front-and-rear direction of the reserving portion (7022) and deformed in accordance with movement of the plurality of suction unit (7310), wherein the connecting unit (7320) supplies the fuel sucked by the plurality of suction unit (7310) to the power generation unit (7004).

According to the flying body including the power supply apparatus of Arrangement 1, it is possible to provide a flying body including a power supply apparatus capable of stably supplying the fuel and also prevent air entrainment in which a suction pressure lowers, and a fuel supply amount decreases at the time of operating a fuel pump.

Arrangement 2. In the flying body including the power supply apparatus according to the seventh embodiment, the connecting unit (7320)

includes a hollow joint member (for example, 7330) connected to the plurality of suction unit, and supplies the fuel sucked by the plurality of suction unit (7310) to the power generation unit (7004) via the joint member (7330).

According to the flying body including the power supply apparatus of Arrangement 2, by the elastic characteristic (elastic deformation) of the hollow joint member, the suction units can change the direction to the direction (downward in the vertical direction) in which the fuel is stored in the fuel tank in accordance with the flight posture of the flying body. It is therefore possible to stably supply the fuel and also prevent air entrainment in which a suction pressure lowers, and a fuel supply amount decreases at the time of operating a fuel pump.

Arrangement 3. In the flying body including the power supply apparatus according to the seventh embodiment, the connecting unit (7320) includes, as members with different elastic characteristics:

a hollow flexible member (7330) connected to the plurality of suction unit (7310); and a hollow joint member (7340) connected to the flexible member, and supplies the fuel sucked by the plurality of suction unit (7310) to the power generation unit (7004) via the flexible member (7330) and the joint member (7340).

According to the flying body including the power supply apparatus of Arrangement 3, when a plurality of members (the flexible member and the joint member) having different elastic characteristics are combined, the degree of freedom of elastic deformation can be increased, and the follow-up property corresponding to the movement of the suction unit, which occurs based on the posture change of the flying body, can be increased. It is therefore possible to stably supply the fuel and also prevent air entrainment in which a suction pressure lowers, and a fuel supply amount decreases at the time of operating a fuel pump.

Arrangement 4. In the flying body including the power supply apparatus according to the seventh embodiment, each of the plurality of suction unit (7310) includes:

a coupling portion (for example, 7311) connected to the connecting unit (7320);

a suction port (for example, 7313) configured to suck the fuel into a hollow channel (for example, 7312) formed inside the coupling portion (7311); and a stop valve (for example, 7314) configured to open/close the suction port (7313).

According to the flying body including the power supply apparatus of Arrangement 4, in a state in which the fuel is not sucked, the stop valve is set in a closed state, thereby preventing air from flowing (mixing) and further increasing the effect of preventing air entrainment in which a suction pressure lowers, and a fuel supply amount decreases at the time of operating a fuel pump.

Arrangement 5. In the flying body including the power supply apparatus according to the seventh embodiment, the reserving portion (7022) further comprises a partition wall (for example, 7400) configured to divide an inside of the reserving portion in the front-and-rear direction, and each of the plurality of suction unit (7310) is arranged in a region divided by the partition wall (7400).

According to the flying body including the power supply apparatus of Arrangement 5, the fuel can readily be collected in the regions divided by the partition walls. The suction unit sucks the fuel, and the sucked fuel is supplied to the power generator via the connecting portion, thereby increasing the fuel supply stability and preventing air entrainment from occurring.

Arrangement 6. In the flying body including the power supply apparatus according to the seventh embodiment, a communication hole (for example, 7420) through which the fuel can communicate between the divided regions is formed in the partition wall (7400).

According to the flying body including the power supply apparatus of Arrangement 6, the fuel can flow between the regions via the communication holes in accordance with a posture change of the flying body and can readily be collected in the regions divided by the partition walls. The suction unit sucks the fuel collected in the region, and the sucked fuel is supplied to the power generator via the connecting portion, thereby increasing the fuel supply stability and preventing air entrainment from occurring.

Arrangement 7. In the flying body including the power supply apparatus according to the seventh embodiment, the power supply apparatus (7001) further comprises a plurality of suction unit (7310) arranged in a direction crossing the front-and-rear direction of the reserving portion (7022).

According to the flying body including the power supply apparatus of Arrangement 7, the fuel is sucked by the suction unit provided in a wider range of the fuel tank (reserving portion), and the sucked fuel is supplied to the power generator via the connecting portion, thereby increasing the fuel supply stability and preventing air entrainment from occurring.

Arrangement 8. In the flying body including the power supply apparatus according to the seventh embodiment, the power supply apparatus (7001) further comprises rotation support unit (for example, 7700) provided between a coupling portion (7311) of each of the plurality of suction unit (7310) and an inner diameter portion of the connecting unit (7320), and the rotation support unit (7700) supports rotation of the plurality of suction unit (7310) about an axis along the front-and-rear direction of the housing (7002).

According to the flying body including the power supply apparatus of Arrangement 8, the suction unit can rotate about the axis along the front-and-rear direction of the housing (fuel tank) in accordance with a posture change of the flying body. It is possible to increase the degree of freedom of the fuel suction direction by the plurality of suction units, and therefore, it is possible to increase the fuel supply stability and prevent air entrainment from occurring.

The invention is not limited to the foregoing embodiments, and various variations/changes are possible within the spirit of the invention.

What is claimed is:

1. A power supply apparatus that is attached outside an airframe of a flying body and supplies power to a power load of the flying body, comprising:
   a power generator including a shaft, and configured to generate power by rotation of the shaft;
   an engine configured to rotationally drive the shaft;
   a housing configured to store the power generator and the engine; and
   a heat exchanger configured to perform heat exchange between a combustion gas discharged from the engine and air supplied to the engine,
   wherein the housing includes an exhaust pipe configured to discharge the combustion gas from the engine, and
   wherein the heat exchanger is arranged inside the exhaust pipe.

2. The power supply apparatus according to claim 1, wherein the engine includes a combustion chamber configured to combust a gas mixture of air and fuel and discharge the combustion gas generated by the combustion,
   the combustion chamber is arranged, along a circumferential direction about an axis extended from the shaft, in the housing to surround the axis, and
   the heat exchanger is arranged to be surrounded by the combustion chamber.

3. The power supply apparatus according to claim 1, wherein the heat exchanger includes a partition wall member configured to partition a first channel serving as a channel of the combustion gas discharged from the engine and a second channel serving as a channel of the air supplied to the engine.

4. The power supply apparatus according to claim 3, wherein a plurality of first channels and a plurality of second channels are alternately formed along a circumferential direction about an axis extended from the shaft.

5. The power supply apparatus according to claim 4, wherein the partition wall member has a shape formed by folding a plate into a pleat and rounding the plate in the circumferential direction.

6. The power supply apparatus according to claim 3, wherein the heat exchanger includes a tubular outer circumferential member and a tubular inner circumferential member arranged inside the outer circumferential member, and
   the partition wall member is arranged between the outer circumferential member and the inner circumferential member.

7. The power supply apparatus according to claim 6, wherein the heat exchanger includes a first closing member configured to close one end of the tubular outer circumferential member, and a second closing member configured to close the other end of the outer circumferential member,
   the outer circumferential member includes a first opening portion in a part of a region where the first channel is located, on a side of the second closing member,
   the inner circumferential member includes a second opening portion in a part of a region where the second channel is located, on a side of the first closing member,
   the first closing member includes a third opening portion in at least a part of the region where the first channel is located, and includes a fourth opening portion in at least a part of a region where the inner circumferential member is located,
   the second closing member includes a fifth opening portion in at least a part of the region where the second channel is located, and
   in the heat exchanger,
   the air passes through the first channel via the third opening portion of the first closing member and is supplied to the engine via the first opening portion of the outer circumferential member, and
   the combustion gas passes through the second channel via the fifth opening portion of the second closing member and is discharged via the second opening portion of the inner circumferential member and the fourth opening portion of the first closing member.

8. The power supply apparatus according to claim 1, further comprising a second heat exchanger configured to perform heat exchange between the combustion gas discharged from the heat exchanger and air outside the housing.

9. The power supply apparatus according to claim 8, wherein the second heat exchanger includes a connecting member configured to connect the heat exchanger.

10. The power supply apparatus according to claim 6, further comprising a second heat exchanger configured to perform heat exchange between the combustion gas discharged from the heat exchanger and air outside the housing,
    wherein the second heat exchanger includes a connecting member configured to connect the heat exchanger and the second heat exchanger by fitting in the inner circumferential member of the heat exchanger.

11. The power supply apparatus according to claim 1, wherein in the housing, the power generator and the engine are arrayed along a front-and-rear direction of the flying body.

12. The device according to claim 1, further comprising a tank configured to reserve fuel of the engine,
    wherein the tank is stored in the housing.

13. An electric propulsion type flying body comprising a power supply apparatus defined in claim 1,
    wherein the power supply apparatus supplies power to a power load of the flying body.

14. A power supply apparatus that is attached outside an airframe of a flying body and supplies power to a power load of the flying body, comprising:
    power generation unit;
    a hollow housing including a reserving portion configured to reserve fuel of the power generation unit, and a storage portion configured to store the power generation unit;
    a connecting portion configured to connect the housing to the airframe of the flying body; and
    heat retaining unit retaining heat of the fuel, wherein the housing has a shape long in a front-and-rear direction of the flying body, wherein the power generation unit includes:
an internal combustion engine; and
a power generator configured to generate power by an output of the internal combustion engine, wherein the heat retaining unit retains the heat of the fuel by heat of lubricant oil that circulates in the internal combustion engine, wherein a tank configured to reserve the fuel is provided in the reserving portion, and wherein the heat retaining unit circulates the lubricant oil between the internal combustion engine and a space between the tank and the housing.

15. The power supply apparatus according to claim 14, wherein the heat retaining unit includes a heat exchanger provided to be immersed in the fuel in the reserving portion and including a pipe through which the lubricant oil passes.

16. The power supply apparatus according to claim 14, wherein the reserving portion includes a first reserving portion and a second reserving portion, the fuel reserved in the first reserving portion is supplied to the internal combustion engine via the second reserving portion, and the heat retaining unit includes a heat exchanger provided to be immersed in the fuel in the second reserving portion and including a pipe through which the lubricant oil passes.

17. The power supply apparatus according to claim 16, wherein the second reserving portion has a capacity smaller than that of the first reserving portion.

18. The power supply apparatus according to claim 14, wherein a first tank and a second tank both configured to reserve the fuel are provided in the reserving portion, the fuel reserved in the first tank is supplied to the internal combustion engine via the second tank, and the heat retaining unit includes:
a heat exchanger provided to be immersed in the fuel in the second tank and including a pipe through which the lubricant oil passes; and
a pump configured to circulate the lubricant oil between a space between the first tank and the housing, the heat exchanger, and the internal combustion engine.

19. The power supply apparatus according to claim 14, wherein the reserving portion and the storage portion are arranged in a longitudinal direction of the housing.

20. The power supply apparatus according to claim 16, wherein the first reserving portion, the second reserving portion, the power generator, and the internal combustion engine are arranged in this order from a front side in the front-and-rear direction of the flying body.

21. The power supply apparatus according to claim 18, wherein the first tank, the second tank, the power generator, and the internal combustion engine are arranged in this order from a front side in the front-and-rear direction of the flying body.

22. The power supply apparatus according to claim 14, wherein the internal combustion engine is a gas turbine engine, the gas turbine engine and the power generator are provided on a common shaft, which is arranged on the same axis as a center axis of the housing, and the reserving portion, the power generator, and the gas turbine engine are arranged in sequential order from a front side in the front-and-rear direction of the flying body.

* * * * *